United States Patent [19]
Lo

[11] Patent Number: 5,748,847
[45] Date of Patent: May 5, 1998

[54] NONADAPTIVELY TRAINED ADAPTIVE NEURAL SYSTEMS

[75] Inventor: James Ting-Ho Lo, Ellicott City, Md.

[73] Assignee: Maryland Technology Corporation, Ellicott City, Md.

[21] Appl. No.: 575,055

[22] Filed: Dec. 21, 1995

[51] Int. Cl.$^6$ .................................................. G06F 15/18
[52] U.S. Cl. .................... 395/23; 395/20; 395/21; 364/153
[58] Field of Search ................................ 364/148, 166; 395/23, 20, 21

[56] References Cited

U.S. PATENT DOCUMENTS

| | | | |
|---|---|---|---|
| 5,065,040 | 11/1991 | Peterson et al. | 307/201 |
| 5,129,039 | 7/1992 | Hiraiwa | 395/24 |
| 5,182,794 | 1/1993 | Gasperi et al. | 395/23 |
| 5,247,606 | 9/1993 | Tam | 395/24 |
| 5,268,834 | 12/1993 | Sanner et al. | 394/151 |
| 5,299,285 | 3/1994 | Tawel | 395/24 |
| 5,442,543 | 8/1995 | Tresp | 364/149 |
| 5,467,428 | 11/1995 | Ulug | 395/23 |

OTHER PUBLICATIONS

Yahagi, Cao, and Lu "A Design Method for Parallel Nonlinear Adaptive Digital Filters using Neural Networks", Electronics and Communications in Japan, Part 3, vol. 79, No. 1 pp. 22–33, Jan. 1996.

Fung, Lam, Chan, Poon, Liu "Adaptive Neural Network Filter for Visual Evoked Potential Estimation", IEEE International Conference on Neural Networks Proceedings, 1995.

Neiberg and Casasent "High-Capacity Neural Networks on Non-ideal hardware", Applied Optics, vol. 33, No. 32, Nov. 10, 1994.

Nerrad, Roussel-Ragot, Personnaz, Dreyfus, Marcos, Macchi, Vignat, "Neural Network Training Schemes for non--Linear Adaptive Filtering and Modelling", IEEE/IEE Publications Ondisc, vol. I, 1991.

A. H. Sayed and T. Kailath, "A State–Space Approach to Adaptive RLS Filtering," *IEEE Signal Processing Magazine*, vol. 11, No.3, pp. 18–60 (1994).

K. S. Narendra and K. Parthasarathy, "Identification and Control of Dynamical Systems Using Neural Networks," *IEEE Transactions Neural Networks*, vol. 1, pp. 4–27 (1990).

O. Nerrand, P. Roussel-Ragot, L. Personnaz, and G. Dreyfus, "Neural Networks and Nonlinear Adaptive: Filtering: Unifying Concepts and New Algorithm," *Neural Computation*, vol. 5, pp. 165–199 (1993).

(List continued on next page.)

*Primary Examiner*—James P. Trammell
*Assistant Examiner*—Demetra R. Smith

[57] ABSTRACT

An adaptive neural system (ANS) disclosed herein comprises a processor and an adaptor. The processor includes mainly a neural network whose adjustable weights are divided into nonadaptively and adaptively adjustable weights. The nonadaptively adjustable weights are determined through minimizing or reducing a nonadaptive training criterion in an off-line nonadaptive training. Being constructed with a priori training data, the nonadaptive training criterion is a function of the nonadaptively adjustable weights and the diversity variables associated with typical values of the environmental parameter. During an operation of the adaptive neural system, only the adaptively adjustable weights are adjusted on-line to adapt to the unknown environmental parameter. This adaptive training is achieved by minimizing or reducing an adaptive training criterion. The nonadaptive training allows the ANS to make full advantage of a priori information about the ANS's operating environment and helps the ANS focus on learning about and adapting to the unknown environmental parameter during the adaptive training. In many applications, the adaptively adjustable weights can be selected, without adversely affecting the ANS's performance, such that they appear quadratically in the adaptive training criterion. In this case, the adaptive training criterion has no undesirable local minima and the existing fast algorithms for adaptive linear filters are applicable to the adaptive training.

20 Claims, 18 Drawing Sheets

OTHER PUBLICATIONS

G. V. Puskorius and L. A. Feldkamp, "Neurocontrol of Nonlinear Dynamical Systems with Kalman Filter–Trained Recurrent Networks," *IEEE Transactions on Neural Networks*, vol. 5, No. 2, pp. 279–297 (1994).

L. Yin et al, "A New Class of Nonlinear Filters—Neural Filters," *IEEE Transaction on Signal Processing*, vol. 41, pp. 1201–1222 (1993).

NONADAPTIVELY TRAINED ADAPTIVE NEURAL SYSTEMS

CROSS-REFERENCE TO RELATED APPLICATIONS

This application is related to U.S. patent application Ser. No. 08/068,176, entitled "Optimal Filtering by Recurrent Neural Networks," filed May 28, 1993, by James Ting-Ho Lo, now U.S. Pat. No. 5,408,424, granted Apr. 18, 1995. This application is also related to U.S. patent application Ser. No. 08/104,488 entitled "Optimal Filtering by Neural Networks with Range Extenders and/or Reducers," filed Aug. 9, 1993, by James Ting-Ho Lo and Lei Yu.

BACKGROUND OF THE INVENTION

This invention is concerned with adaptive processing by artificial neural networks (NNs). More specifically, this invention relates to using an artificial NN in a processor to process a discrete-time process, and an adaptor to adapt the weights and/or parameters of the artificial NN to its operating environment. An artificial NN is hereinafter referred to as a neural network (NN).

Adaptive systems, each comprising a processor and adaptor, are used in such diversified fields as communication, control, biomedical electronics, robotics, mechanical design, radar, sonar, seismology, sound/vibration cancellation, and signal/image processing. In accordance with their applications, these adaptive systems are called adaptive filters, adaptive predictors, adaptive controller, adaptive system identifier/emulator, adaptive inverse system identifier, adaptive beamformers, adaptive equalizers, adaptive line enhancers, adaptive noise/interference cancellers, adaptive sidelobe cancellers, etc.

Under one or more of the following three and possibly other circumstances, an adaptive system can be necessarily or beneficially used:

1. The information available is insufficient to completely specify the adaptive system's operating environment over its entire operating time period(s), before the same period(s). The information about the operating environment may be in the form of a mathematical (and/or statistical) model with completely or partially specified functional forms, some simulation data, or some true data, or a combination thereof. The insufficiency of information can be viewed or conceived as a parameter vector with an unknown dimension (one or higher) and/or unidentified or unknown components. This parameter vector, to be called the environmental parameter, may be time-invariant or time-variant. The environmental parameter over time, to be called the environmental parameter function, may be looked upon as an unknown deterministic function (or constant) or a stochastic process (or random variable) with known or unknown statistics, which may be constant or time-variant.

2. The information available is insufficient to completely specify the adaptive system's operating environment over its entire operating time period(s), before the same period(s). Some simulation and/or true data are available for each of a variety of the adaptive system's operating environments. However, it is not clear whether there exists an environmental parameter as defined above or what the environmental parameter is.

3. The information available is sufficient to completely specify the adaptive system's operating environment over its entire operating time period(s), before the same period(s). However, the adaptive system's operating environment is so complex or contains so much variability that a processor with predetermined weights and/or parameters is believed to be more difficult to design or more costly to build or operate than an adaptive system. In this case, some specified or unspecified variables in the operating environment are taken as the environmental parameter.

To illustrate the terminology, two example problems of adaptive processing are now given.

EXAMPLE 1

A system to be identified is a discrete-time SISO (single input single output) plant described by the mathematical model: For $t=0,1,\ldots$, $$y(t+1)=f(y(t),\ldots,y(t-p+1), x(t),\ldots, x(t-q+1), \theta(t), \epsilon(t)), \quad (1)$$

with the initial condition $$(y(0),\ldots, y(-p+1), x(-1),\ldots, x(-q+1))=(y_0,\ldots, y_{-p+1}, x_{-1},\ldots, x_{-q+1}), \quad (2)$$

where the function, $f$, and the integers, p and q, are given; $x(t)$ is the known input at time t; and $\epsilon$ is a random sequence with given joint probability distributions. A measurement $z(t)$ of $y(t)$ is made available at time t, that satisfies $$z(t)=y(t)+\xi(t), \quad (3)$$

where $\xi$ is a stochastic sequence with given joint probability distributions. If $\xi(t)$ is equal to zero for every t, $z(t)$ equals $y(t)$ and $y(t)$ is thus available. The equations, (1) and (2), describe the evolution of the output y, given the input x, up to and including time t+1, provided that $\theta^t:=\{\theta(s), s=1,\ldots, t\}$ is given. Here the symbol ":=" means "being defined to be." The equations, (1), (2) and (3), represent the operating environment of the adaptive identifier (or emulator) under design. $\theta(t)$ is the unknown environmental parameter at time t. A problem of adaptive system identification is to design and implement a processor and an adaptor, that operate in the operating environment represented by the equations, (1), (2) and (3). Following the series-parallel formulation of system identification, the processor inputs $z(t)$ and $x(t)$, and outputs an estimate $\hat{y}(t+1)$ of $y(t+1)$ at each time $t=1, 2,\ldots, T$, where T is a positive integer or infinity. At the same time t, the adaptor compares $z(t)$ with the estimate $\hat{y}(t)$, utilizes information about and/or from the processor, and adjusts the weights and/or parameters of the processor to adapt to $\theta(t)$ so that the estimates of y generated by the processor minimize or reduce the value of some given estimation or identification error criterion.

EXAMPLE 2

Although the input/output relationship of a plant is known to satisfy equations of the forms, (1) and (2), the function, $f$, and the integers, p and q, are not known and the environmental parameter $\theta(t)$ is not even identified (i.e., how many and what components there are in $\theta(t)$ are unknown). However, for each of a large number of different, though unknown, exemplary sequences of $\theta$, a large set of exemplary realizations of the plant's input process x and output measurement process z are available, which reflect their joint probability distributions during the plant's operations. Again, the problem is to design and implement a processor and adaptor with exactly the same functions as those of the processor and adaptor for the preceding first example.

There is an enormous amount of research results on adaptive processing and its applications. Most of these research results can be found in or tracked down from the books by B. Widrow and S. D. Stearns, *Adaptive Signal Processing*, Prentice-Hall (1985), G. C. Goodwin and K. S. Sin, *Adaptive Filtering, Prediction, and Control*, Prentice-Hall (1984), L. Ljung, *System Identification: Theory for the user*, Prentice-Hall (1987), S. Haykin, *Adaptive Filter Theory, 2nd edition*, Prentice-Hall (1991), J. Hertz, A. Krogh and R. G. Palmer, *Introduction to the Theory of Neural Computation*, Addison-Wesley (1991), and S. Haykin, *Neural Networks-A Comprehensive Foundation*, IEEE Press (1994), and the papers by A. H. Sayed and T. Kailath, "A State-Space Approach to Adaptive RLS Filtering," *IEEE Signal Processing Magazine*, Vol. 11, No. 3, pp. 18–60 (1994), R. J. Williams and D. Zipser, "A Learning Algorithm for Continually Running Fully Recurrent Neural Networks," *Neural Computation*, Vol. 1, pp. 270–280 (1989), R. J. Williams and J. Peng, "An Efficient Gradient-based Algorithm for On-line Training of Recurrent Network Trajectories," *Neural Computation*, Vol. 2, pp. 490–501 (1990), K. S. Narendra and K. Parthasarathy, "Identification and Control of Dynamical Systems Using Neural Networks," *IEEE Transactions on Neural Networks*, Vol. 1, pp. 4–27 (1990), K. S. Narendra and K. Parthasarathy, "Gradient Methods for the Optimization of Dynamical Systems Containing Neural Networks," *IEEE Transactions on Neural Networks*, Vol. 2, pp. 252–262 (1991), and O. Nerrand, P. Roussel-Ragot, L. Personnaz, and G. Dreyfus, "Neural Networks and Nonlinear Adaptive Filtering: Unifying Concepts and New Algorithm," *Neural Computation*, Vol. 5, pp. 165–199 (1993).

Technically, this invention is closely related to the adaptive linear filters (or linear adaptive filters) as described in the above books by Widrow and Stearns (1985) and Haykin (1991) and the above paper by Sayed and Kailath (1994), and to the adaptive neural networks, that are neural networks whose weights and/or parameters are adjusted adaptively (or on-line) during their operations, as described in the above books by Hertz, Palmer and Krogh (1991), and Haykin (1994), and the above papers by Williams and Zipser (1989), Williams and Peng (1990), Narendra and Parthasarathy (1990 and 1991), and Nerrand, Roussel-Ragot, Personnaz and Dreyfus (1993).

In an adaptive linear filter, the processor (or filter) is a linear function of the input, if the weights (or parameters) of the processor are held fixed. This simple linear structure is actually responsible for the advantage and disadvantage of the adaptive linear filters, which are perhaps the most widely applied adaptive systems. On the one hand, the linear structure has allowed many fast adaptive algorithms to be developed for adapting the weights of the processor. Many of these fast adaptive algorithms such as recursive least squares (RLS) algorithms and the corresponding fast versions; QR- and inverse QR-least squares algorithms; least-squares lattice (LSL) and QR decomposition-based least squares lattice (QRD-LSL) algorithms; and gradient-based algorithms such as the least-mean square (LMS) algorithm can be found in the above books by Widrow and Stearns (1985) and Haykin (1991) and in the above paper by A. H. Sayed and T. Kailath (1994).

On the other hand, this linear structure imposes a constraint on the processing capability of the adaptive linear filters. In a nonlinear operating environment, this linearity constraint is usually the main cause for an adaptive linear filter's poor performance.

The use of artificial NNs requires no linearity constraint of this sort. In fact, almost every function (or static mapping) can be approximated to any desired degree of accuracy by a multilayer perceptron (MLP), as proven by G. Cybenko, "Approximation by Superpositions of a Sigmoidal Function," *Mathematics of Control, Signals, and Systems*, Vol. 2, pp. 303–314 (1989), K. Funahashi, "On the Approximate Realization of Continuous Mappings by Neural Networks," *Neural Networks*, Vol. 2, pp. 183–192 (1989), and K. Hornik, M. Stinchcombe, and H. White, "Multilayer Feedforward Networks are Universal approximators," *Neural Networks*, Vol. 2, pp. 359–366 (1989). Similarly, almost every dynamic system can be approximated to any desired degree of accuracy by a multilayer perceptron with output feedbacks (MLPWOF) as well as a multilayer perceptron with interconnected neurons (MLPWIN), as proven by J. T.-H. Lo, "Dynamical System Identification by Recurrent Multilayer Perceptrons," *Proceedings of the 1993 World Congress on Neural Networks*, (1993).

An artificial NN is an adaptive NN or a nonadaptive neural network, depending on whether the NN is trained adaptively (or on-line) during its operation. An adaptive NN may or may not be subject to nonadaptive (or preoperational, or off-line) training. Nevertheless, all the adjustable weights and/or parameters of every adaptive NN that can be found in the open literature including patent documents are adjusted during the adaptive (or on-line) training. If there is an a priori (or nonadaptive, or preoperational, or off-line) training for an adaptive neural network, the weights and/or parameters adjusted adaptively during its operation are the same as those adjusted during the a priori training. An example of an adaptive NN is a multilayer perceptron under adaptive training by a pattern-mode back-propagation algorithm. All the weights in all the layers of the multilayer perceptron are adjusted during the adaptive training. Another example is a multilayer perceptron with delayed-feedback connections that is adaptively trained by a pattern-mode real-time recurrent learning (RTRL) based algorithm, which RTRL can be found in the paper by Williams and Zipser (1989) and the book by Hertz, Palmer and Krogh (1991). Again, all the adjustable weights in all the layers of the multilayer perceptron with delayed-feedback connections are adjusted during the adaptive training. There are many patent documents concerning adaptive NNs. The patent document that is perhaps the most relevant to the present invention among all the relevant patents is U.S. Pat. No. 5,129,039 to Atsunobu Hiraiwa, (1992), wherein all the adjustable weights in the NNs are adjusted during the adaptive training.

Adjusting all the adjustable weights and/or parameters in all the layers of an adaptive NN with multiple layers to adapt to its operating environment in adaptive (or on-line) training has the following drawbacks:

As opposed to the fast adaptive algorithms for adaptive linear filters, all the algorithms, such as the back-propagation and RTRL-based algorithms, for adapting the weights and/or parameters of the adaptive neural networks, involve a relatively large amount of computation and converge relatively slowly, especially when the NN involved is a recursive one.

The training criterion (or the performance surface) of an NN with nonlinear hidden neurons is generally nonquadratic and may have many local minima. As opposed to nonadaptive (or preoperational, or off-line) training in which multiple training sessions can be conducted to avoid choosing a poor local minimizer of the training criterion as the weights and/or parameters for the neural network, adaptive training of an adaptive NN during its operation does not usually allow multiple training sessions and can get trapped into a poor local minimum of the training criterion. Global optimization algorithms such as simulated annealing, genetic algorithms, ALOPEX and other stochastic algorithms can be used here, but they converge even more slowly than those algorithms using derivatives of the training criterion with respect to the weights and/or parameters of the adaptive NN such as those based on gradient descent, conjugate gradient, or quasi-Newton methods.

If an unknown environmental parameter is the only information missing about the operating environment of an adaptive neural network, its adaptive training should focus on learning about and adapting to the unknown environmental parameter. Allowing all the weights and/or parameters to be adjusted adaptively does not make the best use of the preoperational information and fails to focus on adapting to the unknown environmental parameter alone. Consequently, more information than required for learning about or adapting to the unknown environmental parameter has to be accumulated on-line to achieve successful adaptation.

In consideration of the foregoing shortcomings of the adaptive linear filters and the adaptive NNs with all weights and/or parameters adjusted on-line or adaptively, there is a need for an adaptive system whose processor does not have a self-imposed linearity constraint like that of the adaptive linear filters and whose adaptor employs a fast and efficient algorithm, focuses on the missing information about the operating environment, and has no or little chance to be trapped in a poor local minimum of the adaptive system's performance surface.

SUMMARY

The present invention is directed to an adaptive neural system (ANS) that satisfies the need for an adaptive system whose processor does not have a self-imposed linearity constraint like that of the adaptive linear filters and whose adaptor employs a fast and efficient algorithm, focuses on learning about and adapting to an environmental parameter or another form of the missing information about the operating environment, and has no or little chance to be trapped in a poor local minimum of the adaptive system's performance surface during its operation.

In accordance with the teachings of the present invention, the processor of this ANS employs a neural network (NN) with at least one hidden nonlinear neuron, whose adjustable weights (and/or parameters) are divided into nonadaptively adjustable weights and adaptively adjustable weights. The inclusion of at least one hidden nonlinear neuron allows the adaptive neural system to provide nonlinear processing capability. The nonadaptively adjustable weights are determined in nonadaptive (or a priori, or off-line) training, which makes full advantage of the a priori information about the operating environment and thereby helps the adaptor of the ANS focus on learning about and adapting to an unknown environmental parameter or another form of the missing information about the operating environment. The adaptor of the ANS adjusts only the adaptively adjustable weights that are judiciously selected from the NN. This allows for the use of simpler, faster and more efficient adaptive algorithm and helps reduce or even eliminate poor local minima of the performance surface (or adaptive training criterion) for the adaptive (or on-line) training.

It was discovered by the present inventor that under very mild conditions, an arbitrary static mapping, $y=f(x,\theta)$, with an environmental parameter $\theta$, can be approximated to any desired degree of accuracy by a nonrecurrent NN (e.g., a multilayer perceptron) with only one hidden layer of non-linear neurons, where only the linear weights (i.e. weights that affect the NN's outputs linearly) depend on the environmental parameter $\theta$, provided that there are a sufficient number of hidden neurons. It was also discovered by the present inventor that under very mild conditions, a dynamic system (or plant) described by (16) and (17) can be approximated, over a finite time interval $1<t<T$, to any desired degree of accuracy by a recursive neural network with only one hidden layer of fully interconnected nonlinear neurons, where only the linear weights (from the nonrecursive secion of the NN) depend on the environmental parameter $\theta$, provided that there are a sufficient number of hidden neurons. These two discoveries and their generalizations allow us to select the adaptively adjustable weights of the adaptive neural system's neural network from only its linear weights without sacrificing the performance of the ANS, provided that a sufficient number of linear weights are available and selected.

When all the adaptively adjustable weights are linear (from the nonrecursive secion of the NN) and the adaptive training criterion is quadratic in these linear weights, the adaptive training criterion has no poor local minima and equally important, the fast and efficient algorithms for the adaptive linear filters such as the recursive least squares (RLS) algorithms and the corresponding fast versions; QR- and inverse QR-least squares algorithms; least-squares lattice (LSL) and QR decomposition-based least squares lattice (QRD-LSL) algorithms; and gradient-based algorithms such as the least-mean square (LMS) algorithm, which can be found in the foregoing books by Widrow and Stearns (1985) and Haykin (1991) and in the foregoing paper by A. H. Sayed and T. Kailath (1994), can be used by the ANS's adaptor. This is an important version of the present invention.

However, another consideration in designing an ANS is the size of the NN used. Trade-off between the NN size and the foregoing computational and optimizational factors should be made to maximize the cost effectiveness of designing, implementing and runing the ANS. Moreover, in many applications, the adaptive training criterion is necessarily a nonquadratic function of the adaptively adjustable weights. Therefore, another version of the present invention is an ANS with all its adaptively adjustable weights being selected from not only the linear but also the nonlinear section of the ANS's NN.

An alternative way to adjust the adaptively adjustable weights of the NN in an ANS is to run another ANS, called an auxiliary ANS, in the processor of the first ANS and use a map (e.g., a mapping NN) to transform the adaptively adjustable weights of the auxiliary ANS's NN into those of the first ANS's NN. This alternative way is especially important, when an appropriate adaptive training criterion cannot be constructed for the NN of the first ANS with the information collected during its operation.

BRIEF DESCRIPTION OF THE DRAWINGS

These and other features, aspects and advantages of the present invention will become better understood with regard to the following description, appended claims, and accompanying drawings where:

No distinction between nonadaptively adjustable weights and adaptively adjustable weights is made in the NN 205 in the processor 195.

Figure 9:
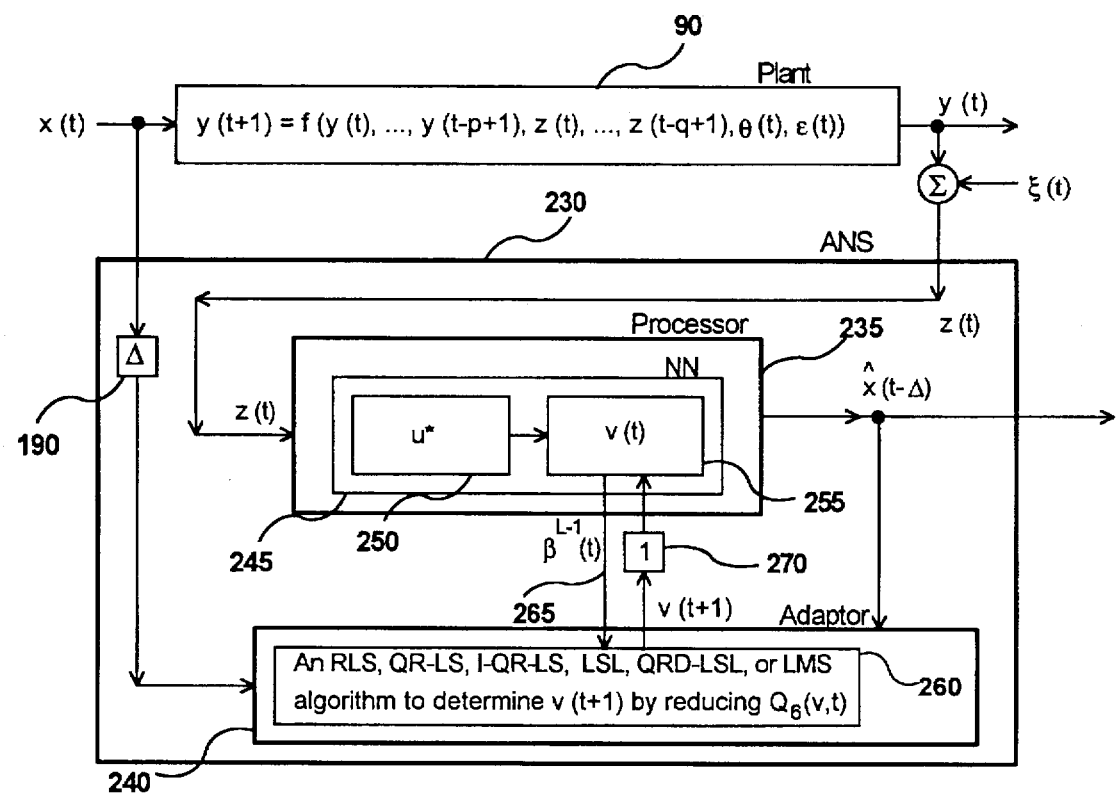

FIG. 9 shows an exemplary embodiment of the present invention for adaptive inverse modeling. The ANS 230 comprises a processor 235 and an adaptor 240. The processor 235 comprises mainly an MLP (or alternatively MLPWIN) 245, of which the linear section is shown as block 255 and the nonlinear section block 250 in the figure. In the MLP (or alternatively MLPWIN) 245, the nonadaptively adjustable weights us have been set equal to their operational values u* obtained with respect to $Q_5(u,v(\theta_1), \ldots, v(\theta_N))$ in equation (31) in nonadaptive training. These operational values u* remain constant in the operation of the ANS until next nonadaptive training is performed. This is how the ANS works during its operation: At time t, the MLP with tapped delay lines (or alternatively MLPWIN) in the processor 235 receives and processes the plant's output measurement z(t) using u* and v(t) in the nonlinear and linear sections of the NN 245 respectively. Then the processor 235 outputs, at time t, an estimate (or approximate) $\hat{x}(t-\Delta)$ of the plant's input $x(t-\Delta)$ for time $t-\Delta$. At the same time t, the adaptor 240 receives $x(t-\Delta)$ from the input terminals of the plant 90, after a delay 190 of $\Delta$ time steps, and receives $t(t-\Delta)$ from the output terminals of the processor 235. The adaptor also receives $\beta^{L-1}$ (t) from the linear section 255 of the MLP (or alternatively MLPWIN) 245. Using these data, an RLS, QR-LS, I-QR-LS, LSL, QRD-LSL or LMS algorithm 260 in the adaptor 240 minimizes or reduces $Q_6$ (v, t) and thereby determines the values v(t+1) of the linear weights v of the MLP (or alternatively MLPWIN) 245, which are then delayed 270 by one time step and transferred into the linear section 255 for use by the MLP (or alternatively MLPWIN) 245 at the next time.

Figure 10:
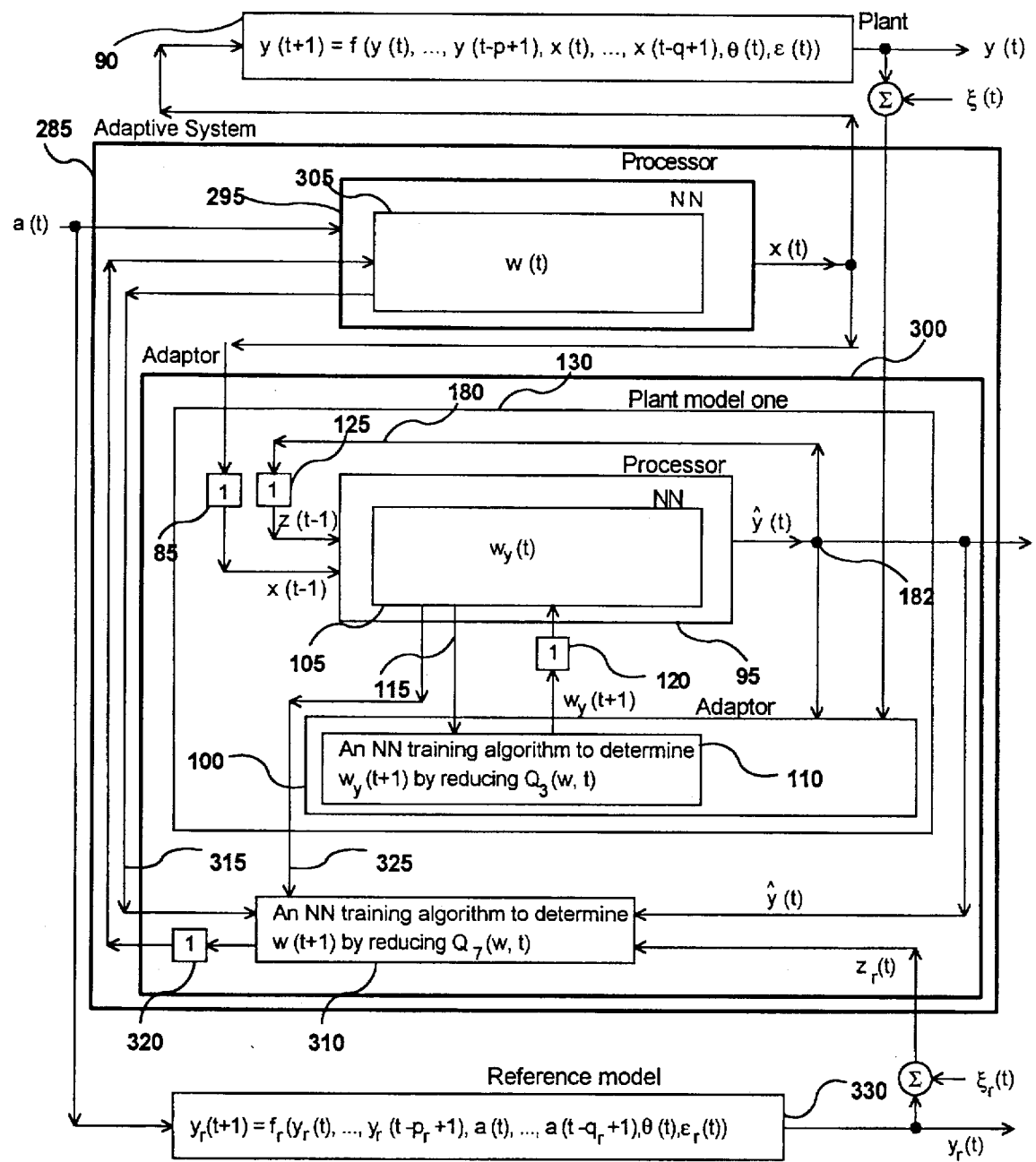

FIG. 10 shows a typical operating environment and a prior-art scheme for adaptive model reference control. At each time t, the processor 295 inputs a(t) and generates a control signal x(t) for the plant 90 and a plant model one 130, which emulates the plant 90 and produces an estimate $\hat{y}(t)$ of the plant's output y(t). At the same time t, an NN training algorithm 310 compares $\hat{y}(t)$ and $z_r$ (t), utilizes information about and/or from the processor 295, and adjusts the weights and/or parameters of the NN 305 in the processor 295 to adapt to the environmental parameter $\theta$ so that the control signal x(t) generated by the processor 295 drives the plant 90 to minimize or reduce a control error criterion, $Q_7$ (w,t), as defined in equation (38), which reflects the difference between the plant's output y and the reference model's output $y_r$. No distinction between nonadaptively adjustable weights and adaptively adjustable weights is made for the NN 305 in the processor 295.

Figure 11:
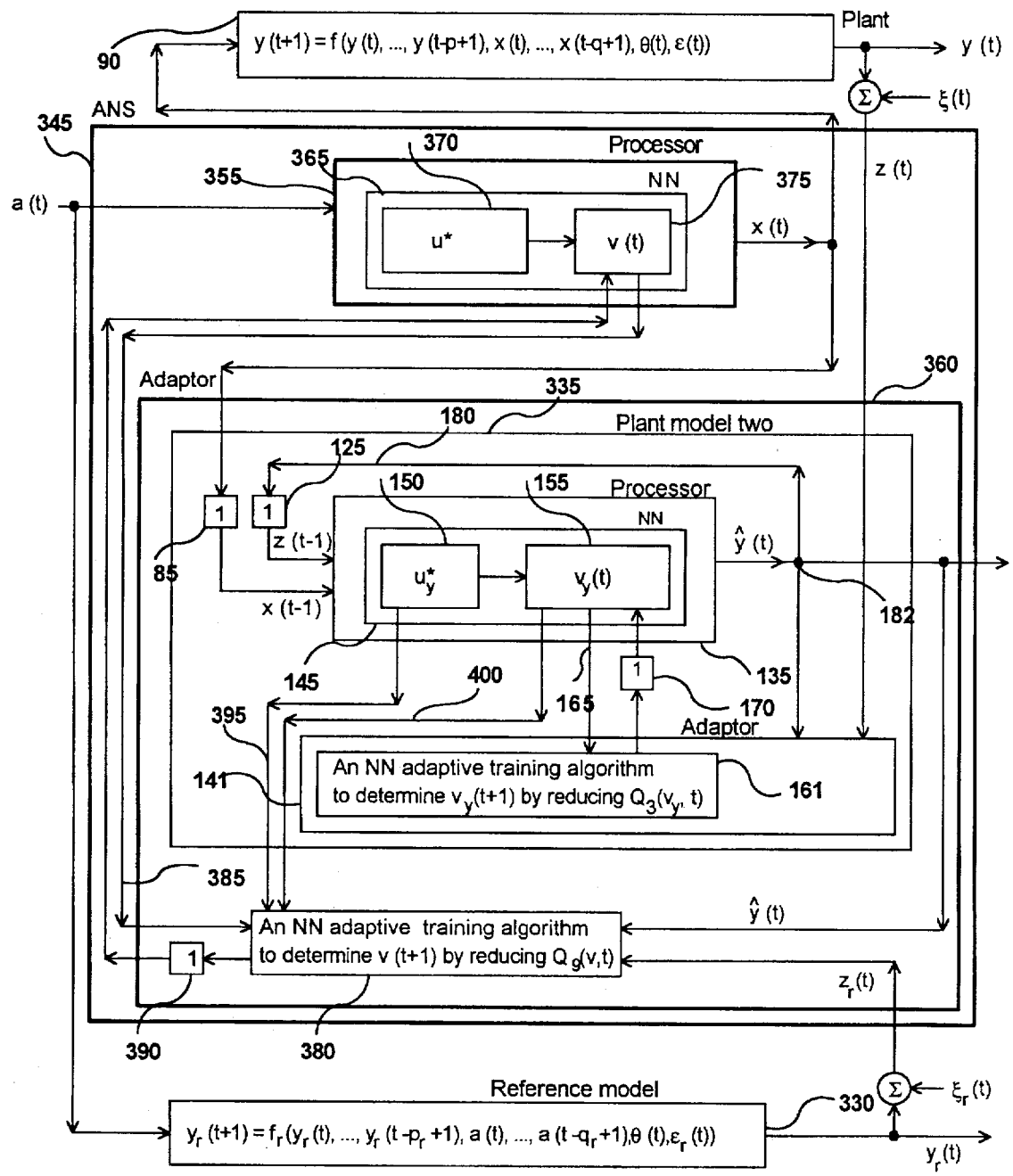

FIG. 11 shows a first example embodiment of the present invention for adaptive model reference control. In the MLP (or alternatively MLPWIN) 365, the nonadaptively adjustable weights u have been set equal to their operational values u* obtained with respect to $Q_8$ $(u,v(\theta_1), \ldots ,v(\theta_N))$ in equation (39) in a nonadaptive training. These operational values u* remain constant in the operation of the ANS until next nonadaptive training is performed. At time t, the processor 355, using the nonadaptively adjustable weights u* and the adaptively adjustable weights v(t), receives and processes a(t), and produces the control signal x(t) for the plant. The same control signal x(t) is received and processed by the plant model two 335, whose NN 145, using the nonadaptively adjustable weights $u_y$* and the adaptively adjustable weights $v_y(t)$, then outputs $\hat{y}(t)$. Here $v_y(t)$ and $v_y(t)$ are the adaptively adjustable weights of the NN 365 and the NN 145 determined at the preceding time t−1 respectively by an NN training algorithm 380 and an NN training algorithm in the plant model two 335. At time t, $v_y(t+1)$ is determined by reducing or minimizing $Q_3(v_y,t)$ in the plant model two 335. At the same time, V. (t+1) and the NNs' processing informations required to determine v(t+1) are transferred 385, 395, 400 to the NN training algorithm 380. So are the plant model two's output $\hat{y}(t)$ and the reference model's output measurement z, (t). The NN training algorithm 380 then determines v(t+1) at time t by reducing or minimizing $Q_9$ $(v,v_y(t+1),t)$ by the variation of the variable v. The values v(t+1) and $v_y(t+1)$ are then delayed by one time step and transferred into the NN 365 in the processor 355.

Figure 12:
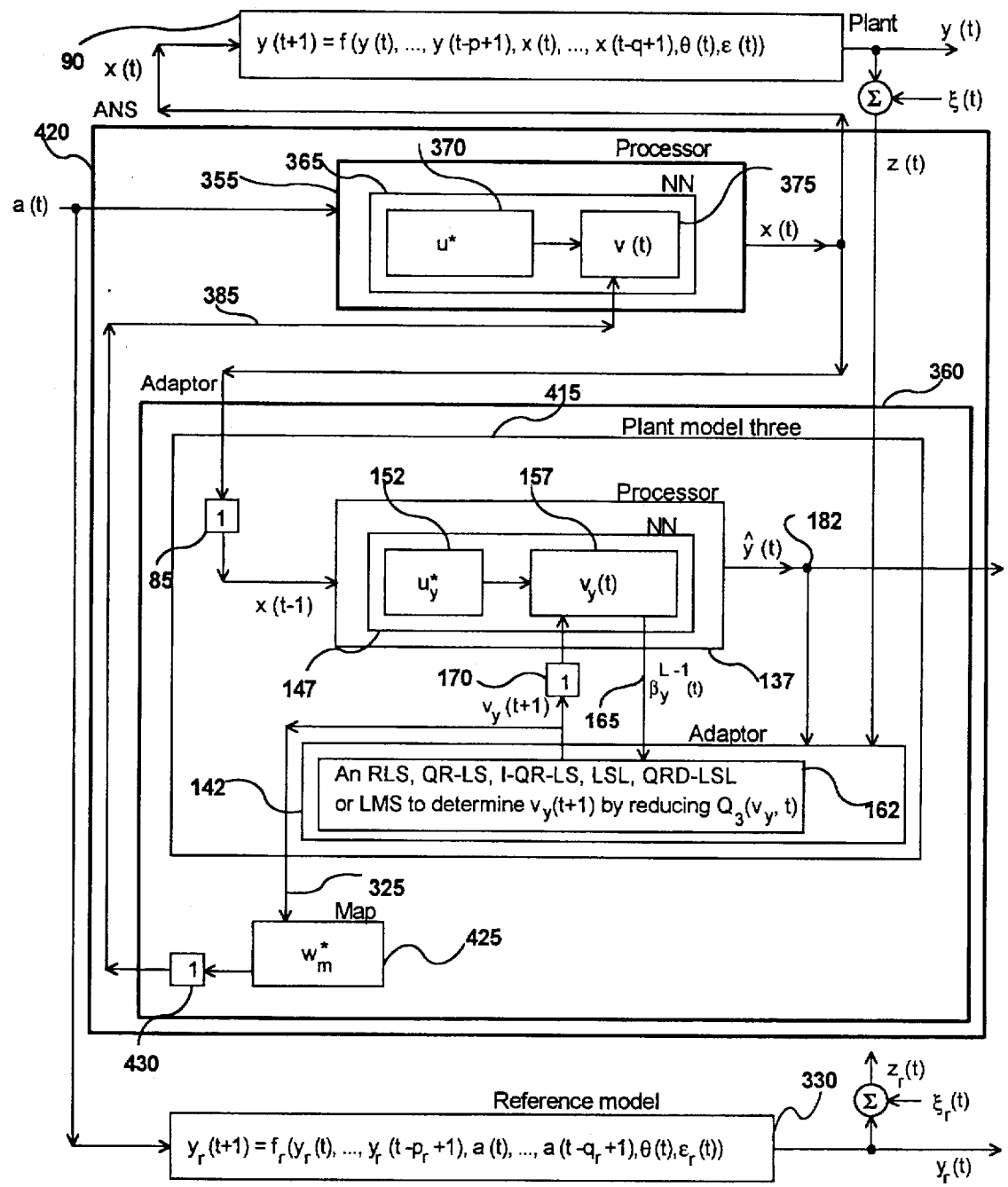

FIG. 12 shows a second example embodiment of the present invention for adaptive model reference control. In the MLP (or alternatively MLPWIN) 365, the nonadaptively adjustable weights u have been set equal to their operational values u* obtained with respect to $Q_8$ (u, $v(\theta_1), \ldots, v(\theta_N)$) in equation (39) in a nonadaptive training. These operational values u* remain constant in the operation of the ANS until next nonadaptive training is performed. At time t, the processor 355, using the nonadaptively adjustable weights u* and the adaptively adjustable weights v(t), receives and processes a (t), and produces the control signal x(t) for the plant. The same control signal x(t) is received and processed by the plant model three 415, whose NN 147, using the nonadaptively adjustable weights $u_y$* and the adaptively adjustable weights $v_y(t)$, then outputs $\hat{y}(t)$. The processing information, $\beta_y^{L-1}$ (t), is then transferred 165 to the RLS, QR-LS, I-QR-LS, LSL, QRD-LSL or LMS algorithm 142, which compares z(t) and $\hat{y}(t)$ and determines $v_y(t+1)$ by reducing or minimizing $Q_3(v_y$, t). The MLP 425 with w* then maps $v_y(t+1)$ into v(t+1). The values v(t+1) and $v_y(t+1)$ are then delayed 430, 170 by one time step and transferred into the NN 365 and the NN 147, respectively.

Figure 13:
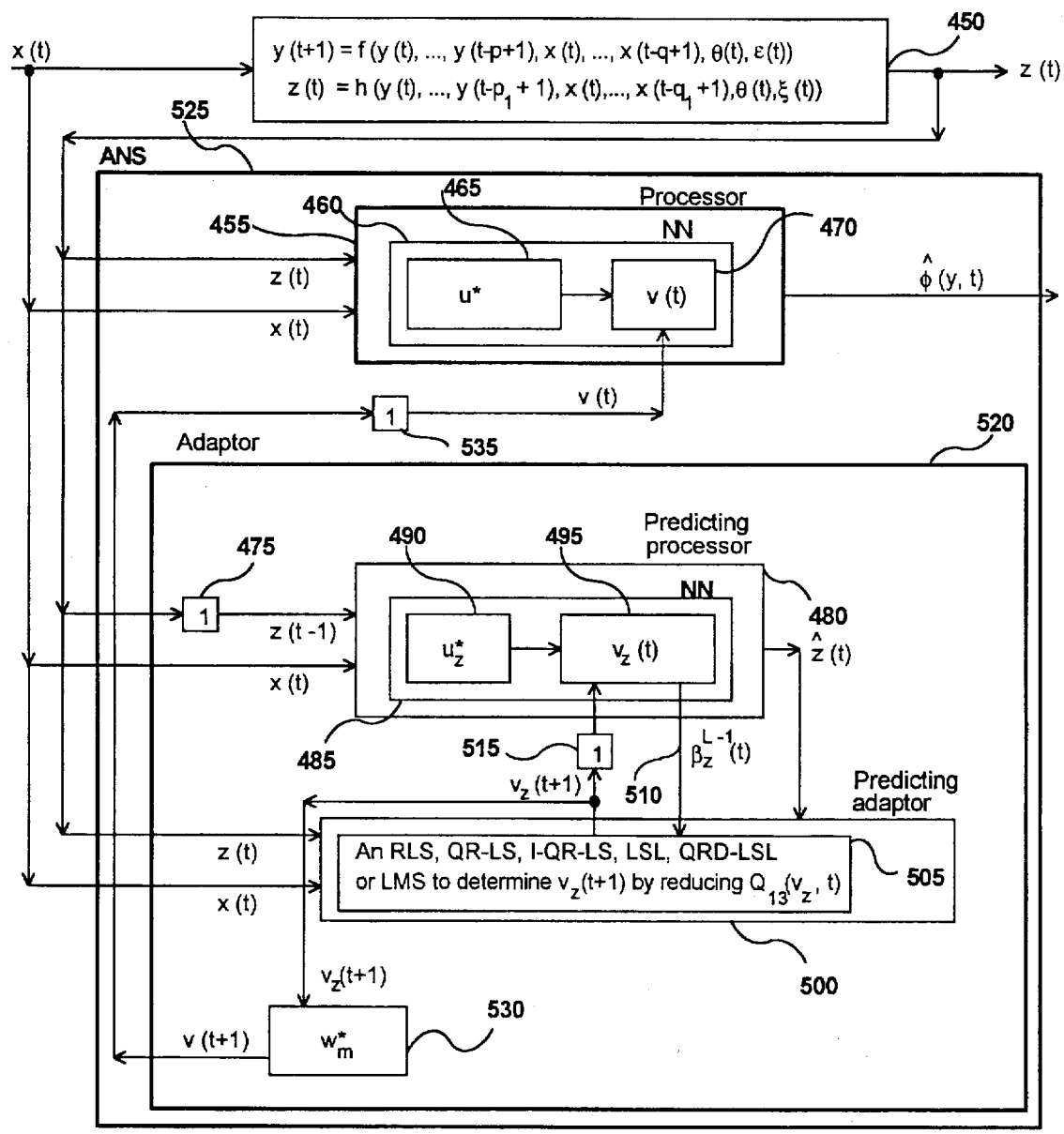

FIG. 13 shows a typical operating environment and an example embodiment of the present invention for adaptive optimal estimation. In the MLP (or alternatively MLPWIN) 460, the nonadaptively adjustable weights u have been set equal to their operational values u* obtained with respect to $Q_{11}$ (u, $v(\theta_1), \ldots, v(\theta_N)$) in equation (43) in a nonadaptive training. These operational values u* remain constant in the operation of the ANS until next nonadaptive training is performed. At time t, the processor 455, using the nonadaptively adjustable weights u* and the adaptively adjustable weights v(t), receives and processes z(t) and x(t), and produces an estimate, $\hat{\phi}(y, t)$, of $\phi(y, t)$. At the same time t, the predicting processor 480 receives and processes x(t) and z(t−1), using the nonadaptively adjustable weights $u_z$* and the adaptively adjustable weights $v_z$ (t), and produces an estimate $\hat{z}(t)$ of the measurement z(t). The processing information, $\beta_z^{L-1}$ (t), is then transferred 510 to the RLS, QR-LS, I-QR-LS, LSL, QRD-LSL or LMS algorithm 505, which also receives x(t), z(t) and $\hat{z}(t)$ and determines $v_z(t+1)$ by reducing or minimizing $Q_{13}$ ($v_z$, t). Also at time t, the MLP 530 with w* then maps $v_z$ (t+1) into v(t+1). The values v(t+1) and $v_z$ (t+1) are then delayed 535, 515 by one time step and transferred into the NN 460 and the NN 485, respectively.

Figure 14:
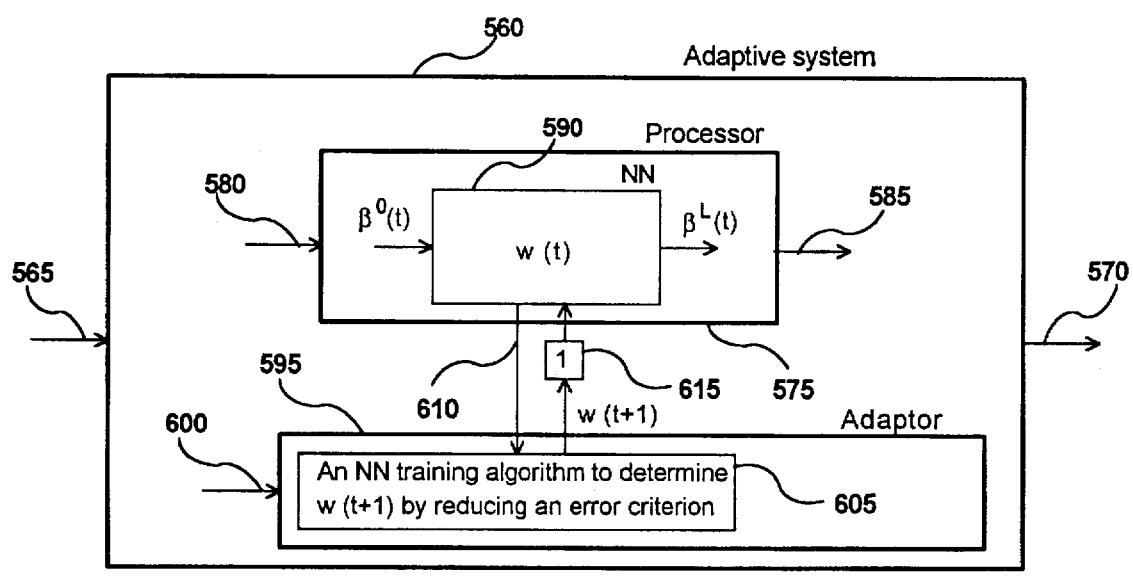

FIG. 14 shows a prior-art adaptive system, that uses an NN (neural network) with at least one hidden nonlinear neuron in its processor, for a general adaptive processing environment. The prior-art adaptive system 560 receives inputs 565 from its operating (or adaptive processing) environment, processes them through a processor 575 and an adaptor 595, and sends outputs 570 back to the operating environment, at each time t. The processor 575, comprising an NN 590 with at least one hidden nonlinear neuron, inputs some information 580 available inside the adaptive system at time t. The processor may or may not contain devices such as tapped delay lines for presenting this information 580 in a certain form to the NN 590, whose input and output vectors at time t are denoted by $\beta^o$ (t) and $\beta^L$ (t) respectively. The values, w(t), of all the adjustable weights of the NN are provided or updated by an adaptor 595. At time t, the NN 590 uses these weight values, w(t), to process this information 580 and produces outputs 585, which may be included in the adaptive system's outputs 570 and/or the adaptor's inputs 600. The adaptor 595 also receives data 600, 610 available inside the adaptive system, which data include the processing information 610 about all the adjustable weights w(t) of the NN 590. An NN training algorithm 605 in the adaptor 595 processes these data and determines the values w(t+1) of all the NN's adjustable weights for use after a delay 615 of one time step. Note that this NN training is an adaptive training performed on line during the operation of the adaptive system 560. Only the current operational data that are available and collected during the operation of the adaptive system are used in the adaptive training. Usually the computing power and memory are limited and/or expensive and real-time processing is required. No distinction is made between nonadaptively adjustable weights and adaptively adjustable weights for the NN 590.

Figure 15:
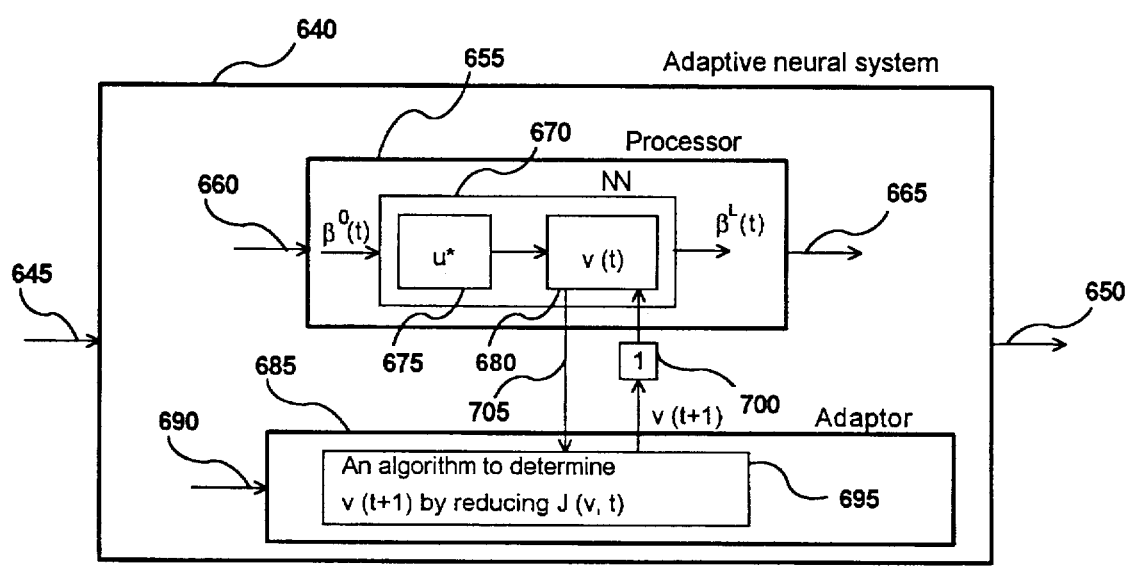

FIG. 15 shows a first preferred embodiment of the invention. The adaptive neural system (ANS) 640 receives inputs 645 from its operating (or adaptive processing) environment, processes these inputs through a processor 655 and an adaptor 685, and produces outputs 650 least one hidden nonlinear neuron, inputs some information 660 available inside the adaptive system. The processor may or may not contain devices such as tapped delay lines for presenting this information 660 in a certain form to the NN 670, whose input and output vectors at time t are denoted by $\beta^o$ (t) and $\beta^L$ (t) respectively. In the NN 670, the nonadaptively adjustable weights u 675 have been set equal to their operational values u* obtained with respect to $P(u,v(\theta_1), \ldots, v(\theta_N))$ in equation (50) in nonadaptive training. These operational values u* remain constant in the operation of the ANS until the next nonadaptive training is performed. At time t, the processor 655 inputs part or all of the information 660 from the operating environment and presents this information and possibly some of the past information in a suitable form, $\beta^o$ (t), to the NN 670 in the processor. Using u* and v(t) as the nonadaptively adjustable and adaptively adjustable weights respectively at time t, the NN 670 processes $\beta^o$ (t) to produce its output vector $\beta^L$ (t), which constitutes a substantial part, if not all, of the outputs 665 of the processor 655. At the same time t, the adaptor 685 receives information 690 from the ANS inputs 645, the processor outputs 665, and possibly other parts within the ANS 640. The adaptor also receives the NN's processing information 700 concerning the adaptively adjustable weights v(t). Using these data, an algorithm 695 in the adaptor minimizes or reduces J (v, t) in equation (51) and thereby determines the values v(t+1) of the adaptively adjustable weights v of the NN 670, which values are then delayed 700 by one time step and transferred into the adaptively adjustable section 680 for use by the NN 670 at the next time.

Figure 16:
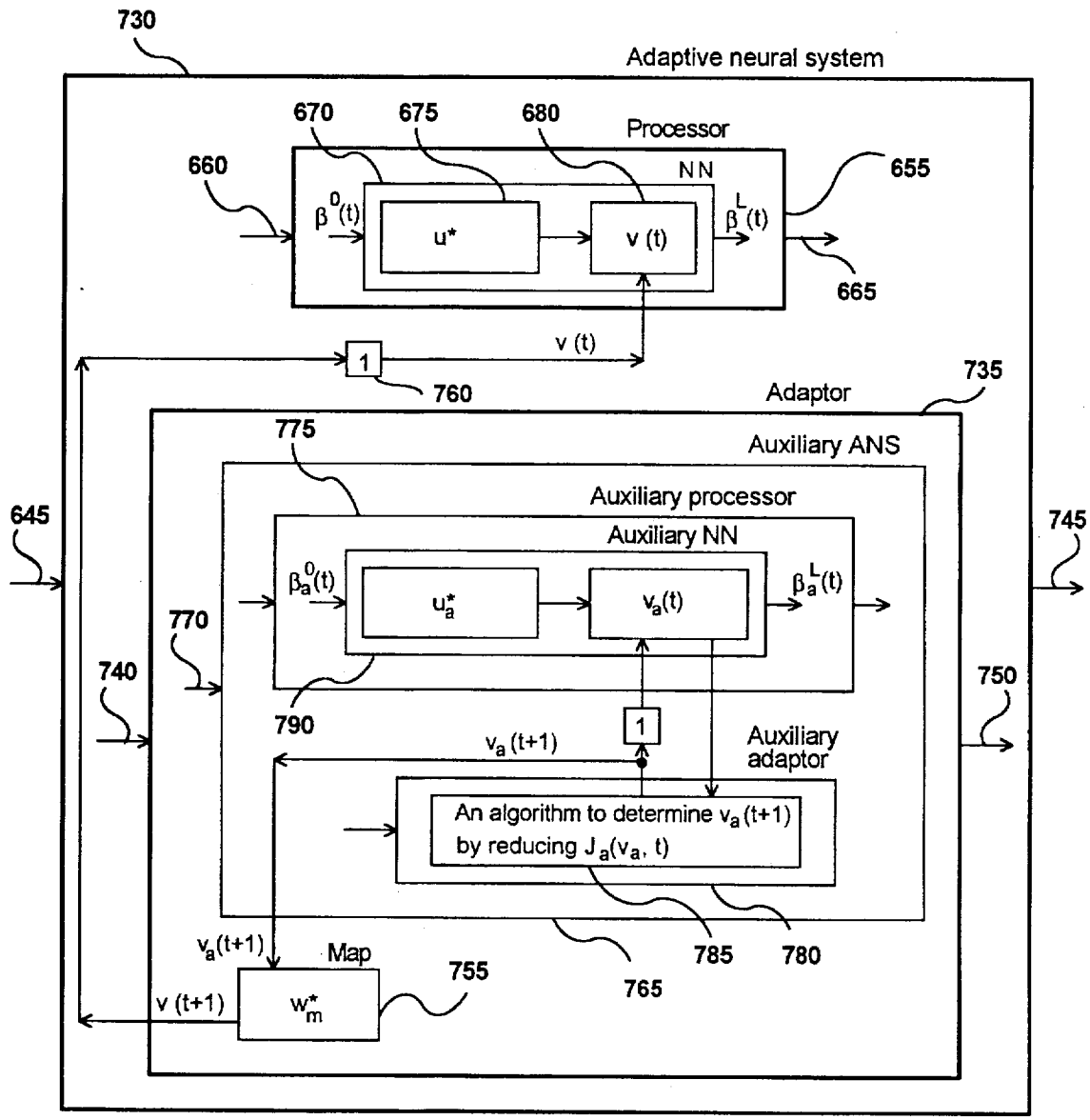

FIG. 16 shows a second preferred embodiment of the present invention. The processor 665 is the same and works in the same way as that in FIG. 15. The main difference between the ANS 730 here and the ANS 640 in FIG. 15 lies between the two different adaptors. The adaptor 735 employs a map 755 and an auxiliary ANS 765 to adaptively adjust or determine the adaptively adjustable weights 680 of the NN 670. Comprising a processor 775 and an adaptor 780, the auxiliary ANS 765 is an ANS 640 as shown in FIG. 15. The auxiliary ANS is such an ANS whose adaptive training criterion can be constructed with the information available during the operation of the ANS 730. The values, $v_a$ (t+1), of the adaptively adjustable weights of the auxiliary NN 790, that are produced by the auxiliary adaptor 780 at time t, are transformed by the map 755 into the values, v(t+1), of the adaptively adjustable weights of the NN 670 in the processor 655, which are in turn delayed 760 by one time step and transfered into the adaptively adjustable section of the NN 670. A preferred map is a mapping NN such as an MLP.

Figure 17:
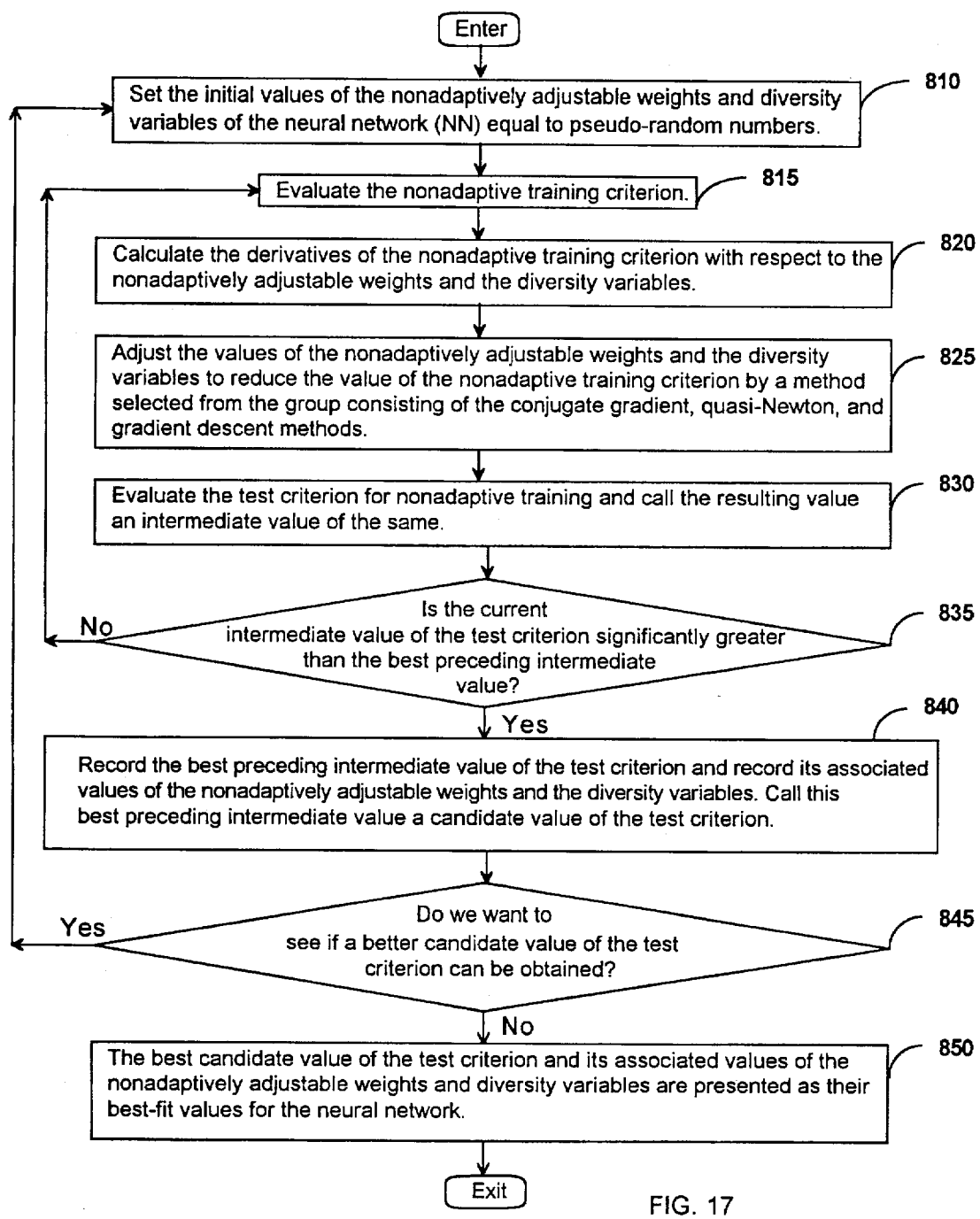

FIG. 17 shows a typical nonadaptive training method, that uses a differentiation technique, a local search optimization technique and a cross-validation technique. First, we set, in block 810, the initial values of the NN under the nonadaptive training equal to pseudo-random values. In block 815, the nonadaptive training criterion is evaluated. Using a differentiation technique such as BPTT and RTRL, the derivatives of the nonadaptive training criterion with respect to the nonadaptively adjustable weights and the diversity variables are then calculated in block 820. In block 825, local search method such as that of a conjugate gradient, quasi-Newton or gradient descent method is used to adjust the values of the nonadaptively adjustable weights and the diversity variables of the NN. The test criterion for nonadaptive training is evaluated in block 830. Call it an intermediate value of the test criterion. If it is determined in block 835 that the current intermediate value of the test criterion is not significantly greater than the best preceding intermediate value, we repeat blocks 815 to 835. Otherwise, we record the best preceding intermediate value of the test criterion and record its associated values of the nonadaptively adjustable weights and the diversity variables. We call the best preceding intermediate value a candidate value of the test criterion in block 840. If it is decided in block 845 that we want to see if a better candidate value of the test criterion can be obtained, we go to block 810. Otherwise, the best candidate value of the test criterion and its associated values of the nonadaptively adjustable weights and the diversity variables are presented as the best fit values of the test criterion, the nonadaptively adjustable weights and the diversity variables respectively in block 850.

Figure 18:
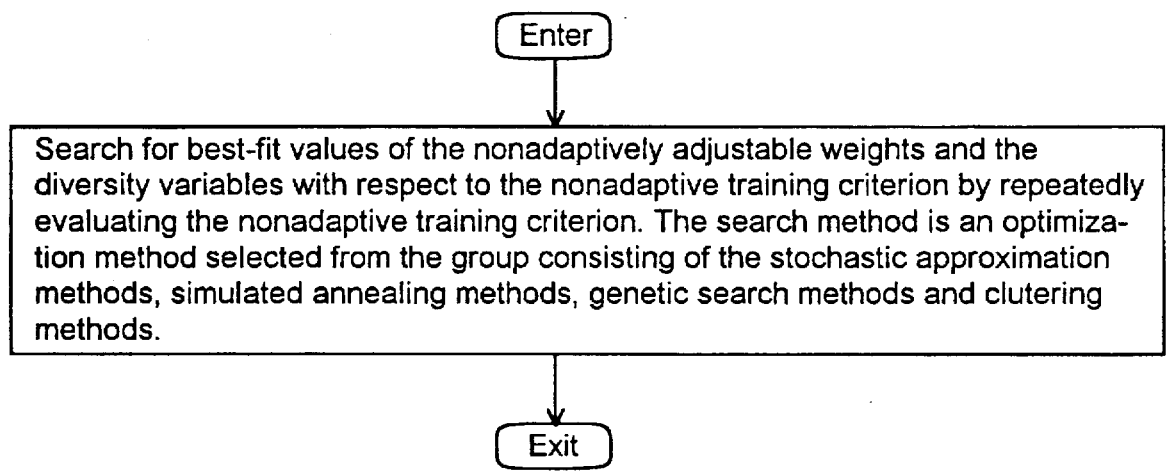

FIG. 18 shows a nonadaptive training method that requires only evaluations of the nonadaptive training criterion, but does not require calculations of its derivatives. Such an optimization method can be one selected from the group consisting of the stochastic approximation methods, simulated annealing methods, genetic search methods and clustering methods.

DESCRIPTION OF PREFERRED EMBODIMENTS

An adaptive neural system in accordance with the teachings of the present invention comprises a neural network (NN), comprising hidden nonlinear neurons (e.g. neurons with a nonlinear activation or basic function), adaptively adjustable weights and nonadaptively adjustable weights; and adapting means for adjusting and/or determining the adaptively adjustable weights. The NN functions as a processor that processes a discrete tine (or discrete index) process (or sequence of patterns or events) to achieve the purpose of adaptive processing in an intended application.

As opposed to the prior art adaptive linear filters and adaptive NNs as briefly discussed earlier in the section on background, this adaptive neural system (ANS) has the following advantages: The inclusion of hidden nonlinear neurons (e.g. neurons with a nonlinear activation and/or basic function) in the ANS (adaptive neural system) allows it to provide nonlinear processing capability. Distinguishing nonadaptively adjustable weights from adaptively adjustable weights in the ANS and having nonadaptively adjustable weights determined only in a nonadaptive (or preoperational, or off-line) training enable the ANS to make the best use of the preoperational information about the operating environment and, at the same time, help the ANS focus on learning about and adapting to an unknown and/or changing environmental parameter or another form of the missing information about the operating environment. Adaptively adjusting, on-line during the ANS's operation, its adaptively adjustable weights that are judiciously selected from an NN with a judiciously selected architecture allows the use of a simpler, faster and more efficient adaptive algorithm and, equally importantly, helps reduce or even eliminate poor local minima of the performance surface (or adaptive training criterion) for the adaptive training.

Neural Networks and Their Elements and Structures

Figure 1:
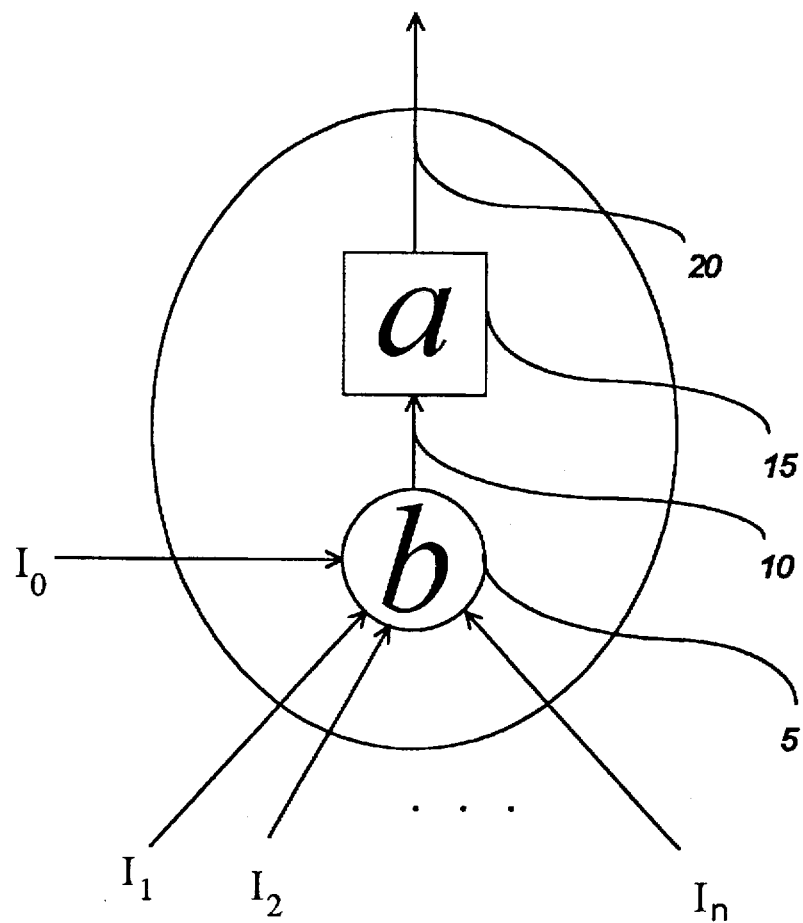
FIG. 1 is a schematic diagram of a typical neuron, which consists of a basis function b and an activation function $\alpha$, forming a function composition. The basis function 5 is usually a finite series expansion of the bias $I_0$ and inputs, $I_1$, ..., $I_n$, to the neuron which expansion is comprised of polynomial, rational, trigone metric, exponential, logarithmic, hyperbolic, transcendental, wavelet, and/or spline element(s). The value of the basic function at the link 10 is $b(I_0, I_1, \ldots, I_n)$. The activation function 15 is simply a linear or nonlinear transformation, which is a sigmoidal, exponential, wavelet, spline, polynomial, rational, trigonometric, hyperbolic, logarithmic, other transcendental function or a combination thereof. The activation level bf 20 of the neuron is thus $\alpha(b(I_0, I_1, \ldots, I_n))$.

A neuron or node is a processing element that receives input numbers and produces an output number, which is called the activation level of the neuron or node. Referring to FIG. 1, a typical neuron (or node) consists of two functions, a basis function, I, and an activation function, a, forming a function composition. The basis function 5 is usually a finite series expansion of the bias $I_0$ and inputs, $I_1$, ..., $I_n$, to the neuron, which expansion is comprised of polynomial, rational, trigonometric, exponential, logarithmic, hyperbolic, transcendental, wavelet, and/or spline element(s). The value of the basic function at the link 10 is $b(I_0, I_1, \ldots I_n)$. The activation function 15 is simply a linear or nonlinear transformation, which is a sigmoidal, exponential, wavelet, spline, polynomial, rational, trigonometric, hyperbolic, logarithmic, other transcendental function or a combination thereof. The activation level 20 of the neuron is thus $a(b(I_0, I_1, \ldots, I_n))$. If the activation level, $a(b(I_0, I_1, \ldots, I_n))$, of a neuron is a nonlinear function of $I_0$, $I_1, \ldots, I_n$, the neuron is called a nonlinear neuron.

Figure 2:
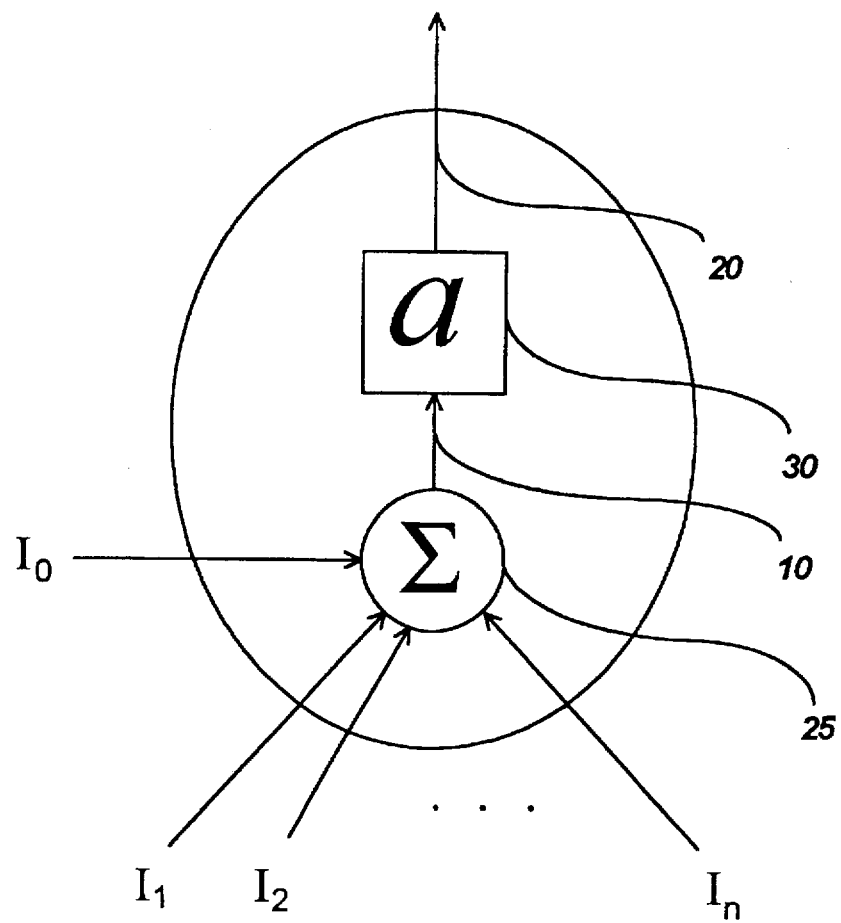
FIG. 2 is a schematic diagram of a widely-used neuron, which is a special case of the typical neuron depicted in FIG. 1. It consists of a summer 25 and an activation function 30 denoted by $\Sigma$ and a respectively. The activation function is a sigmoid function such as the hyperbolic tangent function, tanh x, and the logistic function, $1/(1+e^{-x})$. Denoting the inputs to the neuron by $I_1, I_2, \ldots, I_n$, and the bias for the neuron by $I_0$, the basic function here is $\Sigma_{i=0}^{n} I_i$ and the activation level of the neuron at its output terminal 20 is $\alpha(\Sigma_{i=0}^{n} I_i)$.

A widely used neuron, which is a special case of the above typical neuron, is depicted in FIG. 2. It consists of a summer 25 and an activation function 30 denoted by $\Sigma$ and a respectively. The activation function is a sigmoid function such as the hyperbolic tangent function, tanh x, and the logistic function, $1/(1+e^{-x})$. Denoting the inputs to the typical neuron by $I_1, I_2, \ldots, I_n$, and the bias for the neuron by $I_0$, the basic function here is $\Sigma_{i=0}^{n} I_i$ and the activation level of the neuron at its output terminal 20 is $a(\Sigma_{i=0}^{n} I_i)$.

A constant that affects a neuron's processing such as a constant in the basic and activation functions of the neuron is called a parameter or a weight of the neuron. A delayless connection is means for effecting a weighted signal transfer from one neuron to another neuron. More specifically, a delayless connection is means for multiplying the activation level of a neuron by a number, which is called the weight of the delayless connection, and sending the resulting product to another neuron as one input of this neuron. A weight of a delayless connection is sometimes called a delayless weight. A delay connection is means for multiplying a first neuron's activation level by a number, which is called the weight of the delay connection, holding the resulting product for at least one unit of time, and then sending this product to a second neuron as one input of this second neuron. The second neuron may or may not be the same as the first. A weight of a delay connection is sometimes called a delay weight. By a connection and a weight of a connection, we mean a delayless or delay connection and a weight of a delayless or delay connection, respectively, unless indicated or implied otherwise. The bias for a neuron is a parameter of the neuron, but often treated as the weight of a delayless connection leading into this neuron from a constant activation level 1. A (delayless and/or delay) weight may be set equal to one or some other constant. It may also be determined in a process or procedure called training to be elaborated on later. A weight of a neuron and a weight of a connection leading to said neuron are said to be local to said neuron. It is understood that the word "time" herein refers to the index of a sequence, which may be an index of time or may simply be the numbering or index of patterns or events. In the latter case, the phrases, "a time unit" and "a time step" mean "a change of the numbering or index by one." A neural network (NN) is a plurality of neurons and a plurality of connections (delay and/or delayless connections), which include one or more neurons receiving input signals from outside the NN (neural network), which neuron(s) are called input neurons and one or more neurons sending out output signals to outside the NN, which neuron(s) are called output neurons. An input signal from outside the NN is referred to as an exogenous input or simply an input of the NN. An input neuron and an output neuron are sometimes called an exogenous input neuron and an outward output neuron, respectively. Those neurons that are neither input neurons nor output neurons are called hidden neurons of the NN. (It is understood that if a neuron in an NN is treated as a hidden or output neuron in the training criterion for training the NN, said neuron is a hidden or output neuron respectively. An act of examining the activation level of a neuron or using it for a purpose other than the adaptive processing purpose that the NN is trained for or both, online or offline, are not a sufficient condition for the neuron to be an output neuron.) A nonlinear neuron that is neither an input neuron nor an output neuron is called a hidden nonlinear neuron. There may be one or more different types of neuron in an NN. For instance, an input neuron may only serve to distribute its single exogenous input signal through connections to some other neuron(s) and an output neuron may only serve to evaluate the sum of its bias and input signals, which arrive through connections from other neurons.

Consider an NN whose N neurons each have a summer and an activation function. Let the neurons in the NN be numbered 1 through N; the activation function of neuron n be denoted by $a_n$; the set of neurons each having a connection leading to neuron n with a delay of m time units be denoted by $D_m(n)$; the weight of the connection from neuron j to neuron i be denoted by $w_{ij}$; the activation level of neuron n at time t be denoted by $\beta_n(t)$; the exogenous input to neuron n be denoted by $I_n$; the bias for neuron n be denoted by $w_{n0}$; and the maximum connection delay be denoted by M. Then at time t, the processing performed by neuron n is $$\eta_n(t) = I_n + w_{n0} + \sum_{m=0}^{M} \sum_{j \in D_m(n)} w_{nj}\beta_j(t-m),$$

$$\beta_n(t) = a(\eta_n(t)).$$

Figure 3:
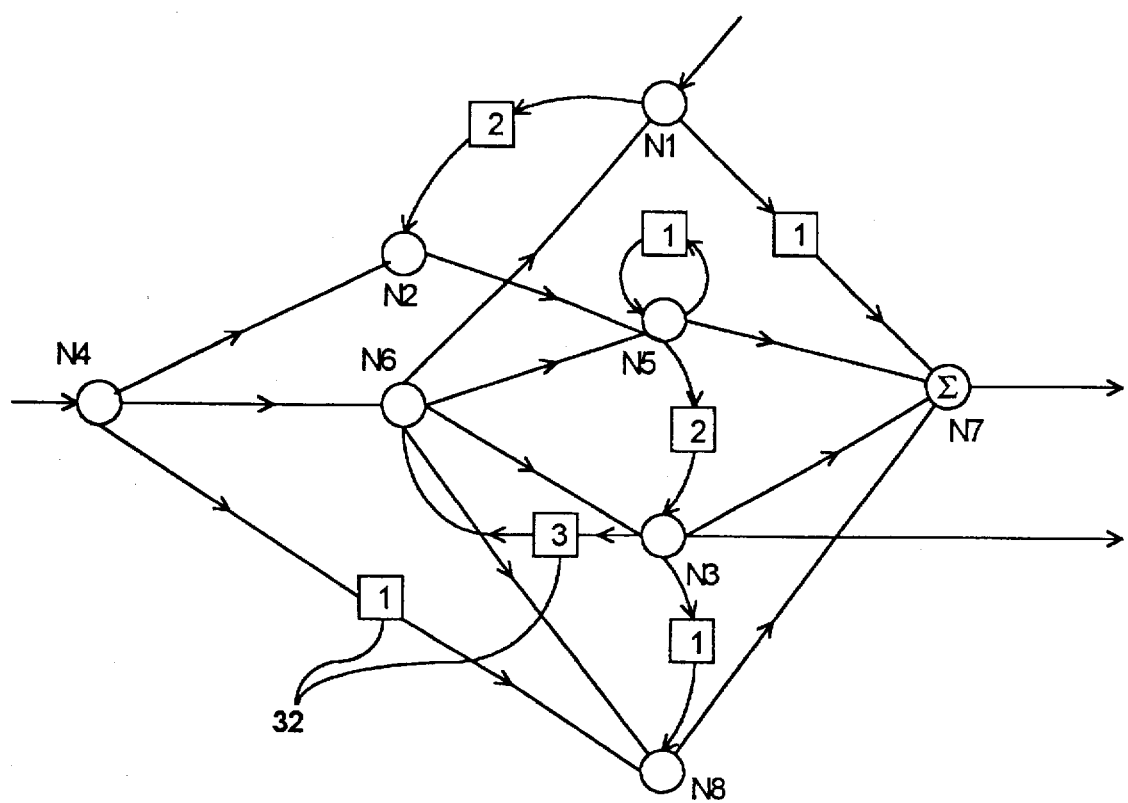
FIG. 3 shows an example neural network (NN). It contains 8 neurons, which are numbered N1 through N8 and represented by circles in the figure. Neurons N1 and N4 are the input neurons receiving exogenous inputs. Neurons N3 and N7 are the output neurons sending out output signals to outside the NN. Both the basic and activation functions of Neuron N4 are the identity function whose input and output are identical. Neuron 4 simply distributes its single input signal to its succeeding neurons N2, N6 and N8. Neuron N7 is simply a summer, which sums the activation levels of N7's preceding neurons Ni, N5, N3 and N8. Neurons Ni, N2, N3, N5, N6 and N8 are of the same type, whose basic function is a summer and whose activation function is the hyperbolic tangent function, tanh x. A delayless connection is represented by a line with an arrowhead indicating the direction of the signal transfer. A delay connection is represented by two lines with arrowheads connected in series with a box 32 in between. The box encloses a number that indicates the number of time steps that the connection holds a signal before it transfers the signal.

An example NN is shown in FIG. 3. It contains 8 neurons, which are numbered Ni through N8 and represented by circles in the figure. Neurons Ni and N4 are the input neurons receiving exogenous inputs. Neurons N3 and N7 are the output neurons sending out output signals to outside the NN. Both the basic and activation functions of Neuron N4 are the identity function whose input and output are identical. Neuron 4 simply distributes its single input signal to its succeeding neurons N2, N6 and N8. Neuron N7 is simply a summer, which sums the activation levels of N7's preceding neurons Ni, N5, N3 and N8. Neurons Ni, N2, N3, N5, N6 and N8 are of the same type, whose basic function is a summer and whose activation function is the hyperbolic tangent; function, tanh x. A delayless connection is represented by a line with an arrowhead indicating the direction of the signal transfer. A delay connection is represented by two lines, each with an arrowhead, connected in series with a box 32 in between. The box encloses a number that indicates the number of time steps that the connection holds a signal before it transfers the signal.

The example NN has a layer structure: We observe that at a discrete time, neuron N4's activation level must be available, before all the processings in neurons N2 and N6 can be performed. Although N2 and N6 receive signals from Ni and N3 respectively, these signals are delayed signals and are thus available from preceding discrete times. Therefore, as soon as the activation level of N4 becomes available, N2 and N6 can perform their processings and make their activation levels available for other neurons. Similarly, as soon as the activation levels of N2 and N6 become available, the processings of neurons Ni, N5, N3 and N8 can be performed, whose activation levels are needed in neuron N7's processing. Hence, the 4 sets of neurons, {N4}, {N2, N6}, {Ni, N5, N3, N8}, and {N7}, form 4 layers to be called layer 0, layer 1, layer 2, and layer 3, respectively, of the example NN.

This observation can be easily generalized: Given an NN, we ignore the delay connections and examine the order in which the neurons' processings (4) can take place. Those neuron(s) whose processing(s) can be performed simultaneously form a layer. The resulting layers are then numbered layer 0, layer 1, . . . , in their processing order. Notice that a delayless connection must feed forward from a layer to a higher-ordered layer, but a delay connection may either feed forward to a higher-numbered layer or feed back to the same or a lower-numbered layer. A connection is called a feed-forward connection or a feedback connection, depending on whether it feeds forward or backward.

Recall from the graph theory that a directed graph G consists of two sets, V and E, V being a finite nonempty set of vertices and E being a set of directed pairs of vertices called edges. An edge is represented by a directed pair $(V_i, V_j)$, where $V_i$ is the tail and $V_j$ is the head of the edge. A path from vertex $V_p$ to vertex $V_q$ in graph G is a sequence of vertices, $V_p, V_{i_1}, V_{i_2}, \ldots, V_{i_n}, V_q$, such that $(V_p, V_{i_1}), (V_{i_1}, V_{i_2}), \ldots,$ and $(V_{i_n}, V_q)$ are edges in E. A simple path is a path in which all vertices except possibly the first and last are distinct. A cycle is a simple path in which the first and last vertices are the same. A very special case of a cycle is a vertex $V_p$, if $(V_p, V_p)$ is an edge in E. The terminology of directed graphs used here can be found in the book by E. Horowitz and S. Sahni, *Fandamentals of Data Structure*, Computer Science Press, Inc. (1976).

Ignoring the exogenous inputs and the connection delays of an NN, the NN can be viewed as a directed graph with the neurons as the vertices and the (delay and/or delayless) connections as the edges. A neuron on a cycle is called a cyclic neuron. A neuron that is not a cyclic neuron is called a noncyclic neuron. All the neuron(s) and connection(s) that have a path to a cyclic neuron form the recursive section of the NN. The rest form the nonrecursive section. Expressing the NN's output(s) as a function of the inputs, the delayed activation levels (held by the delay connections), and the (connection and neuron) weights of the NN, a weight from the nonrecursive section that appears linearly is called a linear weight and a connection with a linear weight is called a linear connection. A weight or connection that is not linear is called a nonlinear weight or connection, respectively. The set of all the linear connection(s), the neuron(s) at the tail(s) of these linear (connection(s), and the linear weight(s) of neuron(s) with a linear weight is called the linear section of the NN. The rest of the NN is called the nonlinear section of the NN. The intersection of the nonlinear section and the nonrecursive section is called the nonlinear subsection of the nonrecursive section of the NN.

In the example NN shown in FIG. 3, there are two cycles. One cycle is the sequence, N5, N3, N6 and N5, because (N5, N3), (N3, N6) and (N6, N5) are connections of the NN. The other cycle is N5 itself, since (N5, N5) is a self-feedback connection in the example NN. Hence, N5, N3 and N6 are cyclic neurons. Observe that N6, N1, N2 and N5 form a path to a cyclic neuron, N5; that N4, N2 and N3 form another path to a cyclic neuron, N3; and that N4 and N6 form a third path to a cyclic neuron, N6. Therefore, the neurons, N4, N2, N6, Ni, N5 and N3, together with the connections, (N4, N2), (N4, N6), (N2, N5), (N2, N3), (N6, N1), (N6, N5), (N6, N3), (Ni, N2), (N5, N3), (N3, N6) and (N5, N5), form the recursive section of the example NN. The neurons, N8 and N7, together with the connections, (N4, N8), (N6, N8), (N3, N8), (N1, N7), (N5, N7), (N3, N7) and (N8, N7), form the nonrecursive section of the example NN. Since the activation functions of N1, N5, N3 and N8 are nonlinear, the only linear weights of the example NN are (Ni, N7), (N5, N7), (N3, N7) and (N8, N7).

Depending on the structure, there are different types of NN: An NN with at least one delay connection is called a recurrent NN. An NN without a delay connection is called a nonrecurrent NN. An NN with at least one cyclic neuron is called a recursive NN. An NN without a cyclic neuron is called a nonrecursive NN. While a nonrecursive NN has an empty recursive section, a recursive NN has a nonempty recursive section. We note that a recursive NN must be a recurrent NN, but a recurrent NN may not be a recursive NN. A recurrent NN is a discrete time dynamic system with all the activation levels of the recurrent NN, that are held by the delay connections at a time, as its dynamic state at the time. The dynamic state of a recurrent NN, in which an operation of the recurrent NN is initiated, is called the Initial dynamic state of the recurrent NN for the operation. The components (or activation levels) of an initial dynamic state of a recurrent NN are viewed as weights of the recurrent NN. By the weights of an NN, we refer to the weights of the connections, the parameters of the neurons, and the components of the initial dynamic state, that exist in the NN.

Training an NN means determining and/or adjusting some or all of the weights of the NN substantially through a process of reducing the value of a training criterion by the variation of these weights. Here the training criterion is a mathematical function of these weights describing the error incurred by the NN, which is constructed with simulated, experimental, and/or operational data about the operating environment of the NN. These data that are used to construct the training criterion are called the training data. A training of an NN, in which simulated data, experimental data, and/or operational data collected in previous operations are used as training data, and/or which is conducted off-line (before or between operations of the NN), is called a nonadaptive training. A training of an NN, in which only the operational data made available in the on-going operation of the NN is used as the training data, and/or which is conducted on-line during the on-going operation, is called an adaptive training. The training criteria that are used for a nonadaptive training and an adaptive training are respectively called a nonadaptive training criterion and an adaptive training criterion. Some of the weights of an NN may be set equal to real numbers including 0 and 1, which are held constant throughout the trainings and operations of the NN, while the other weights are determined and/or adjusted during nonadaptive and/or adaptive trainings. The former weights are called fixed weights and the latter weights are called adjustable weights of the NN. An adjustable weight that is determined and/or adjusted in a nonadaptive training is called a nonadaptively adjustable weight. Similarly, an adjustable weight that is determined and/or adjusted in an adaptive training is called an adaptively adjustable weight. Such a distinction between a nonadaptively adjustable weight and an adaptively adjustable weight is not made for the prior art adaptive NNs, because all the adustable weights in a prior art adaptive NN are adjusted and/or determined in both the nonadaptive and/or adaptive trainings of the adaptive NN. The totality of adjustable weights are denoted by w unless specified otherwise. The totalities of nonadaptively adjustable weights and adaptively adjustable weights are denoted by u and v, respectively. The values of the nonadaptively adjustable weights that are obtained in a nonadaptive training and used (without being adjusted) in an adaptive training are called the operational values of the nonadaptively adjustable weights. The phrase, "determine and/or adjust," is abbreviated by either "determine" or "adjust." This holds for all tenses of the phrase.

The collection of all the NNs with some common configurational feature(s) is called an NN paradigm. For instance, the existence or nonexistence of a connection among the neurons in a neuron layer is a configurational feature. The collection of all the NNs of the same NN paradigm that have the same number of neurons of each type, the same number of delay connections, the same number of delayless connections, the same number of input neurons, the same number of output neurons, and the same configuration thereof is called an NN architecture. In other words, two NNs are of the same architecture if and only if they are identical except with possibly different weights on the connections, different parameters in the neurons, and/or different initial dynamic states. Whenever these connection weights, neuron parameters, and/or initial dynamic state are specified for an NN architecture, the NN is completely specified. Recall that these connection weights, neuron parameters and/or initial dynamic state of an NN are all called the weights of the NN, unless a distinction between the connection weights, the neuron parameters, and/or initial dynamic state is necessary and made clear in the context.

Example Neural Network Paradigms

Some example NN paradigms are described in the following.

Figure 4:
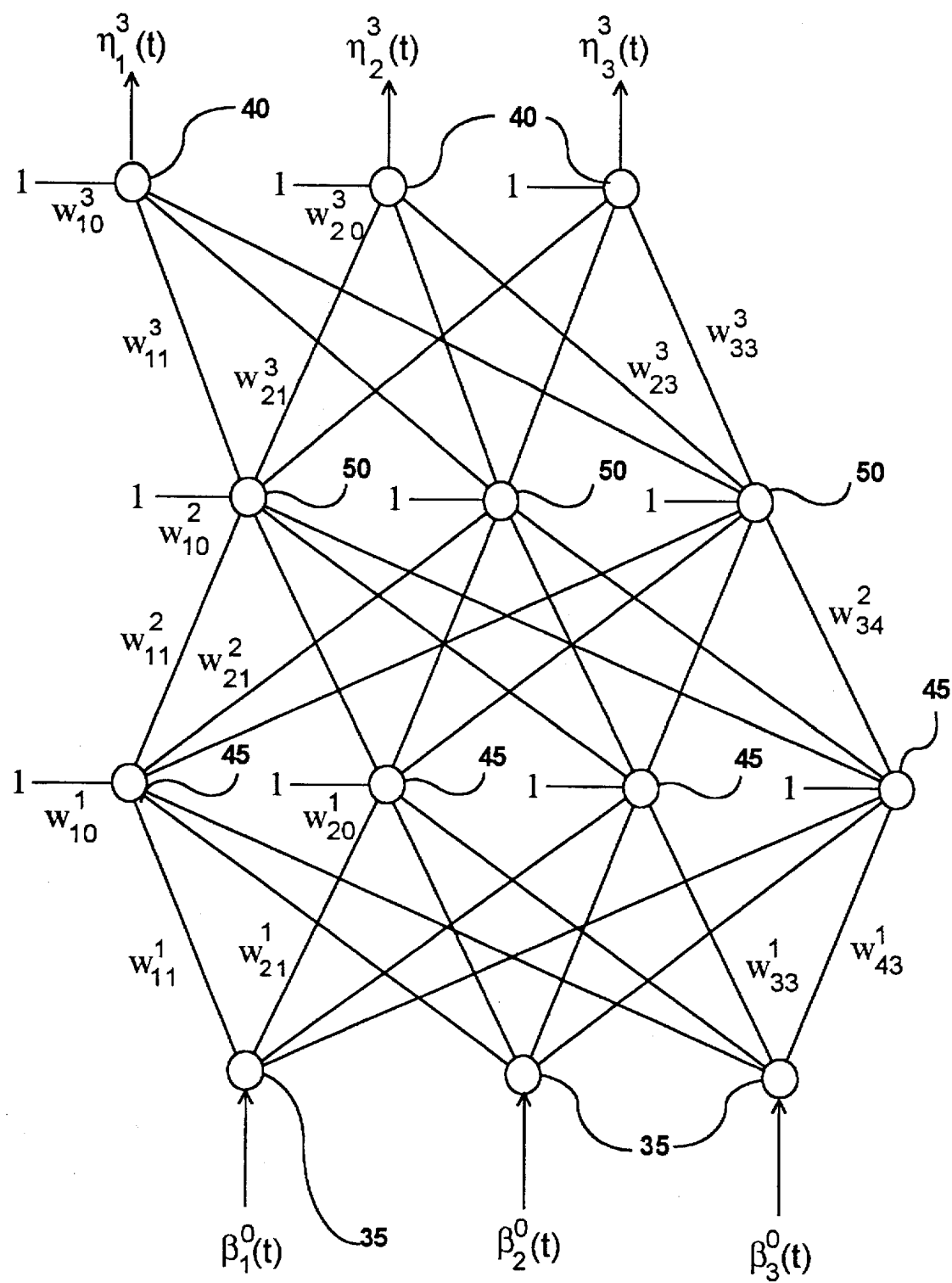
FIG. 4 shows an example multilayer perceptron (MLP). It has 3 input neurons 35 in the zeroth layer, 4 hidden neurons 45 in the first layer, 3 hidden neurons 50 in the second layer, and 3 output neurons 40 in the third and last layer. All the neurons are of the kind shown in FIG. 2. The input neurons 35, whose activation functions are the identity function, simply distribute the exogenous input, $(\beta_1^0(t), \beta_2^0(t), \beta_3^0(t))$, to the neurons in the first layer. The output neurons 40, whose activation functions are also the identity function, are summers, producing outward output, $(\eta_1^3(t), \eta_2^3(t), \eta_3^3(t))$. The activation functions of the neurons in the first and second layers are the hyperbolic tangent, tanh x. All the connections in the example MLP are delayless connection.

1. Multilayer perceptrons (MLPs): MLPs are perhaps the most popular NN paradigm. An example MLP is depicted in FIG. 4. It has 3 input neurons 35 in the zeroth layer, 4 hidden neurons 45 in the first layer, 3 hidden neurons 50 in the second layer, and 3 output neurons 40 in the third and last layer. All the neurons are of the kind shown in FIG. 2. The input neurons 35, whose activation functions are the identity function, simply distribute the exogenous input, $\beta_1^0(t)$, $\beta_2^0(t)$, $\beta_3^0(t)$, to the neurons in the first layer. The output neurons 40, whose activation functions are also the identity function, are summers, producing outward output, $(\eta_1^3(t), \eta_2^3(t), \eta_3^0(t))$. The activation functions of the neurons in the first and second layers are the hyperbolic tangent, tanh x. All the connections in the example MLP are delayless connection.

The neurons in each layer are numbered from left to right in FIG. 4. The "numbering of a neuron" refers to this numbering in the neuron's layer. The symbol $w_{ij}^1$ denotes the weight on the delayless connection from neuron j in layer l–1 to neuron i in layer 1. Only a few of the $w_{ij}^1$ are shown in FIG. 4 to avoid cluttering the figure. The bias for neuron i in layer l is denoted by $w_{i0}^1$, which is viewed as "the weight on the delayless connection leading into i in layer 1 from neuron 0 in layer l–1, whose activation level is set always equal to 1." Layer l of the MLP consists of the neurons in layer l and the connections leading into them. The totality of the weights in layer l is denoted by $w^1$.

Let us now see how the example MLP depicted in FIG. 4 processes information at time t. Recalling that component i of the input at time t is denoted by $\beta_i^0(t)$, the activation level $\beta_i^1(t)$ of neuron i in layer 1 and the weighted sum $q^1.(t)$ in the same neuron at time t satisfy, for l=1, 2, $$\beta_i^l(t) = a_i^l(\eta_i^l(t)), \quad (4)$$

$$\eta_i^l(t) = w_{i0}^l + \sum_{j=1}^{n_{l-1}} w_{ij}^l \beta_j^{l-1}(t), \quad (5)$$

where $n_{l-1}$ denotes the number of neurons in layer l–1 and $a_i^l(x)$ is the activation function of neuron i in layer l. The output $\eta_i^L(t)$ for L=3, at output neuron i is then determined by $$\eta_i^L(t) = w_{i0}^L + \sum_{j=1}^{n_L} w_{ij}^L \beta_j^{L-1}(t). \quad (6)$$

Depending on the application, there can be, in an MLP, any number L of layers, any number $n_0$ of input neurons, any number $n_L$ of output neurons, and any number $n_l$ of neurons in each hidden layer l. Although the hyperbolic tangent function tanh x and the logistic function $1/(1+e^{-x})$ are perhaps most widely used as the activation functions in the MLPs in the literature, another function or functions selected from the group consisting of sigmoidal, wavelet, spline, polynomial, rational, trigonometric and exponential functions can also be used as the activation functions $a_i^l$ in MLPs to make the processors in the adaptive neural systems in accordance with the present invention. It is noted that all the MLPs with one and the same activation function for hidden neurons form one MLP paradigm. It will be appreciated that there may be more than one type of activation function in an MLP paradigm and the activation function of an input neuron does not have to be an identity function. By setting some delayless weights $w_{ij}$ equal to zero, differently configured MLPs, which are not fully connected, can be obtained. Notice that the equations, (4), (5) and (6), for l=1, ..., L–1, possibly with some minor modifications are valid for the processing of most MLPs.

Since there are no delay connections in an MLP, it does not have a recursive section and is thus a nonrecursive NN. If all the output neurons are summers, equation (6) is valid for every output component of an MLP. Hence all the weights, $w_{ij}^L$, in layer L, appear linearly in the MLP's outputs and are thus linear weights of the MLP. Since every other weight appears in the MLP's outputs through nonlinear activation functions, the weights, $w^L$, constitute the linear section of the MLP.

2. Multilayer perceptrons with interconnected neurons (MLPWINs): An MLPWIN is formed from a multilayer perceptron (MLP) by connecting some or all of the neurons in at least one layer of the MLP. There is a unit time delay device on each such connection, making it a delay connection. MLPWINs first appeared in J. L.

Figure 5:
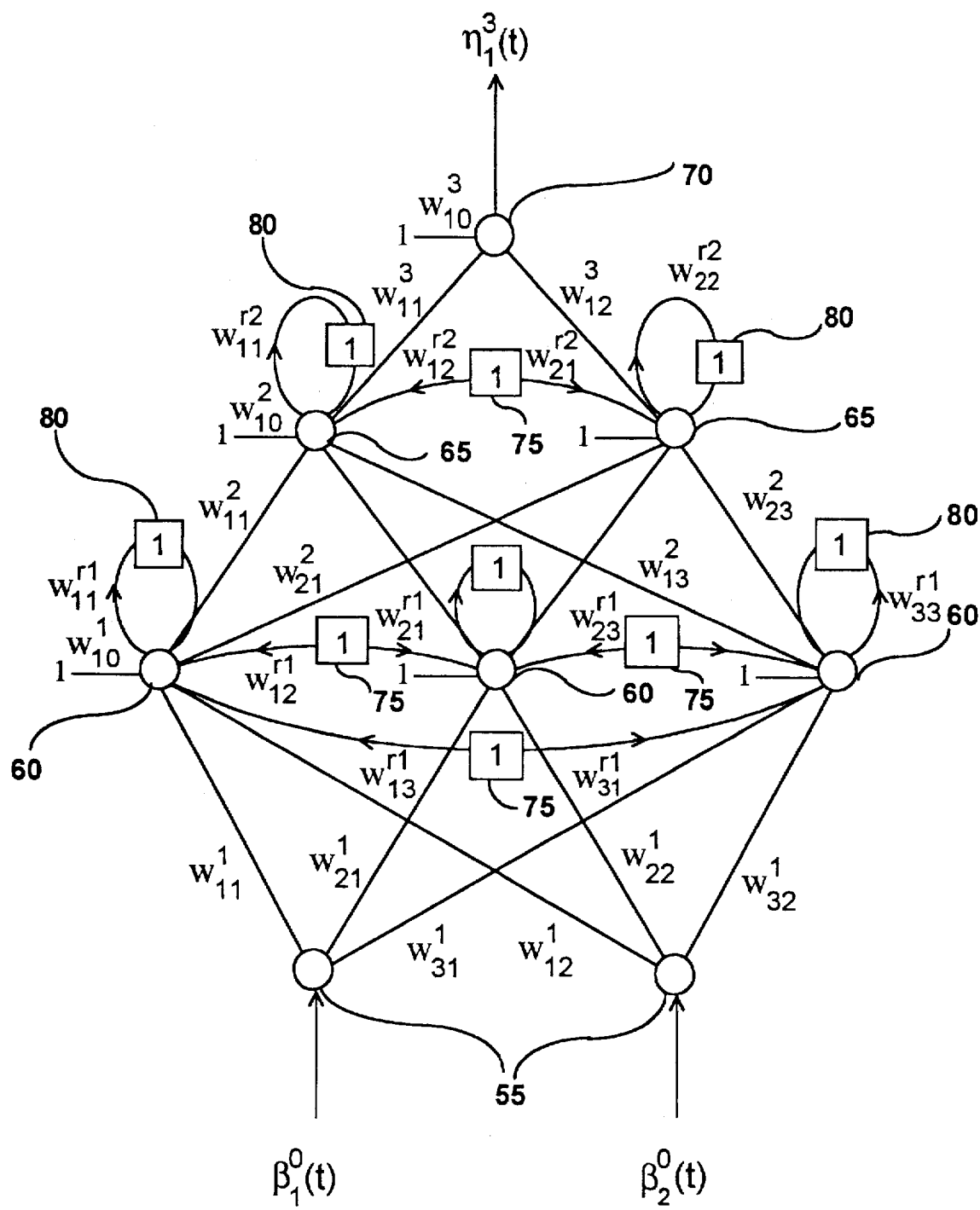
FIG. 5 shows an multilayer perceptron with interconnected neurons (MLPWIN). It has 2 input neurons 55, 1 output neuron 70, and 2 layers 60, 65 of neurons. The first layer has neurons 60 and the second layer has 2 neurons 65. The input and output neurons are regarded as the neurons in layer 0 and layer 3 respectively. Since the neurons in layers 1 and 2 do not interact directly with outside the MLPWIN, they are hidden neurons and their layers are hidden layers. All the neurons are of the kind shown in FIG. 2. The input neurons 55, whose activation functions are the identity function, simply distribute the exogenous input, $(\beta_1^0(t), \beta_2^0(t))$, to the neurons in the first layer. The output neuron 70, whose activation functions are also the identity function, are summers, producing outward output, $\eta_1^3(t)$. The activation functions of the neurons in the first and second layers are the hyperbolic tangent, tanh x.

Elman, "Finding Structures in Time," Cognitive Science, Vol. 14, pp. 179–211 (1990). An example MLPWIN is depicted in FIG. 5. It has 2 input neurons 55, 1 output neuron 70, and 2 layers 60, 65 of neurons. The first layer has 3 neurons 60 and the second layer has 2 neurons 65. The input and output neurons are regarded as the neurons in layer 0 and layer 3 respectively. Since the neurons in layers 1 and 2 do not interact directly with outside the MLPWIN, they are called hidden neurons and their layers are called hidden layers. All the neurons are of the kind shown in FIG. 2. The input neurons 55, whose activation functions are the identity function, simply distribute the exogenous input, $(\beta_1^0(t), \beta_2^0(t))$, to the neurons in the first layer. The output neuron 70, whose activation functions are also the identity function, are summers, producing outward output, $\eta_1^3$ (t). The activation functions of the neurons in the first and second layers are the hyperbolic tangent, tanh x.

The neurons in each layer are numbered from left to right in FIG. 5. The "numbering of a neuron" refers to this numbering in the neuron's layer. The symbol $w_{ij}^l$ denotes the weight on the delayless connection from neuron j in layer l−1 to neuron i in layer l. For notational simplicity, the bias for neuron i in layer l is denoted by $w_{ij}^{rl}$, which is viewed as the "the weight on the delayless connection leading into neuron i in layer l from neuron 0 in layer l−1, the activation level of neuron 0 being set always equal to 1." The symbol $w_{ij}^{rl}$ denotes the weight on the delay connection from neuron j to neuron i in the same layer l. If i≠j, the two delay connections associated with $w_{ij}^{rl}$ and $w_{ji}^{rl}$ between neuron i and neuron j in layer l are indicated in FIG. 5 by the opposite arrow heads on the same line connecting the neurons. The box 80 enclosing the number 1 between the opposite arrow heads denotes a unit time delay device that the weighted activation levels of neuron i and j go through before they are fedback to neurons j and i respectively. The weight for self-feedback of neuron i in layer l is denoted by $w_{ii}^{rl}$. The self-feedback is also delayed by one time unit by a unit time delay device 80 in the FIG. 5. Layer l of the MLPWIN consists of the neurons in layer l and the connections leading into them. The totality of the delay weights, $w_{ij}^{rl}$, in layer l is denoted by $w^{rl}$. The totality of the delayless weights, $w_{ij}^{l}$, in layer l is denoted by $w^l$.

Figure 6:
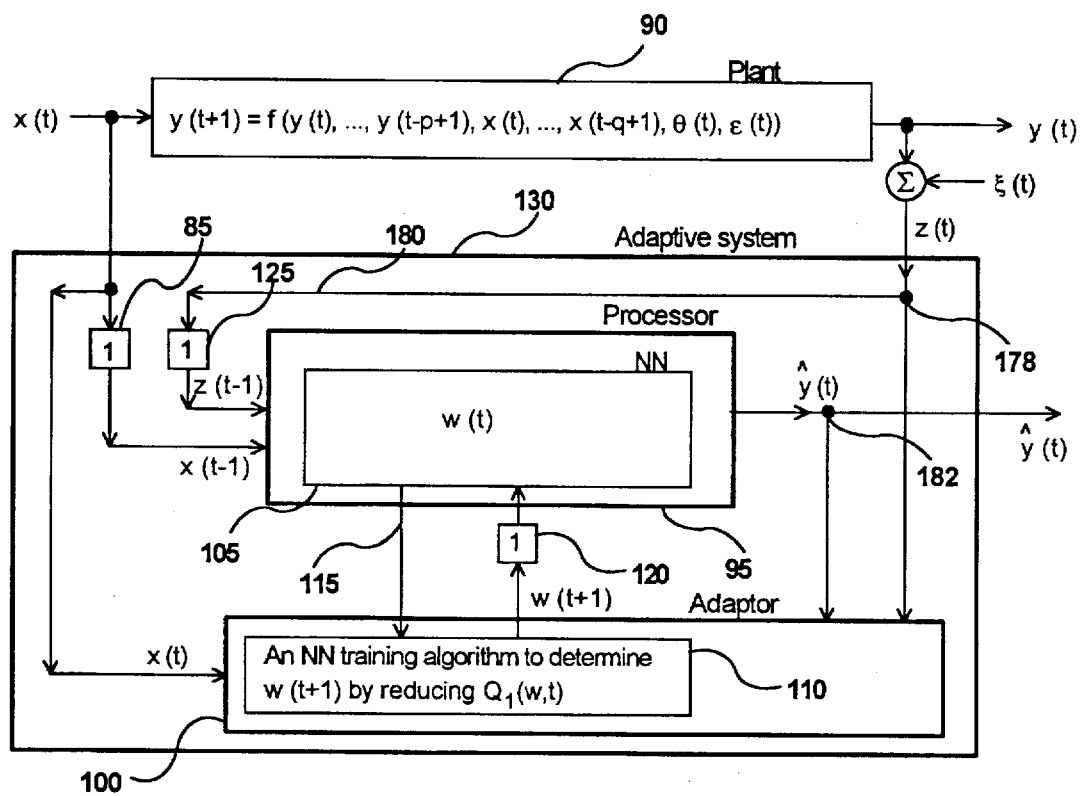
FIG. 6 shows a typical operating environment and a prior art scheme for adaptive system identification (or direct modeling). A small box enclosing a number such as 85 indicates a time delay of the number of time steps. Following the series parallel formulation of system identification, at each time t, the processor 95 inputs $z(t-1)$ and $x(t-1)$, which are made available by delaying 125 the plant output measurement $z(t)$ and delaying 85 plant input $x(t)$ by one time step, and outputs an estimate $\hat{y}(t)$ of $y(t)$. At the same time t, the adaptor 100 examines $\hat{x}(t)$, $z(t)$ and the estimate $\hat{y}(t)$, utilizes information about and/or from the processor 95, and adjusts the weights and/or parameters of the NN 105 in the processor 95 to adapt to the environmental parameter $\theta$ so that the estimates $\hat{y}$ of y generated by the processor minimize or reduce the value of an estimation or identification error criterion, $Q_1(w, t)$, as defined in equation (19). No distinction between nonadaptively adjustable weights and adaptively adjustable weights is made in the NN 105 in the processor 95.

Let us now see how the MLPWIN depicted in FIG. 5 processes information at time t. Denoting component i of the input to the MLPWIN at time t by $\beta_i^0$ (t), the activation level $\beta_i^l(t)$ of neuron i in layer l and the weighted sum $\eta_i^l$ (t) in the same neuron at time t satisfy, for l=1,2, $$\beta_i^l(t) = a_i^l(\eta_i^l(t)) \quad (7)$$

$$\eta_i^l(t) = w_{i0}^l + \sum_{j=1}^{n_{l-1}} w_{ij}^l \beta_j^{l-1}(t) + \sum_{j=1}^{n_l} w_{ij}^{rl} \beta_j^l(t-1), \quad (8)$$

where $n_l$ denotes the number of neurons in layer l, $a_i^l(x)$ is the activation function of neuron i in layer l, and $\beta_i^l$ (t−1), for i=1,2, . . . ,$n_l$ and l=1,2, form the dynamic state of the MLPWIN at time t. The dynamic state at time t=1 or at some other time for the performance of the MLPWIN to start being considered is called the initial dynamic state of the MLPWIN. The output $\eta_1^3(t)$ of the MLPWIN depicted in FIG. 6 is then determined by $$\eta_i^L(t) = w_{i0}^L + \sum_{j=1}^{n_{L-1}} w_{ij}^L \beta_j^{L-1}(t), \quad (9)$$

where L=3, i=1, and $n_{L-1}$=2.

Depending on the application, there can be, in an MLPWIN, any number L of layers, and any number n- of neurons in each layer l, for l=0, . . . ,L. Although only the hyperbolic tangent function tanh x and the logistic function $1/(1+e^{-x})$ have been used as the activation functions in the MLPWINs in the literature, other functions such as any wavelet, spline, polynomial, rational, trigonometric and exponential function can also be used as the activation function in accordance with the present invention to make filters. Another activation function worth mentioning here is x/(1+|x|), which was recently proposed in D. L. Elliott, "A Better Activation Function for Artificial Neural Networks," ISR Technical Report TR 93-8, Institute for Systems Research, University of Maryland, College Park, Md. (1993). It is noted that all the MLPWINs with one and the same activation function for hidden neurons form one MLPWIN paradigmn. It will be appreciated that there may be more than one type of activation function in an MLPWIN paradigm and the activation function of an input neuron does not have to be an identity function. By setting some delayless weights $w_{ij}^l$ and/or delay weights $w_{ij}^{rl}$ equal to zero, differently configured MLPWINs can be obtained. Notice that the equations, (7), (8) and (9), for l=1, . . . , L−1, with possibly some minor modifications are valid for the processing of most MLPWINs. In an MLPWIN, a neuron with a self-feedback delay connection and/or in a cycle within a layer is a cyclic neuron. All such cyclic neurons and those neurons and/or connections that have a path leading to one of these cyclic neurons constitute the recursive section of the MLPWIN. The rest of the neurons and connections of the MLPWIN form the nonrecursive section. If all the output neurons are summers, equation (9) is valid for every output component of the MLPWIN. Hence all the weights, $w_{ij}^L$, in layer L, appear linearly in the MLPWIN's outputs and are thus linear weights of the MLPWIN. If all hidden neurons are nonlinear, every other weight appears in the MLPWIN's outputs through these nonlinear neurons, and hence, the weights, $w_{ij}^L$, constitute the linear section of the MLPWIN.

3. Radial basis function networks (RBFNs): Radial basis function networks (RBFNs) first were proposed to approximate probability density functions in the 1960's. Only Gaussian activation functions were used then, but numerous other activation functions have been used in a large number of research papers ever since. Nevertheless, all the RBFNs in the literature are neural networks without delay connections and with a single layer of hidden neurons (or processing units).

A typical neuron of an RBFN is depicted in FIG. 1. It is a composition of a basis function 5 and an activation function 15, which are denoted by b and a respectively. If the inputs to the neuron are $I_1, I_2, \ldots, I_n$ as shown in FIG. 1, the basis function 5 with parameters $w_1, w_2, \ldots, w_n$, is usually the Euclidean distance between the vectors $(I_1, I_2, \ldots, I_n)$ and $(w_1, w_2, \ldots, w_n)$, i.e.

$$b(I_1, I_2, \ldots, I_n, w_1, w_2, \ldots, w_n) = \sqrt{\sum_{i=1}^{n} (I_i - w_i)^2} ,$$

whose value appears at 10. The activation function 15 can be any one of many functions such as the Gaussian function, $$a(x, w_0) = \exp(-x^2/w_0^2),$$

the thin-plate-spline function, $$a(x, w_0) = x^2 \log x,$$

the multiquadric function, $$a(x, w_0) = (x^2 + w_0^2)^{1/2},$$

and the inverse multiquadric function, $$a(x,w_0) = (x^2 + w_0^2)^{-1/2},$$

where $w_0$ is another parameter of the neuron. The activation level of the neuron is its output at 20. If we replace the MLP neurons with the RBFN neurons in the hidden layers of an MLP (e.g. FIG. 4), we obtain an RBFN. Thus the NNs in FIG. 4 can be viewed as an example RBFN. Here we note that $w_{ij}^l$ denotes a parameter of the i-th neuron in the l-th layer and that the weights on the connections are set equal to one.

Let us now see how the RBFN depicted in FIG. 4 processes information at time t. Denoting component i of the exogenous input at time t by $\beta_i^0$ (t), the activation level $\beta_i^l$ (t) of neuron i in layer l and the basis function output $n_i^l$ (t) in the same neuron at time t satisfy, for l=1, 2, $$\beta_i^l(t) = a(\eta_i^1(t), w_{i0}^l) = \exp[-(\eta_i^1(t))^2/(w_{i0}^l)^2], \quad (10)$$

$$\eta_i^l(t) = \left[ \sum_{j=1}^{n_{l-1}} (\beta_j^{l-1}(t) - w_{ij}^l)^2 \right]^{1/2}, \quad (11)$$

where $n_{l-1}$ denotes the number of neurons in layer l−1. The output $\eta_i^3$ (t) at output neuron i is then determined by $$\eta_i^L(t) = w_{i0}^L + \sum_{j=1}^{n_{L-1}} w_{ij}^L \beta_j^{L-1}(t), \quad (12)$$

where L=3, $n_{L-1}$=3, and i=1,2,3.

Depending on the application, there can be, in an RBFN, any number L of layers, any number no of input neurons, any number $n_L$ of output neurons, and any number n, of neurons in each hidden layer l. It is noted that all the RBFNs with one and the same activation function for hidden neurons form one RBFN paradigm. It will be appreciated that there may be more than one type of activation function in an RBFN paradigm and the activation function of an input neuron does not have to be an identity function. By setting some delayless weights $w_{ij}$ equal to zero, differently configured RBFNs, which are not filly connected, can be obtained. Notice that the equations, (10), (11) and (12), for =1, ... ,L−1, possibly with some minor modifications are valid for the processing of most RBFNs.

Since there are no delay connections in an RBFN, it does not have a recursive section and is thus a nonrecursive NN. If all the output neurons are summers, equation (12) is valid for every output component of an RBFN. Hence all the weights, $w_{ij}^L$, in layer L, appear linearly in the RBFN's outputs and are thus linear weights of the RBFN. Since every other weight appears in the RBFN's outputs through nonlinear activation functions, the weights, $w_{ij}^L$, constitute the linear section of the RBFN.

4. Radial basis function networks with interconnected neurons (RBFNWINs): If we replace the MLPWIN neurons with the RBFN neurons in the hidden layers of an MLPWIN (e.g. FIG. 5) we obtain an RBFNWIN. Let us now see how the example RBFNWIN shown in FIG. 5 processes information at time t. Here we assume that the basis function is the Euclidean distance and the activation function is the Gaussian function. Denoting component i of the input to the RBFNWIN at time t by $\beta_i^0$ (t), the activation level $\beta_i^l$ (t) of neuron i in layer l and the basis function output $\eta_i^l$ (t) in the same neuron at time t satisfy, for l=1, 2, $$\beta_i^1(t) = a(\eta_i^1(t), w_{i0}^l) = \exp[-(\eta_i^1(t))^2/(w_{i0}^l)^2] \quad (13)$$

$$\eta_i^l(t) = \left[ \sum_{j=1}^{n_{l-1}} (\beta_j^{l-1}(t) - w_{ij}^l)^2 + \sum_{j=1}^{n_l} (\beta_j^l(t-1) - w_{ij}^{rl})^2 \right]^{1/2}, \quad (14)$$

where $n_l$ denotes the number of neurons in layer l, and $\beta_i^l$ (t−1), for i=1, ... , $n_l$ and l=1,2, form the dynamic state of the example RBFNWIF at time t. The output $\eta_1^3$ (t) of the example RBFNWIN in FIG. 5 is then determined by $$\eta_i^L(t) = w_{i0}^L + \sum_{j=1}^{L} w_{ij}^L \beta_j^{L-1}(t). \quad (15)$$

Depending on the application, there can be, in an RBFNWIN, any number L of layers, and any number $n_l$ of neurons in each layer l, for l=0, ... , L. It is noted that all the RBFNWINs with one and the same activation function for hidden neurons form one RBFNWIN paradigm. It will be appreciated that there may be more than one type of activation function in an RBFNWIN paradigm and the activation function of an input neuron does not have to be an identity function. By setting some delayless weights $w_{ij}^l$ and/or delay weights $w_{ij}^{rl}$ equal to zero, differently configured RBFNWINs can be obtained. Notice that the equations, (13), (14) and (15), for l=1, ... , L−1, with possibly some minor modifications are valid for the processing of most RBFNWINs.

In an RBFNWIN, a neuron with a self-feedback delay connection and/or in a cycle within a layer is a cyclic neuron. All such cyclic neurons and those neurons and/or connections that have a path leading to one of these cyclic neurons constitute the recursive section of the RBFNWIN. The rest of the neurons and connections of the RBFNWIN form the nonrecursive section. If all the output neurons are summers, equation (9) is valid for every output component of the RBFNWIN. Hence all the weights, $w_{ij}^L$, in layer L, appear linearly in the RBFNWIN's outputs and are thus linear weights of the RBFNWIN. Since every other weight appears in the RBFNWIN's outputs through nonlinear activation functions, the weights, $w_{ij}^L$, constitute the linear section of the RBFNWIN.

Example Embodiments for Adaptive System Identification

In this and subsequent subsections on adaptive system identification, adaptive inverse modeling, adaptive model reference control and adaptive optimal estimation, typical operating environments, prior-art methods using NNs, and example embodiments of the present invention are described in detail to illustrate some preferred versions of the present invention for these applications and certain advantages thereof over the relevant prior art. These example embodiments will then be summarized into a more general embodiment of the invention in a subsequent subsection. The spirit and scope of the appended claims should not be limited to the descriptions of these example and preferred embodiments. To simplify these descriptions, it is assumed that the architecture of every NN (neural network) in these descriptions is given. How the architecture of an NN is selected for inclusion in an ANS in accordance with the teachings of the present invention is discussed in the subsection following these descriptions.

A typical operating environment and a prior-art scheme for adaptive system identification (or direct modeling) are shown in FIG. 6, where a small box enclosing a number such as 85 indicates a time delay of the number of time steps. A discrete-time system 90 to be identified is described by the vector equation: For t=0,1, ... , $$y(t+1)=f(y(t), \ldots, y(t-p+1), x(t), \ldots, x(t-q+1), \theta(t), \epsilon(t)), \quad (16)$$

with the initial condition (or state), $$(y(0), \ldots, y(-p+1), x(-1), \ldots, x(-q+1))=(y_0, \ldots, y_{-p+1}, x_{-1}, \ldots, x_{-q+1}), \quad (17)$$

where the vector-valued function, $f$, and the integers, p and q, are given; $x(t)$ is the known input vector at time t; $\epsilon$ is a random vector sequence with given joint probability distributions; $\theta(t)$ denotes the vector-valued unknown environmental parameter at time t; and the initial state, $(y_0, \ldots, y_{-p+1}, x_{-1}, x_{-q+1})$ is a random vector with given probability distribution (reflecting the relative frequencies of the actual initial states of the system, (16), in operations). The system, (16) and (17), can be found in a large variety of applications areas including communication, signal processing, control, radar, sonar, robotics, and geophysics. Wherever it is found, this system is hereinafter called a plant. We note that time-varying parameters and/or coefficients of the plant can be included in the vector $x(t)$. If the right-hand side of equation (16) is specialized to $f(y(t), \ldots, y(t-p+1), x(t), \ldots, x(t-q+1), \theta(t))$, the plant is a deterministic system. A measurement $z(t)$ of the vector output $y(t)$ is made available at time t, that satisfies $$z(t)=y(t)+\xi(t), \quad (18)$$

where $\xi$ is a random vector sequence with given joint probability distributions. If $\xi(t)$ is equal to zero for every t, $z(t)$ equals $y(t)$ and $y(t)$ is thus available. The equations, (16) and (17), describe the evolution of the output y, given the input x, up to and including time t, provided that $\theta^t:=\{\theta(s), s=1, \ldots, t\}$ is given. Here the symbol ":=" means "being defined to be."

A problem of adaptive system identification is to design and implement an adaptive system 130, comprising a processor 95 and an adaptor 100, that operates in the operating environment represented by the equations, (16), (17) and (18). As usual, a vector may be single- or multiple-dimentional and the Euclidean norm of a vector is denoted by $\|.\|$. Following the series-parallel formulation of system identification, at each time t, the processor 95 inputs $z(t-1)$ and $x(t-1)$, which are made available by delaying 125 the plant output measurement $z(t)$ and delaying 85 plant input $x(t)$ by one time step, and outputs an estimate $\hat{y}(t)$ of $y(t)$. At the same time t, the adaptor 100 examines $x(t)$, $z(t)$ and the estimate $\hat{y}(t)$, utilizes information about and/or from the processor 95, and adjusts the weights and/or parameters of the processor 95 to adapt to the environmental parameter $\theta$ so that the estimates $\hat{y}$ of y generated by the processor minimize or reduce the value of some given estimation or identification error criterion.

Assume that the unknown parameter $\theta(t)$ is a constant $\theta$ or varies so slowly that it can be viewed as constant in a reasonably short period of time. NNs of many different paradigms can be used in the processor 95 here. For illustrating the idea, an MLP with tapped delay lines (or alternatively an MLPWIN) is considered. If an MLP 105 with tapped delay lines, that has a hyperbolic tangent activation function in each hidden neuron and an identity activation function in each output neuron, is used in the processor 95 and the tapped delay lines are used to receive $(z(t-1), x(t-1))$ at time t and provide $(z(t-1), \ldots, z(t-p), x(t-1), \ldots, x(t-q))$ as the input vector to the MLP at the same time t, then the MLP with all its weights denoted by w outputs an estimate $\hat{y}(t, w)$ of $y(t)$. (Alternatively, if an MLPWIN 105, that has a hyperbolic tangent activation function in each hidden neuron and an identity activation function in each output neuron, is used in a processor 95, the MLPWIN with all its weights denoted by w inputs $(z(t-1), x(t-1))$ at time t and outputs an estimate $\hat{y}(t, w)$ of $y(t)$ at the same time t.) Note that the number $n_L$ of output neurons of the NN 105 is equal to the number of of components in the vector $y(t)$.

A widely used training criterion in prior art for adaptive training is $$Q_1(w,t):=\frac{1}{t}\sum_{\tau=1}^{t}\lambda^{t-\tau}\|z(\tau)-\hat{y}(\tau,w)\|^2, \quad (19)$$

where $\|.\|$ denotes the Euclidean norm, and $\lambda$ is a positive real number less than or equal to one. We note that $z(\tau)$ and $x(\tau)$ become available at time r during the operation of the plant, (16) and the training criterion $Q_1(w, t)$ is a function of time t. The argument w in $Q_1(w, t)$ and $\hat{y}(\tau, w)$ indicates their dependencies on the MLP's (or alternatively the MLPWIN's) weights w. In the prior art as shown in FIG. 6, no distinction between nonadaptively adjustable weights and adaptively adjustable weights is made. The MLP's (or alternatively the MLPWIN's) processing information concerning all the weights w is transferred 115 to an NN training algorithm 110, which determines at time t the values $w(t+1)$ of all the MLP's (or alternatively MLPWIN's) weights w through reducing $Q_1(w,t)$ by the variation of w during the adaptive training. These values $w(t+1)$ are delayed 120 by one time step and then transferred to the MLP (or alternatively MLPWIN) 105 for use in its processing at time t. Notice that determining the values of all the weights w at each time t involves a large amount of computation, fails to focus on learning about and adapting to the unknown environmental parameter $\theta$, and may get trapped into one of the many poor local minima of $Q_1(w, t)$.

It is appropriate to remark here that if a linear combiner is used in the processor 95 instead of an NN with at least one nonlinear hidden neuron such as an MLP or MLPWIN 105, an RLS, QR-LS, I-QR-LS, LSL, QRD-LSL or LMS algorithm is applied instead of the NN training algorithm 110 to determine the linear weights of the linear combiner. In this case, the adaptive system is a so called adaptive linear filter, which is extensively treated in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). Because of the constraint of using a linear combiner, the adaptive linear filter does not usually work satisfactorily unless the function $f$ in equation (16) is a linear function whose linear coefficients constitute the environmental parameter $\theta$. In the following, it is assume that the function $f$ is not linear or not known to be linear.

In accordance with the teachings of the present invention, the weights w are divided into the nonadaptively adjustable weights u and the adaptively adjustable weights v. Superscripts and subscripts of u and v are used in exactly the same manner as are those of w. For instance, if $w_{ij}^l$ is a nonadaptively adjustable weight, it is denoted by $u_{ij}^l$. Similarly, if $w_{ij}^{rl}$ is an adaptively adjustable weight, it is denoted by $v_{ij}^{rl}$. The nonadaptively adjustable weights u are determined using the a priori (or preoperational) information about the operating environment, which is the equations, (16), (17) and (18). These equations are simulated to generate nonadaptive training data as follows: Select a set $\Theta$ of exemplary values, $\theta_1, \ldots, \theta_N$, of $\theta$. Using a pseudo-random number generator to simulate the initial state (17) and the stochastic sequences $\epsilon$ and $\xi$, generate a collection $S_{\theta_n}$ of exemplary realizations w of the input/output sequences, $(x(\tau, \theta_n, \omega), y(\tau, \theta_n, w), z(\tau, \theta_n, \omega))$, $\tau=-B+1, -B+2, \ldots, T$, w ∈ $S_{\theta_n}$, for each selected exemplary value of $\theta_n$. Here B is an integer greater than or equal to the greater of p and q. Hence, w={(x(τ, n, w),y(τ, $\theta_n$, ω), z(τ,$\theta_n$, ω)); τ=−B+1, −B+2, ..., T}, for every w ∈ $S_{\theta_n}$. The symbol, w, is sometimes also used to denote an index for the exemplary realizations and the symbol, $S_{\theta_n}$, is used to denote the collection of all the values of the index. Since the exemplary realization, {(z(τ, $\theta_n$, ω), y(τ,$\theta_n$, ω), z(τ,$\theta_n$, ω)), τ=−B+1, −B+2, ..., T}, is specified fully by the index w and vice versa, these dual uses of w and $S_{\theta_n}$ should not cause any confusion. The positive integer T, the set Θ and the collections $S_{\theta_n}$ should be selected and generated such that the union S:=$\cup_{n=1}^{N} S_{\theta_n}$ reflects the operating environments sufficiently. S is called a priori training data or nonadaptive training data. Then the nonadaptively adjustable weights u are determined by minimizing or reducing the following nonadaptive training criterion by the variation of both the nonadaptively adjustable weights u and the variables $v(\theta_1)$, ..., $v(\theta_N)$:

$$Q_2(u,v(\theta_1), \ldots, v(\theta_N)) = \qquad (20)$$

$$\frac{1}{T(\#S)} \sum_{n=1}^{N} \sum_{w \in S_{\theta_n}} \sum_{\tau=1}^{T} \lambda^{T-\tau} \|y(\tau,\theta_n,\omega) - \hat{y}(\tau,\theta_n,\omega,u,v(\theta_n))\|^2,$$

where ||.|| denotes the Euclidean norm; #S is the number of elements in the set S; λ is a positive real number less than or equal to 1; and the MLP's (or alternatively the MLPWIN's) output $\hat{y}(\tau, \theta_n, \omega, u, v(\theta_n))$ is obtained at the output neurons of the MLP (or alternatively MLPWIN) with its adaptively adjustable weights v equal to the variables $v(\theta_n)$, right after feeding (x(s,$\theta_n$, ω), z(s,$\theta_n$,ω)), s=−B+1,−B+2, ..., τ consecutively one at a time, at the input terminals of the MLP's tapped delay lines (or alternatively the MLPWIN's input neurons). Intuitively speaking, in this nonadaptive training, while the same nonadaptively adjustable weights u are shared by all the selected exemplary values of θ, one set, $v(\theta_n)$, of adaptively adjustable weights is used for each typical value, $\theta_n$. This set of variables, $v(\theta_n)$, is called the diversity variables associated with the typical value, $\theta_n$, of the environmental variable, θ. Since the optimization of $Q_2(u, v(\theta_1), \ldots, v(\theta_N))$ is done off-line, as much computation as required to produce an optimal or very good solution can be performed. If a cross-validation technique is applied in the nonadaptive training, the generalization capability of the NN is maximized. If an NN prunig method is applied in the nonadaptive training, only those connections with nonadaptively adjustable weights whose being pruned do not significantly increase $Q_2$ and/or reduce the generalization capability of the NN are allowed to be pruned. The weight of a pruned connection is set equal to zero and the weights of all the connections incident to a pruned neuron are also set equal to zero. The values of the variables, u, $v(\theta_1), \ldots, v(\theta_N)$, that result from the nonadaptive training, are denoted by u*,v* ($\theta_1), \ldots, v(\theta_N)$ and called the best-fit values of these variables. If the nonadaptively trained NN is selected to be used in the processor of an ANS, the best-fit values, u*, of u are the operational values of the nonadaptively adjustable weights.

In contrast to the adaptive training criterion (19), a preferred adaptive training criterion in accordance with the teachings of the present invention is $$Q_3(v,t) := \frac{1}{t} \sum_{\tau=1}^{t} \lambda^{t-\tau} \|z(\tau) - \hat{y}(\tau,u^*,v)\|^2, \qquad (21)$$

where $\hat{y}(\tau, u^*, v)$ denotes the output of the MLP (or alternatively MLPWIN) with its nonadaptively adjustable weights equal to u* and its adaptively adjustable weights equal to v, and λ is a positive real number less than or equal to one. We note that z(τ) and x(τ) become available at time τ during the operation of the plant, (16), and the training criterion $Q_3(v, t)$ is a function of time t. The argument v in $Q_3(v, t)$ and $\hat{y}(\tau, u^*, v)$ indicates their dependencies on the MLP's (or alternatively the MLPWIN's) adaptively adjustable weights v.

A set of preferred adaptively adjustable weights for the MLP (or alternatively MLPWIN) are its linear weights, which are the weights, $w^L$, of its last layer, layer L. Setting v=$w^L$ or, more specifically, $v_{ij}^L=w_{ij}^L$ for i=1, ..., $n_L$ and j=0, ..., $n_{L-1}$, it follows that $$\hat{y}(\tau,u^*,v) = \left[ \sum_{j=0}^{n_{L-1}} v_{1j}^L \beta_j^{L-1}(\tau,u^*), \ldots, \sum_{j=0}^{n_{L-1}} v_{n_L j}^L \beta_j^{L-1}(\tau,u^*) \right]^T, \qquad (22)$$

where $\beta_0^{L-1}(\tau, u^*):=1$ and for j=1, ..., $n_{L-1}$, $\beta_j^{L-1}(\tau, u^*)$ is the activation level of neuron j in layer L−1, the argument u* indicating that the nonadaptively adjustable weights, $w^1$, ..., $w^{L-1}$, used to produce these activation levels, are equal to $u^t$ obtained in the preceding nonadaptive training. Substituting (22) into (21) yields $$Q_3(v,t) = \qquad (23)$$

$$\frac{1}{t} \sum_{\tau=1}^{t} \lambda^{t-\tau} \left\| z(\tau) - \left[ \sum_{j=0}^{n_{L-1}} v_{1j}^L \beta_j^{L-1}(\tau,u^*), \ldots, \sum_{j=0}^{n_{L-1}} v_{n_L j}^L \beta_j^{L-1}(\tau,u^*) \right]^T \right\|^2.$$

This adaptive training criterion is obviously quadratic in v, whose (i×j)-th component is $v_{ij}^L$. Thus, a wide range of fast algorithms such as the recursive least squares (RLS) algorithms and the corresponding fast versions; QR- and inverse QR-least squares (QR-LS and I-QR-LS) algorithms; least-squares lattice (LSL) and QR decomposition-based least squares lattice (QRD-LSL) algorithms; and gradient-based algorithms such as the least-mean square (LMS) algorithm are applicable to minimize or reduce $Q_3(v, t)$ by the variation of v. These algorithms can be found in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). These algorithms are referred to as RLS, QR-LS, I-QR-LS, LSL, QRD-LSL and LMS algorithms respectively. We note that $Q_3(v,t)$ is unimodal in v and hence the adaptive training for minimizing or reducing $Q_3(v, t)$ cannot be trapped in a poor local minimum of $Q_3(v,t)$.

Figure 7:
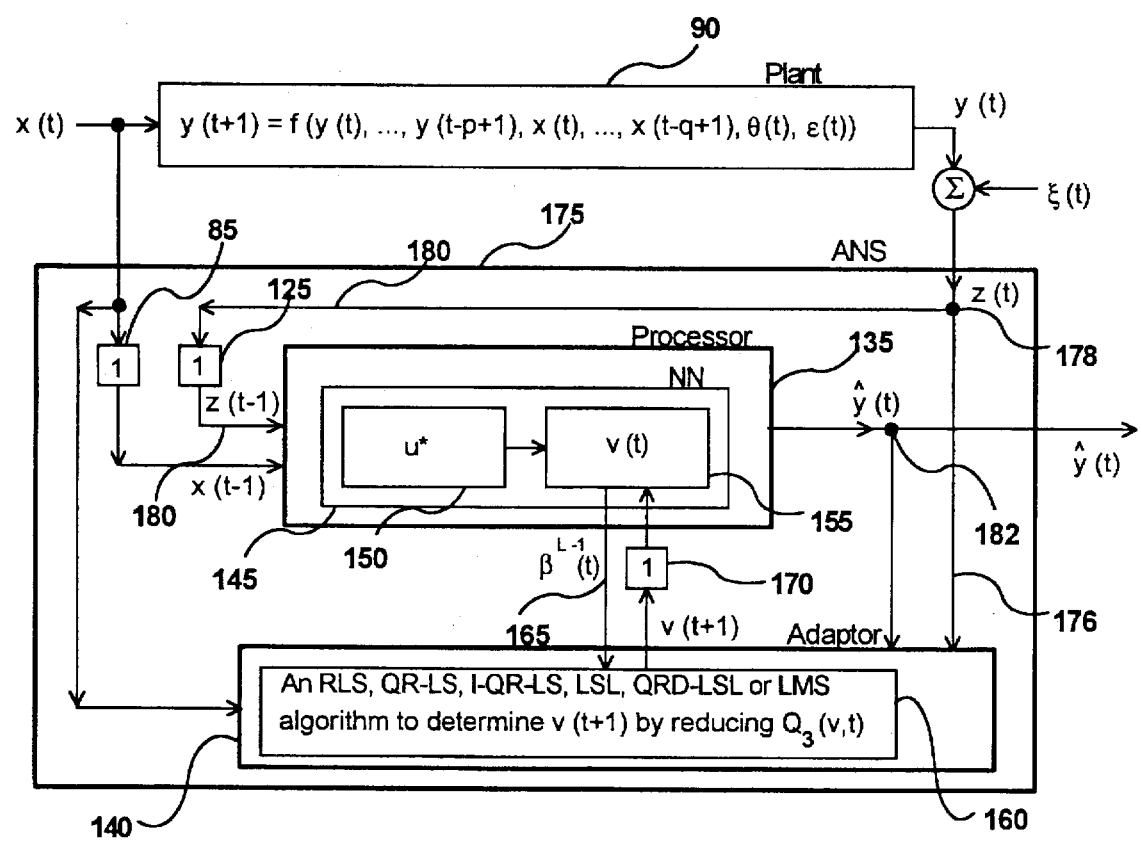
FIG. 7 shows an example embodiment of the present invention for adaptive system identification. The ANS 175 comprises a processor 135 and an adaptor 140. The processor 135 comprises mainly an MLP (or alternatively MLPWIN) 145, of which the linear section is shown as block 155 and the nonlinear section block 150 in the figure. In the MLP (or alternatively MLPWIN) 145, the nonadaptively adjustable weights u have been set equal to their operational values u* obtained with respect to $Q_2(u, v(\theta_1), \ldots, v(\theta_N))$ in equation (20) in a nonadaptive training. These values u* remain constant in the operation of the ANS until next nonadaptive training is performed. This is how the ANS works during its operation: At time t, using u* and $v(t)$ in the nonlinear and linear sections respectively at time t, the MLP with tapped delay lines (or alternatively MLPWIN) in the processor 135 receives and processes the plant's input $x(t-1)$ and output measurement $z(t-1)$, which have been delayed 85, 125 by one time step. The output of the processor 135 at time t is an estimate (or approximate) $\hat{y}(t)$ of the plant's output $y(t)$ at time t. At the same time t, the adaptor 140 receives $z(t)$ and $x(t)$ from the plant 90 and the processor 135 respectively. The adaptor also receives $\beta^{L-1}(t)$ from the linear section 155 of the MLP (or alternatively MLPWIN) 145. Using these data, an RLS, QR-LS, I-QR-LS, LSL, QRD-LSL or LMS algorithm 160 (i.e. an algorithm selected from the group consisting of the recursive least square algorithms and the corresponding fast versions; QR- and inverse QR-least squares algorithms; least squares lattice and QR decomposition based least squares lattice algorithms; and gradient based algorithms such as the least mean square algorithm) in the adaptor 140 minimizes or reduces $Q_3(v,t)$ in equation (21) and thereby determines the values $v(t+1)$ of the linear weights v of the MLP (or alternatively MLPWIN) 145, which are then delayed 170 by one time step and transferred into the linear section 155 for use by the MLP (or alternatively MLPWIN) 145 at the next time.

An example embodiment of the present invention for adaptive system identification is shown in FIG. 7. The ANS 175 comprises a processor 135 and an adaptor 140. The processor 135 comprises mainly an MLP (or alternatively MLPWIN) 145, of which the linear section is shown as block 155 and the nonlinear section block 150 in the figure. This is how the ANS works during its operation: At time t, using u* and v(t) in the nonlinear and linear sections respectively at time t, the MLP with tapped delay lines (or alternatively MLPWIN) in the processor 135 receives and processes the plant's input x(t−1) and output measurement z(t−1), which have been delayed 85, 125 by one time step. The output of the processor 135 at time t is an estimate (or approximate) ŷ(t) of the plant's output y(t) at time t. At the same time t, the adaptor 140 receives z(t) and x(t) from the plant 90 and haty(t) from the processor 135 respectively. The adaptor also receives $\beta^{L-1}$ (t) from the linear section 155 of the MLP (or alternatively MLPWIN) 145. Using these data, an RLS, QR-LS, I-QR-LS, LSL, QRD-LSL or LMS algorithm 160 in the adaptor 140 minimizes or reduces $Q_3(v, t)$ and thereby determines the values $v(t+1)$ of the linear weights v of the MLP 145, which are then delayed 170 by one time step and transferred into the linear section 155 for use by the MLP (or alternatively MLPWIN) 145 at the next time. In the MLP (or alternatively MLPWIN) 145, the nonadaptively adjustable weights u have been set equal to their operational values u* obtained with respect to $Q_2(u,v (\theta_1), \ldots, v(\theta_N))$ in equation (20) in a nonadaptive training. These values us remain constant in the operation of the ANS until next nonadaptive training is performed. We stress here that "time" means an index of time or a numbering of quantities, patterns or events. Usually, it is not a temporal instant of time.

Three special cases and a general case of the foregoing adaptive system identification problem described by equations (16), (17) and (18) are discussed below. The example embodiment including the MLP with tapped delay lines (or alternatively MLPWIN) and the nonadaptive and adaptive training criterion in the foregoing discussion can be easily specialized for each of these special cases.

Special Case: If the plant described by equation (16 is a transversal system (i.e. the function, $f$, does not depend on y), equation (16) specializes to $$y(t+1) = f(x(t), \ldots, x(t-q+1), \theta(t), \epsilon(t)) \quad (24)$$

with the initial condition, $$(x(-1), \ldots x(-q+1)) = (x_{-1}, \ldots, x_{-q+1}), \quad (25)$$

for $t=0, 1, \ldots$ . In this case, tapped delay line(s) are required to hold only the inputs $(x(t-1), \ldots, x(t-q))$ for the MLP used in the processor of the ANS. If an MLP-WIN is used in the processor, it needs as many input neurons as the number of components of $z(t)$ for inputing it. The nonadaptive and adaptive training criteria are still expressed by $Q_2(u, v(\theta_1), \ldots, v(\theta_N))$ and $Q_3(v, t)$. The foregoing discussions on them are essentially valid here.

Special Case: In an adaptive prediction problem, the signal $y(t)$ to be predicted satisfies the following special case of equations (16) and (17):

$$y(t+1) = f(y(t), \ldots, y(t-p+1), \theta(t), \epsilon(t)), \quad (26)$$

with the initial condition $$(y(0), \ldots, y(-p+1)) = (y_0, \ldots, y_{-p+1}), \quad (27)$$

for $t=0,1,\ldots$ In this special case, tapped delay line(s) are required to hold only the input vector $(z(t-1), \ldots, z(t-p))$ for the MLP used as the processor in the ANS. If an MLPWIN is used in the processor, it needs only as many input neurons as the number of components of $z(t)$ for inputing it. The nonadaptive and adaptive training criteria are still expressed by (20) and (21). The foregoing discussions on them are essentially valid here.

Special Case: If equation (16) specializes to $$y(t+1) = f(y(t-\Gamma_1), \ldots, y(t-p+1), x(t-\Gamma hd 2), \ldots, x(t-q+1), \theta(t), \epsilon(t)), \quad (28)$$

with positive integers $\Gamma_1$ and $\Gamma_2$, and the initial condition (17), remains unchanged, the plant is called a delayed dynamic system. After changing the unit time delays, 85 and 125, by a delay of $1+\Gamma_2$ time steps and a delay of $1+\Gamma_1$ time steps respectively in FIG. 7, the foregoing discussions on an example embodiment for the original case represented by equations (16), (17) and (18) essentially remain valid.

General Case: A general case is obtained, if instead of $z(t)$ in equation (18), the measurement of the plant outputs y at time t is, for a positive integer $P_1$, $$z(t) = h(y(t), \ldots, y(t-p_1+1), \theta(t), \epsilon(t)), \quad (29)$$

for which a function $g(z(t), \ldots, z(t-q2+1))$ for some positive integer $q_2$ exists, regardless of $\theta$, such that $g(z(t), \ldots, z(t-q_2+1)) = y(t-p_2) + \eta(t)$ for some nonnegative integer $p_2$ and some zero-mean stochastic process 71 that is statistically independent of y. In this case, FIG. 7 is modified as follows: (a) The function, $g(z(t), \ldots, z(t-q2+1))$, is included at the solid circle 178 in FIG. 7 and its output $y(t-p_2) + \eta(t)$ is sent through line 180 to the processor 95 and through line 176 to the adaptor 140. (b) The unit time delay 85 is replaced with a delay of $p_2+1$ time steps. (c) The output of the processor 135 is an estimate or approximate $\hat{y}(t-p_2)$ of $y(t-p_2)$ instead of an estimate or approximate $\hat{y}(t)$ of $y(t)$. With changes corresponding to these modifications in FIG. 7, the foregoing example embodiments for adaptive system identification are applicable here.

We note that almost all of the example embodiments of the present invention, to be described for adaptive system identification and for other adaptive processings (i.e. adaptive inverse modeling, adaptive model reference control, and adaptive optimal filtering), are also applicable to these special and general cases. A person of ordinary skill in the art will have no difficulty in making the necessary modifications on these example embodiments for such applications. Now we return to the foregoing original case represented by equations (16), (17) and (18). The series-parallel formulation of system identification has been considered up to this point. The parallel formulation of system identification can be treated in essentially the same way. In a first case of the parallel formulation, the processor receives $x(t-1)$ and $\hat{y}(t-1)$ as inputs at time t, instead of $x(t-1)$ and $z(t-1)$ as done above. To describe a prior-art scheme for this first case, FIG. 6 is modified by having the data transfer line 180 connected to the solid circle 182 instead of the solid circle 178. The training criterion, $Q_1(w, t)$, remains unchanged in form, but the symbol y on the right hand sides of equations (19) denotes here the outputs of the processor subject to the inputs, $x(t-1)$ and $\hat{y}(t-1)$, instead of $x(t-1)$ and $z(t-1)$ at time t. The NN training algorithm in block 110 should take into consideration the feedbacks $\hat{y}(t-1)$ from the output neurons of the NN 105 to its input neurons. With these changes, the prior-art adaptive system 130 in FIG. 6 for the first case of the parallel formulation is called a plant model one hereinafter.

FIG. 7 is similarly modified to describe an example embodiment of the present invention for the first case of the parallel formulation of system identification. Block 335 in FIG. 11 shows the modified ANS, where the symbols $u_y$ and $v_y$ replace u and v respectively. Notice that in block 335, the data transfer line 180 is connected to the solid circle 182 (instead of the solid circle 178 as shown is FIG. 7). For determining the nonadaptively and adaptively adjustable weights, $u_y^*$ and $v_y(t)$, in blocks 150 and 155 respectively in block 355, the training criteria, $Q_2(u_y, v_y(\theta_1), \ldots, v_y(\theta_N))$ and $Q_3(v_y, t)$, in equations (20) and (21), remain unchanged in form (except with the symbols $u_y$ and $v_y$ replacing u and v respectively), but the symbol $\hat{y}$ on the right hand sides of these equations denotes here the outputs of the processor 135 subject to the inputs, $x(t-1)$ and $\hat{y}(t-1)$, instead of $x(t-1)$ and $z(t-1)$ at time t. Because the inputs $\hat{y}(t-1)$ are feedbacks from the output neurons of the NN 145 in block 355, $v_y = w^L$ do not appear linearly in $Q_3(v_y, t)$ any more and an RLS, QR-RS, I-QR-RS or LMS algorithm is not adequate for the adaptive training of the NN 145 in block 355. Therefore, in the example embodiment for the first case, an NN adaptive training algorithm 161 in block 355 taking the feedbacks into consideration is used instead of 160 in FIG. 7. The adaptive neural system 335 in FIG. 11 for the first case of the parallel formulation is called a plant model two hereinafter.

Let us consider two special situations for the parallel formulation. If the plant 90 is a transversal system described by equations (24) and (25), the feedback inputs, $\hat{y}(t-1)$, to the processor 95 or 135 are unnecessary. Or if an MLPWIN is used, the feedback inputs, $\hat{y}(t-1)$, to the processor 95 or 135 are again unnecessary. This is because the delay connections in an MLPWIN can hold sufficient information about $\hat{y}(t-1)$ after a proper nonadaptive training of the MLPWIN. These observations motivate a second case for the parallel formulation of system identification, in which the processor receives only the inputs x(t−1) at time t. FIG. 7 is easily modified to describe an example embodiment of the present invention for the second case of the parallel formulation of system identification. Block 415 in FIG. 12 shows this modified ANS, where the symbols $u_y$* and $v_y$ replace u and v respectively. Notice that in block 415, the data transfer line 180 and the unit time delay 125 in FIG. 7 are eliminated. For determining the nonadaptively and adaptively adjustable weights, $u_y$* and $v_y(t)$, in blocks 152 and 157 respectively in block 355, the training criteria, $Q_2(u_y, v_y(\theta_1), \ldots, v_y(\theta_N))$ and $Q_3(v_y,t)$, in equations (20) and (21), remain unchanged in form (except with the symbols $u_y$ and $v_y$ replacing u and v respectively), but the symbol $\hat{y}$ on the right hand sides of these equations denotes here the outputs of the processor 137 subject to only the inputs, x(t−1), instead of x(t−1) and z(t−1) at time t. Because there are no feedback inputs such as $\hat{y}(t-1)$ from the output neurons of the NN 147 in block 355, the weights, $v_y=w^L$, appear linearly in $Q_3(v_y,t)$ still and an RLS, QR-RS, I-QR-RS or LMS algorithm 162 is adequate for the adaptive training of the NN 147 in block 355. The adaptive neural system 415 in FIG. 12 for the first case of the parallel formulation is called a plant model three hereinafter.

In many system identification problems of practical importance, the input/output relationship of a plant is known to satisfy equations of the forms, (16) and (17), but the function, $f$, and the integers, p and q, are not known and the environmental parameter $\theta(t)$ is not even identified (i.e. how many and what components there are in $\theta(t)$ are unknown). However, for each of a large number of different, though unknown, exemplary values of $\theta$, a large set of exemplary realizations, $w=\{(\tau, \theta_n, w), z(\tau, \theta_n, \omega)), \tau=-B+1,-B+2,\ldots, T\}$, of the plant's input process x and output measurement process z are available, which reflect their joint probability distributions during the plant's operations. We notice that the nonadaptive training criterion, (20), is constructed with or specified by the collection $S := \cup_{n=1}^{N} S_{\theta_n}$ of exemplary realizations of the input process x, output process y, and output measurement process z of the plant (16). Although the exemplary realizations of the output process y are missing, all the foregoing example embodiments of the present invention for system identification are still applicable here with the operational values u* of the nonadaptively adjustable weights u in the MLP (or alternatively MLPWIN) (145 or 147) determined with respect to the criterion, (20), in equation (20), where $y(\tau, \theta_n, \omega)$ is replaced by $z(\tau, \theta_n, \omega)$, which is available.

Example Embodiments for Adaptive Inverse Modeling

Figure 8:
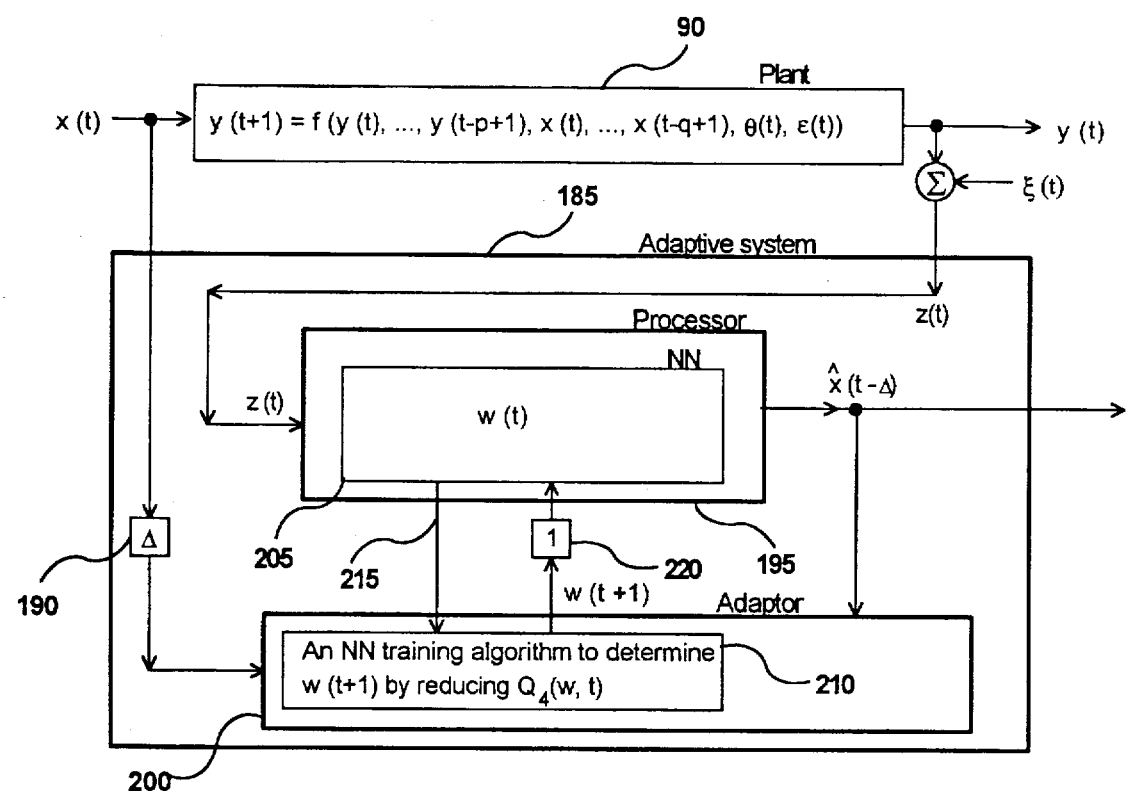
FIG. 8 shows a typical operating environment and a prior art scheme for adaptive inverse modeling. At each time t, the processor 195 inputs $z(t)$ and outputs an estimate (or approximate) $\hat{x}(t-\Delta)$ of $x(t-\Delta)$, for $\Delta \geq 1$. At the same time t, the adaptor 200 compares $\hat{x}(t-\Delta)$ and $x(t-\Delta)$, utilizes information about and/or from the processor 195, and adjusts the weights and/or parameters of the NN 205 in the processor 195 to adapt to the environmental parameter $\theta$ so that the estimates (or approximate)$\hat{x}$ of x generated by the processor minimize or reduce the value of an estimation or identification error criterion, $Q_4(w, t)$, as defined in equation (30).

A typical operating environment and a prior-art scheme for adaptive inverse modeling are shown in FIG. 8, where a small box enclosing a number such as 190 indicates a delay of the same number of time steps. A discrete-time system 90 to be adaptively inverse-modeled is described by the vector equation, (16), with the initial condition (17), where the vector-valued function, $f$, and the integers, p and q, are given; x(t) is the known input vector at time t; e is a random vector sequence with given joint probability distributions; and $\theta(t)$ denotes the vector-valued unknown environmental parameter at time t. The system, (16), which can be found in a large variety of applications areas including communication, signal processing, control, radar, sonar, robotics, and geophysics, is hereinafter called a plant. If the right-hand side of equation (16) is specialized to $f(y(t), \ldots, y(t-p+1), x(t), \ldots, x(t-q+1), \theta(t))$, the plant is a deterministic system. A measurement z(t) of the vector output y(t) is made available at time t, that satisfies (18), where $\xi$ is a random vector sequence with given joint probability distributions. If $\xi(t)$ is equal to zero for every t, z(t) equals y(t) and y(t) is thus available. The equations, (16) and (17), describe the evolution of the output y, given the input x, up to and including time t, provided that $\theta^t:=\{\theta(s), s=1, \ldots, t\}$ is given. Here the symbol ":=" means "being defined to be."

A problem of adaptive inverse modeling is to design and implement an adaptive system 185, comprising a processor 195 and an adaptor 200, that operates in the operating environment represented by the equations, (16), (17) and (18). As usual, a vector may be single- or multiple-dimentional and the Euclidean norm of a vector is denoted by $\|.\|$. At each time t, the processor 195 inputs z(t) and outputs an estimate (or approximate) $\hat{x}(t-\Delta)$ of $x(t-\Delta)$, for $\Delta \geq 1$. At the same time t, the adaptor 200 compares $\hat{x}(t-\Delta)$ and $x(t-\Delta)$, utilizes information about and/or from the processor 195, and adjusts the weights and/or parameters of the processor 195 to adapt to the environmental parameter $\theta$ so that the estimates (or approximate) x of x generated by the processor minimize or reduce the value of some given estimation or identification error criterion.

Assume that the unknown parameter $\theta(t)$ is a constant $\theta$ or varies so slowly that it can be viewed as constant in a reasonably short period of time. NNs of many different paradigms can be used in the processor 195 here. For illustrating the idea, an MLP with tapped delay lines (or alternatively an MLPWIN) is considered. If an MLP 205 with tapped delay lines, that has a hyperbolic tangent activation function in each hidden neuron and an identity activation function in each output neuron, is used in the processor 195 and the tapped (delay lines are used to receive z(t) at time t and provide $(z(t), \ldots, z(t-B+1))$, where B is a positive integer such that $x(t-\Delta)$ is uniquely determined by $(z(t), \ldots, z(t-B+1))$ for $t=\Delta+1, \Delta+2, \ldots$, as the input vector to the MLP at the same time t, then the MLP with all its weights denoted by w outputs an estimate $\hat{x}(t-\Delta, w)$ of $x(t-\Delta)$. (Alternatively, if an MLPWIN 205, that has a hyperbolic tangent activation function in each hidden neuron and an identity activation function in each output neuron, is used in the processor 195, the MLPWIN with all its weights denoted by w inputs z(t) at time t and outputs an estimate t $(t-\Delta, w)$ of $x(t-\Delta)$ at the same time t.) Note that the number $n_L$ of output neurons of the NN 205 is equal to the number of components of the vector x(t).

A widely used training criterion in prior art for adaptive training is $$Q_4(w,t) := \frac{1}{t-\Delta} \sum_{\tau=\Delta+1}^{t} \lambda^{t-\tau} \|x(\tau-\Delta) - \hat{x}(\tau-\Delta,w)\|^2, \tag{30}$$

where $\|.\|$ denotes the Euclidean norm, and is a positive real number less than or equal to one. We note that $z(\tau)$ and after a delay 190 of $\Delta$ time steps, $x(\tau-\Delta)$ become available at time $\tau$ during the operation of the plant, (16) and that the training criterion $Q_4$ (w, t) is a function of time t. The argument w in $Q_4$ (w, t) and a $(\tau-\Delta, \omega)$ indicates their dependencies on the MLP's (or alternatively the MLPWIN's) weights w. In the prior art as shown in FIG. 8, no distinction between non-adaptively adjustable weights and adaptively adjustable weights is made. The MLP's (or alternatively the MLPWIN's) processing information concerning all the weights w is transferred 215 to an NN training algorithm 210, which determines at time t the values w (t+1) of all the MLP's (or alternatively MLPWIN's) weights w through reducing $Q_4$ (w, t) by the variation of w during the adaptive training. These values w (t+1) are delayed 220 by one time step and then transferred to the MLP (or alternatively MLPWIN) 205 for use in its processing at time t. Notice that determining the values of all the weights w at each time t involves a large amount of computation, fails to focus on learning about and adapting to the unknown environmental parameter $\theta$, and may get trapped into one of the many poor local minima of $Q_4(w, t)$.

It is appropriate to remark here that if a linear combiner is used in the processor 195 instead of an NN with at least one nonlinear hidden neuron such as an MLP or MLPWIN 205, an RLS, QR-LS, I-QR-LS, LSL, QRD-LSL or LMS algorithm is applied instead of the NN training algorithm 210 to determine the linear weights of the linear combiner. In this case, the adaptive system is a so called adaptive linear filter, which is extensively treated in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). Because of the constraint of using a linear combiner, the adaptive linear filter does not usually work satisfactorily unless the function $f$ in equation (16) is a linear function whose linear coefficients constitute the environmental parameter $\theta$. In the following, it is assume that the function $f$ is not linear or not known to be linear.

In accordance with the teachings of the present invention, the weights w are divided into the nonadaptively adjustable weights u and the adaptively adjustable weights v. Superscripts and subscripts of u and v are used in exactly the same manner as are those of w. For instance, if $w_{ij}^l$ is a nonadaptively adjustable weight, it is denoted by $u_{ij}^l$. Similarly, if $w_{ij}^{rl}$ is an adaptively adjustable weight, it is denoted by $v_{ij}^{rl}$. The non-adaptively adjustable weights u are determined using the a priori (or preoperational) information about the operating environment, which is the equations, (16), (17) and (18). These equations are simulated to generate non-adaptive training data as follows: Select a set $\Theta$ of exemplary values, $\theta_1, \ldots, \theta_N$, of $\theta$. Using a pseudo-random number generator to simulate the initial state (17) and the stochastic sequences $\epsilon$ and $\xi$ generate a collection $S_{\theta_n}$ of exemplary realizations w of the input/output sequences, $w = \{(x(r, n, w), z(\tau.\theta_n, \omega)), \tau = \Delta - B + 2, \Delta - B + 3, \ldots, T\}$, $w \in S_{\theta_n}$, for each selected exemplary value of $\theta_n$. The positive integer T, the set $\Theta$ and the collections $S_\theta$ should be selected and generated such that the union $S := \cup_{n=1}^N S_{\theta_n}$ reflects the operating environments sufficiently. S is called a priori training data or nonadaptive training data. Then the nonadaptively adjustable weights u are determined by minimizing or reducing the following nonadaptive training criterion by the variation of both the nonadaptively adjustable weights u and the variables $v(\theta_1), \ldots, v(\theta_N)$:

$$Q_5(u, v(\theta_1), \ldots, v(\theta_N)) = \tag{31}$$

$$\sum_{n=1}^{N} \sum_{\omega \in S_{\theta_n}} \sum_{\tau=\Delta+1}^{T} \frac{\lambda^{T-\tau}}{(T-\Delta)\#S} \|x(\tau-\Delta,\theta_n,\omega) - \hat{x}(\tau-\Delta,\theta_n,\omega u, v(\theta_n))\|^2,$$

where #S is the number of elements in the set S; $\lambda$ is a positive real number less than or equal to 1; and the MLP's (or alternatively the MLPWIN's) outputs $\hat{x}(\tau-\Delta, \omega, \theta_n, u, v(\theta_n))$ are obtained at the output neurons of the MLP (or alternatively MLPWIN) with its adaptively adjustable weights v equal to the variables $v(\theta_n)$, right after feeding $z(s, \theta_n, \omega)$, $s = \Delta - B + 2, \Delta - B + 3, \ldots, \tau$ consecutively one at a time, at the terminals of the MLP's tapped delay lines (or alternatively the MLPWIN's input neurons). Intuitively speaking, in this nonadaptive training, while the same nonadaptively adjustable weights u are shared by all the selected exemplary values of $\theta$, one set, $v(\theta_n)$, of adaptively adjustable weights is used for each typical value, $\theta_n$. This set of variables, $v(\theta_n)$, is called the diversity variables associated with the typical value, $\theta_n$, of the environmental variable, $\theta$. Since the optimization of $Q_5(u, v(\theta_1), \ldots, v(\theta_N))$ is done off-line, as much computation as required to produce an optimal or very good solution can be performed. If a cross-validation technique is applied in the nonadaptive training, the generalization capability of the NN is maximized. If an NN prunig method is applied in the nonadaptive training, only those connections with nonadaptively adjustable weights whose being pruned do not significantly increase $Q_5$ and/or reduce the generalization capability of the NN are allowed to be pruned. The weight of a pruned connection is set equal to zero and the weights of all the connections incident to a pruned neuron are also set equal to zero. The values of the variables, u, $v(\theta_1), \ldots, v(\theta_N)$, that result from the nonadaptive training, are denoted by u*, v* $(\theta_1), \ldots, v^* (\theta_N)$ and called the best-fit values of these variables. If the nonadaptively trained NN is selected to be used in the processor of an ANS, the best-fit values, u*, of u are the operational values of the nonadaptively adjustable weights.

In contrast to the adaptive training criterion (30), a preferred adaptive training criterion in accordance with the teachings of the present invention is $$Q_6(v,t) := \frac{1}{t-\Delta} \sum_{\tau=\Delta+1}^{t} \lambda^{t-\tau} \|x(\tau-\Delta) - \hat{x}(\tau-\Delta, u^*, v)\|^2, \tag{32}$$

where $\hat{x}(\tau-\Delta, u^*, v)$ denotes the MLP's (or alternatively MLPWIN's) output at time $\tau$ after $z(s), s = \Delta - B + 2, \Delta - B + 1, \ldots, \tau$, have been fed to the input terminal of the MLP's tapped delay lines (or alternatively MLPWIN's input neurons), $\Lambda$ is a positive real number less than or equal to one and we note that the training criterion $Q_6$ (v, t) is a function of time t.

A set of preferred adaptively adjustable weights for the MLP (or alternatively MLPWIN) are its linear weights, which are the weights, $w^L$, of its last layer, layer L. Setting $v = w^L$ or, more specifically, $v_{ij}^L = w_{ij}^L$ for $j = 0, \ldots, n_{L-1}$, it follows that $$\hat{x}(\tau - \Delta, u^*, v) = \left[ \sum_{j=0}^{n_{L-1}} v_{ij}^L \beta_j^{L-1}(\tau, u^*), \ldots, \sum_{j=0}^{n_{L-1}} v_{n_L j}^L \beta_j^{L-1}(\tau, u^*) \right]^T, \tag{33}$$

where $\beta_0^{L-1}(\tau, u^*) := 1$ and for $j = 1, \ldots, n_{L-1}, \beta_j^{L-1}(\tau, u^*)$ is the activation level of neuron j in layer L−1, the argument u* indicating that the nonadaptively adjustable weights, $w^1, \ldots, w^{L-1}$, used to produce these activation levels, are equal to u* obtained in the preceding nonadaptive training. Substituting (22) into (21) yields $$Q_6(v,t) := \frac{1}{t-\Delta} \sum_{t-\Delta}^{t} \lambda^{t-\tau} \left\| x(\tau-\Delta) - \left[ \sum_{j=0}^{n_{L-1}} v_{1j}^L \beta_j^{L-1}(\tau,u^*), \ldots, \sum_{j=0}^{n_{L-1}} v_{n_L j}^L \beta_j^{L-1}(\tau,u^*) \right]^T \right\|^2. \quad (34)$$

This adaptive training criterion is obviously quadratic in v, whose (i×j)-th component is $v_{ij}^L$. Thus, a wide range of fast algorithms such as the recursive least squares (RLS) algorithms and the corresponding fast versions; QR- and inverse QR-least squares (QR-LS and I-QR-LS) algorithms; least-squares lattice (LSL) and QR decomposition-based least squares lattice (QRD-LSL) algorithms; and gradient-based algorithms such as the least-mean square (LMS) algorithm are applicable to minimize or reduce $Q_6$ (v, t) by the variation of v. These algorithms can be found in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). We note that $Q_6$ (v,t) is unimodal in v and hence the adaptive training for minimizing or reducing $Q_6$ (v, t) cannot be trapped in a poor local minimum of $Q_3$(v,t).

An exemplary embodiment of the present invention is shown in FIG. 9. The ANS 230 comprises a processor 235 and an adaptor 240. The processor 235 comprises mainly an MLP (or alternatively MLPWIN) 245, of which the linear section is shown as block 255 and the nonlinear section as block 250 in the figure. This is how the ANS works during its operation: At time t, the MLP with tapped delay lines (or alternatively MLPWIN) in the processor 235 receives and processes the plant's output measurement z(t) using u* and v(t) in the nonlinear and linear sections of the NN 245 respectively. Then the processor 235 outputs, at time t, an estimate (or approximate) $\hat{x}$(t–Δ) of the plant's input x(t–Δ) for time t–Δ. At the same time t, the adaptor 240 receives x(t–Δ) from the input terminals of the plant 90, after a delay 190 of Δ time steps, and receives x(t–Δ) from the output terminals of the processor 235. The adaptor also receives $\beta^{L-1}$ (t) from the linear section 255 of the MLP (or alternatively MLPWIN) 245. Using these data, an RLS, QR-LS, I-QR-LS, LSL, QRD-LSL or LMS algorithm 260 in the adaptor 240 minimizes or reduces $Q_6$ (v, t) and thereby determines the values v(t+1) of the linear weights v of the MLP (or alternatively MLPWIN) 245, which are then delayed 270 by one time step and transferred into the linear section 255 for use by the MLP (or alternatively MLPWIN) 245 at the next time. We stress that in the MLP (or alternatively MLPWIN) 245, the nonadaptively adjustable weights u have been set equal to their operational values u* obtained with respect to $Q_5(u, v(\theta_1), \ldots, v(\theta_N))$ in equation (31) in nonadaptive training. These operational values u* remain constant in the operation of the ANS until next nonadaptive training is performed. Notice that "time" means an index of time or a numbering of quantities, patterns or events. Usually, it is not a temporal instant of time.

In many adaptive inverse modeling problems of practical importance, the input/output relationship of a plant is known to satisfy equations of the forms, (35) and (36), but the function, $f$, and the integers, p and q, are not known and the environmental parameter θ(t) is not even identified (i.e. how many and what components there are in θ(t) are unknown). However, for each of a large number of different, though unknown, exemplary values of θ, a large set of exemplary realizations of the plant's input process x and output measurement process z are available, which reflect their joint probability distributions during the reference model's operations. We notice that the nonadaptive training criterion, (31), is constructed with or specified by the collection $S := \cup_{n=1}^N S_{\theta_n}$ of exemplary realizations of the input process x and output measurement process z of the plant (16). The foregoing example embodiment of the present invention is applicable with the operational values u* of the nonadaptively adjustable weights u in the MLP (or alternatively MLPWIN) 245 determined with respect to the criterion, $Q_5(u, v(\theta_1), \ldots, v(\theta_N))$, in equation (31).

Example Embodiments for Adaptive Model Reference Control

A typical operating environment and a prior-art scheme for adaptive model reference control are shown in FIG. 10, where a small box enclosing a number such as 320 indicates a delay of the same number of time steps. A discrete-time system 90 to be adaptively controlled is described by the vector equation, (16), with the initial condition (17), where the vector-valued function, $f$, and the integers, p and q, are given; x(t) is the known input vector at time t; ε is a random vector sequence with given joint probability distributions; and θ(t) denotes the vector-valued unknown environmental parameter at time t. The system (16) is called a plant, which can be found in a large variety of applications areas including communication, signal processing, control, radar, sonar, robotics, and geophysics. If the right-hand side of equation (16) is specialized to $f(y(t), \ldots, y(t-p+1), x(t), \ldots, x(t-q+1), 0(t))$, the plant is a deterministic system. A measurement z(t) of the vector output y(t) is made available at time t, that satisfies (18), where ξ is a random vector sequence with given joint probability distributions. If C (t) is equal to zero for every t, z(t) equals y(t) and y(t) is thus available. The plant is controlled to emulate a reference model described by $$y_r(t+1) = f_r(y_r(t), \ldots, y_r(t-p_r 1), \alpha(t), \ldots, a(t-q_r+1), \theta(t), \epsilon_r(t)), \quad (35)$$

with the initial condition $$(y_r(0), \ldots, y_r(-p_r+1), a(-1), \ldots, a(-q_r+1)) = (y_0, \ldots, y_{-p_r+1}, a_{-1}, \ldots, a_{-q_r+1}), \quad (36)$$

where the vector-valued function, $f_r$, and the integers, $p_r$, and $q_r$, are given; a(t) is the input vector at time t; $\epsilon_r$ is a random vector sequence with given joint probability distributions. Important special cases can be obtained by eliminating θ(t) and/or $\epsilon_r$ (t) from the right-hand side of equation (35). A measurement $z_r$ (t) of $y_r$ (t) is made available at time t, that satisfies $$z_r(t) = y_r(t) + \xi_r(t), \quad (37)$$

where $\xi_r$ (t) is a random vector sequence with given joint probability distributions. The equations, (16), (17), (35) and (36), describe the evolutions of the plant output y and the reference model output $y_r$, given the inputs x and a, up to and including time t, provided that $\theta^t := \{\theta(s), s=1, \ldots, t\}$ is given. Here the symbol ":=" means "being defined to be."

A problem of adaptive model reference control is to design and implement an adaptive system 285, comprising a processor 295 and an adaptor 300, that operates in the operating environment represented by the equations, (16), (17) and (18), (35), (36), and (37). As usual, a vector may be single- or multiple-dimentional and the Euclidean norm of a vector is denoted by $\|.\|$. At each time t, the processor 295 inputs a(t) and generates a control signal x(t) for the plant 90. At the same time t, the adaptor 300 compares z(t) and $z_r$(t), utilizes information about and/or from the processor 295, and adjusts the weights and/or parameters of the processor 295 to adapt to the environmental parameter θ so that the control signal x(t) generated by the processor 295 drives the plant 90 to minimize or reduce some given difference criterion between the plant's output y and the reference model's output $y_r$.

Assume that the unknown parameter θ(t) is a constant θ or varies so slowly that it can be viewed as a constant in a reasonably short period of time. Since the environmental parameter θ(t) is unknown, a plant model one shown as block 130 is used to adaptively identify the plant 90. This plant model one 130 receives the plant's input x(t) and produces an estimate ŷ(t) of the plant's output y(t). In the prior art, all the weights $w_y$(t) of the MLP with tapped delay lines (or alternatively MLPWIN) 105 are adjusted or determined during the plant model one's operation. Assuming that the plant model one 130 emulates the plant 90 closely (i.e. ŷθ(t) is a good approximate of y(t)), the function of the processor 295 can be viewed as driving the plant model one to minimize or reduce some given difference criterion between the reference model's output $y_r$ and the plant model one's output ŷ(t), instead of the plant's output y(t). The working of the plant model one 130 is explained in detail earlier on in connection with the parallel formulation of system identification and is thus assumed known here. NNs of many different paradigms can be used in the processor 295 here. For illustrating the idea, an MLP with tapped delay lines (or alternatively an MLPWIN) is considered. If an MLP 305 with tapped delay lines, that has a hyperbolic tangent activation function in each hidden neuron and an identity activation function in each output neuron, is used in the processor 295 and the tapped delay lines are used to receive a (t) at time t and provide (a(t), ..., a(t−$B_1$+1)), where $B_1$ is a positive integer such that x(t) as a suitably chosen function of (a(t), ..., a(t−$B_1$+1)) can drive the plant model one's output ŷ to approximate the reference model's output $y_r$ (t) sufficiently closely, then the MLP with all its weights denoted by w outputs a control signal x(t). (Alternatively, if an MLPWIN 305, that has a hyperbolic tangent activation function in each hidden neuron and an identity activation function in each output neuron, is used in the processor 295, the MLPWIN with all its weights denoted by w inputs a (t) at time t and outputs a control signal x(t) at the same time t.)

A widely used training criterion in the prior art for adaptive training is $$Q_7(w,t) := \frac{1}{t} \sum_{\tau=1}^{t} \lambda^{t-\tau} \|z_r(\tau) - \hat{y}(\tau,w)\|^2, \quad (38)$$

$\|.\|$ denotes the Euclidean norm, and λ is a positive real number less than or equal to one. At time t, the processor 295 receives the exogenous input a (t) and sends a control signal x(t) to the plant 90 and the plant model one 130, which in turn generate the outputs y(t) and p (t) respectively. In this process, the processor 295 and the plant model one 130 use the weights w (t) and $w_y$(t) respectively, which were determined by minimizing or reducing $Q_7$ (w,t−1) and $Q_1$($w_y$, t−1) respectively in the preceding time step t−1. The informations of the processings in the NNs 305, 105 in the processor 295 and the plant model one 130 are transferred 315, 325 to an NN training algorithm 310, which determines w (t+1) by reducing or minimizing $Q_7$ (w, t). These weights w (t+1) are then delayed 320 by one time step before being used in the NN 305. The weights $w_y$(t+1) to be used in the NN 105 is determined as explained in FIG. 6. In the prior art as shown in FIG. 10, no distinction between nonadaptively adjustable weights and adaptively adjustable weights is made. The values of all the weights, w and $w_y$, are determined during the adaptive trainings of the NNs 305, 105. Notice that determining the values of all the weights w and $w_y$ at each time t involves a large amount of computation, fails to focus on learning about and adapting to the unknown environmental parameter θ, and may get trapped into one of the many poor local minima of $Q_7$(w,t) and $Q_1$($w_y$, t).

It is appropriate to remark here that if an adaptive linear filter is used instead of the plant model one 130 and a linear combiner is used in the processor 295 instead of an NN with at least one nonlinear hidden neuron such as an MLP or MLPWIN 305, an RLS, QR-LS, I-QR-LS, LSL, QRD-LSL or LMS algorithm is applied instead of the NN training algorithm 310 to determine the linear weights of the linear combiner. This linear combiner and this algorithm form another adaptive linear filter. This prior art of adaptive reference model control is treated in in the book by S. Haykin, *Adaptive Filter Theory, 2nd edition*, Prentice-Hall (1991). Because of the constraints of using linear combiners, the adaptive linear filters do not usually work satisfactorily unless the function f in equation (16) and the function $f_r$ in equation (35) are linear functions whose linear coefficients constitute the environmental parameter θ. In the following, it is assume that either f or $f_r$, or both are nonlinear or not known to be linear.

A first example embodiment of the present invention is shown in FIG. 11. The operating environment of the ANS 345 here is the same as that of the adaptive system 285 in FIG. 10, which consists of the plant 90 and the reference model 330. The processor 355 in the ANS 345 comprises an MLP 365 and tapped delay lines to hold the input vector (a (t), ..., a (t−$B_1$+1)) for the MLP 365 (or alternatively an MLPWIN 365 without the tapped delay lines). A plant model two 335, which is described earlier on in connection with the first case of the parallel formulation of system identification, is used in the ANS 345 as a model of the plant 90. It is assumed in the following discussion that $u_y$* is the operational value of $u_y$* with respect to $Q_2$($u_y$,$v_y$(θ$_1$), ..., $v_y$(θ$_N$)) in (20) in a nonadaptive training of the NN 145. The selected typical values, θ$_1$, ..., θ$_N$, and the best-fit values, $u_y$*, $V_y$* (θ$_1$), ..., $v_y$* (θ$_N$), have been recorded for use later on. The weights w of the NN 365 are divided into the nonadaptively adjustable weights u and the adaptively adjustable weights v. The nonadaptively adjustable weights u are determined using the a priori (or preoperational) information about the operating environment, which is described by the equations, (16), (17) and (18), (35), (36), and (37). These equations are simulated to generate nonadaptive training data as follows: Use the set Θ of examplary values, θ$_1$, ..., θ$_N$, of θ, that have been used to determine ($u_y$*, $v_y$* (θ$_1$), ..., $v_y$* (θ$_N$)). Using a pseudo-random number generator to simulate the initial state (17) and the stochastic sequences $\epsilon_r$, generate a collection $S_{r\theta}$ of exemplary realizations $w_r$ of the input/output sequences, $w_r$={(a (τ, θ$_n$, $_r$), $y_r$ (τ, θ$_n$, ω$_r$)), τ=−$B_2$+1, −$B_2$+2, ..., T}, $w_r \in S_{r\theta_n}$, for each selected exemplary value of θ$_n$, where $B_2$ is an integer greater than or equal to the maximum of $B_1$, p, q, $p_r$ and $q_r$. We note that the positive integer T, the set Θ and the collections $S_{\theta_n}$ should have been selected and generated such that the unions, S := $\cup_{n=1}^{N} S_{\theta_n}$ and $S_r := \cup_{n=1}^{N} S_{r\theta_n}$, reflect sufficiently the typical inputs and output measurements of the plant 90 in operation. S is called a priori training data or nonadaptive training data. Then the nonadaptively adjustable weights u of the NN 365 are determined by minimizing or reducing the following nonadaptive training criterion by the variation of both the nonadaptively adjustable weights u and the variables $v(\theta_1), \ldots, v(\theta_N)$:

$$Q_8(u, v(\theta_1), \ldots, v(\theta_N)) = \qquad (39)$$

$$\sum_{n=1}^{N} \sum_{\omega \in S_{r\theta_n}} \sum_{\tau=1}^{T} \frac{\lambda^{T-\tau}}{T(\#S_r)} \|y_r(\tau, \theta_n, \omega) - \hat{y}(\tau, \theta_n, \omega, u, v(\theta_n))\|^2,$$

where $\#S_r$ is the number of elements in the set $S_r$; $\lambda$ is a positive real number less than or equal to 1; and the outputs $\hat{y}(\tau, \theta_n, \omega, u, v(\theta_n))$ of the plant model two 335 are defined as follows. With the weights $u_y$ and $v_y$ of the plant model two 335 equal to $u_y^*$ and $v_y^*$ $(\theta_n)$ respectively and with the nonadaptively and adaptively adjustable weights of the processor 355 equal to the variables u and $v(\theta t)$ respectively, the plant model two 335 outputs $y(r, \theta_n, \omega, u, v(\theta_n))$ right after the input vectors $a(s, \theta_n, \omega)$, $s=-B_2+1, -B_2+2, \ldots, \tau$ are received and processed consecutively one at a time by the processor 355 and plant model two 335. Intuitively speaking, in this nonadaptive training, while the same nonadaptively adjustable weights u are shared by all the selected exemplary values of $\theta$, one set, $v(\theta_n)$, of adaptively adjustable weights is used for each typical value, $\theta_n$. This set of variables, $v(\theta_n)$, is called the diversity variables associated with the typical value, $\theta_n$, of the environmental variable, $\theta$. Since the optimization of $Q_8$ $(u, v(\theta_1), \ldots, (\theta_N))$ is done off-line, as much computation as required to produce an optimal or very good solution can be performed. If a cross-validation technique is applied in the nonadaptive training, the generalization capability of the NN is maximized. If an NN prunig method is applied in the nonadaptive training, only those connections with nonadaptively adjustable weights whose being pruned do not significantly increase $Q_8$ and/or reduce the generalization capability of the NN are allowed to be pruned. The weight of a pruned connection is set equal to zero and the weights of all the connections incident to a pruned neuron are also set equal to zero. The values of the variables, $u, v(\theta_1), \ldots, v(\theta_N)$, that result from the nonadaptive training, are denoted by $u^*, v^*$ $(\theta_1), \ldots, v(\theta_N)$ and called the best-fit values of these variables. If the nonadaptively trained NN is selected to be used in the processor of an ANS, the best-fit values, $u^*$, of u are the operational values of the nonadaptively adjustable weights.

In contrast to the adaptive training criterion (38), a preferred adaptive training criterion in accordance with the teachings of the present invention is $$Q_9(v, v_y, t) := \frac{1}{t} \sum_{\tau=1}^{t} \lambda^{t-\tau} \|z_r(\tau) - \hat{y}(\tau, u^*, v, u^*_y, v_y)\|^2, \qquad (40)$$

where $\lambda$ is a positive real number less than or equal to one, and $\hat{y}(\tau, u^*, v, u_y^*, v_y)$ denotes the output vector of the plant model two 335 at time $\tau$ after a (s), $s=-B_2+1, B_2+2, \ldots, \tau$, have been fed to the input terminals of the processor 355, the weights of the NN 365 in the processor 355 being $u^*$ and v, and the weights of the NN 145 in the plant model two 335 being $u_y^*$ and $v_y$. We note that $u^*$ and $u^*$ have been obtained in the nonadaptive trainings of the NNs 175 and 365.

A set of preferred adaptively adjustable weights for the MLP (or alternatively MLPWIN) 365 is its linear weights, which are the weights, $w^L$, of its last layer, layer L. This is how the ANS 345, comprising the plant model two 335, processor 355, and an NN training algorithm 380, works during the operation of ANS: At time t, the processor 355, using the nonadaptively adjustable weights $u^*$ and the adaptively adjustable weights v(t), receives and processes a (t), and produces the control signal x(t) for the plant. The same control signal x(t) is received and processed by the plant model two 335, whose NN 145, using the nonadaptively adjustable weights u; and the adaptively adjustable weights $v_y(t)$, then outputs $\hat{y}(t)$. Here v(t) and $v_y(t)$ are the adaptively adjustable weights of the NN 365 and the NN 145 determined at the preceding time t−1 respectively by an NN training algorithm 380 and an NN training algorithm in the plant model two 335. At time t, $v_y(t+1)$ is determined by reducing or minimizing $Q_3(v_y, t)$ in the plant model two 335, as explained earlier on for the parallel formulation of system identification. At the same time, $v_y(t+1)$ and the NNs' processing informations required to determine v(t+1) are transferred 385, 395, 400 to the NN training algorithm 380. So are the plant model two's output $\hat{y}(t)$ and the reference model's output measurement $z_r(t)$. The NN training algorithm 380 then determines v(t+1) at time t by reducing or minimizing $Q_9$ $(v, v_y(t+1), t)$ by the variation of the variable $v_y$. The values v(t+1) are then delayed by one time step and transferred into the NN 365 in the processor 355. In the MLP (or alternatively MLPWIN) 365, the nonadaptively adjustable weights u have been set equal to their operational values $u^*$ obtained with respect to $Q_8$ $(u, v(\theta_1), \ldots, v(\theta_N))$ in equation (39) in a nonadaptive training. These operational values $u^*$ remain constant in the operation of the ANS until next nonadaptive training is performed. We stress here that "time" means an index of time or a numbering of quantities, patterns or events. Usually, it is not a temporal instant of time.

A second example embodiment of the present invention for adaptive model reference control is shown in FIG. 12. This second example embodiment usually requires much less computation in operation than the foregoing first example embodiment. The operating environment of the second example embodiment, ANS 420, in FIG. 12 is the same as that of the adaptive system 345 in FIG. 11, which consists of the plant 90 and the reference model 330. The configuration of the processor 355 in the ANS 420 is also the same as that of the processor 355 in the ANS 345 in FIG. 11. However, a plant model three 415, whose working is described earlier on in connection with the second case of the parallel formulation of system identification, is used instead of the plant model two 335 in FIG. 11. It is assumed in the following discussion that the operational value, $u_y^*$, has been obtained with respect to $Q_2(u_y, v_y(\theta_1), \ldots, v_y(\theta_N))$ in (20) in a nonadaptive training of the NN 147. The selected typical values, $\theta_1, \ldots, \theta_N$, and the best-fit values, $u_y^*, v_y^*$ $(\theta_1), v_y^*$ $(\theta_N)$, have been recorded for use later on. Since there are no feedbacks from the output neurons of the NN 147 to its input neurons, the adaptively adjustable weights $v_y = w_y^L$ 157 appear linearly in $Q_3(v_y, t)$ and an RLS, QR-LS, I-QR-RS, LSL, QRD-LSL or LMS algorithm 162 is adequate to determine $v_y(t+1)$ by reducing $Q_3(v_y, t)$ in an adaptive training of the NN 147 in the plant model two 415.

As mentioned earlier, the configuration of the processor 355 in FIG. 12 is the same as that of the processor 355 in FIG. 11. The weights w of the NN 365 are divided into the nonadaptively adjustable weights u and the adaptively adjustable weights v. Preferred adaptively adjustable weights are the linear weights of the NN 365. The nonadaptively adjustable weights u in the NN 365 in FIG. 12 are determined in the same way as those in the NN 365 in FIG. 11 except with the plant model two 335 in FIG. 11 replaced with the plant model three 415 in FIG. 12 in the nonadaptive training of the NN 365. The equations, (16), (17) and (18), (35), (36), and (37), are simulated to generate nonadaptive training data $S_r := \cup_{n=1}^{N} S_{r\theta n}$ as defined and generated for the foregoing first example embodiment. The operational nonadaptively adjustable weights u* of the NN 365 are obtained by minimizing or reducing $Q_8$ (u, $v(\theta_1), \ldots, v(\theta_N)$), by the variation of both the nonadaptively adjustable weights u and the variables $v(\theta_1), \ldots, v(\theta_N)$, in equation (39), where #$S_r$ is the number of elements in the set $S_r$; $\lambda$ is the same positive real number $\lambda$ as in $Q_2(u_y, v_y(\theta_1), \ldots, v_y(\theta_N))$; and the outputs $\hat{y}(\tau, \theta_n, W, U, v(\theta_n))$ of the plant model three 415 are defined as follows: With the weights $u_y$ and $v_y$ of the plant model three 415 equal to $u_y^*$ and $v_y^*$ ($\theta_n$) respectively and with the nonadaptively and adaptively adjustable weights of the processor 355 equal to the variables u and $v(\theta_n)$ respectively, the plant model three 415 outputs $\hat{y}(\tau, \theta_n, \omega, u, v(\theta_n))$ right after the input vectors a (s, $\theta_n, \omega$), s=$-B_2+1$, $-B_2+2, \ldots, \tau$ are received and processed consecutively one at a time by the processor 355 and plant model three 415. The constant $B_2$ is the same as defined for the first example embodiment. The best-fit values, (u*, v* ($\theta_1$), ..., v* ($\theta_N$)), of the variables of $Q_8$ are recorded for later use.

If the value of the environmental parameter $\theta$ were one of the selected typical values, say $\theta_n$, and were known during the operation of the ANS 420, there would be no need for adaptive trainings, because the weights, v* ($\theta_n$) and $v_y^*$ ($\theta_N$), are the values of the adaptively adjustable weights, v and $v_y$, of the NN 365 and NN 147 respectively, that jointly minimize (or nearly minimize) $Q_9$ (v, v, t) in (40), where $\lambda$ is the same $\lambda$ as in $Q_2(u_y, v_y(\theta_1), \ldots, v_y(\theta_N))$, and $\hat{y}(\tau, u^*, v, u_y^*, v_y)$ is the output vector of the consecutive processings performed by the processor 355 and the plant model three 415 using u* and $u_y^*$ respectively. Of course, neither the true value of $\theta$ nor the optimal values, v* ($\theta$) and $v_y^*$ ($\theta$), for this true value of $\theta$ are known, but an estimate (or approximate) $v_y(t+1)$ of $v_y^*$ ($\theta$) is obtained at time t during the adaptive training of the NN 147 through reducing or minimizing $Q_3(v_y, t)$. If an estimate (or approximate) of v* ($\theta$) with an accuracy comparable to that of $v_y(t+1)$ can be obtained from $v_y(t+1)$, the adaptive training of the NN 365, which usually requires much computation to perform, can be avoided. This can be achieved by a mapping NN( e.g., MLP) that inputs an estimate $v_y(t+1)$ of $v_y^*$ ($\theta$) and outputs an estimate v(t+1) of v* ($\theta$), which is then delayed by one time step and used at time t as the adaptively adjustable weights in the NN 365.

Supposing an MLP 425 is used as such a mapping NN, we denote its weights by $w_m$ and denote the outputs of the MLP subject to inputs $v_y$ by $\gamma$ ($w_m, v_y$), where the argument $w_m$ indicates the outputs' dependency on the MLP's weights. Using ($v_y^*$ ($\theta_n$), v* ($\theta_n$)), n=1, ..., N, as the training data set of exemplary input/output pairs, the weights $w_m$ of the MLP are determined by minimizing $$Q_{10}(w_m) = \sum_{n=1}^{N} \|v^*(\theta_n) - \gamma(w_m, v^*_y(\theta_n))\|, \quad (41)$$

by the variation of $w_m$. Being performed in a nonadaptive training, this optimization yields an optimal (or very good) set of weights of the MLP, which is denoted by $w_m^* := \arg\min_{w_m} Q_{10} (w_m)$.

This is how the second example embodiment of the present invention, ANS 420, comprising the plant model three 415, processor 355, and a map 425, works during the operation of the ANS: At time t, the processor 355, using the nonadaptively adjustable weights u* and the adaptively adjustable weights v(t), receives and processes a (t), and produces the control signal x(t) for the plant. The same control signal x(t) is received and processed by the plant model three 415, whose NN 147, using the nonadaptively adjustable weights $u_y^*$ and the adaptively adjustable weights $v_y(t)$, then outputs $\hat{y}(t)$. The processing information, $\beta_y^{L-1}$ (t), is then transferred 165 to the RLS, QR-LS, I-QR-LS, LSL, QRD-LSL or LMS algorithm 142, which compares z(t) and $\hat{y}(t)$ and determines $v_y(t+1)$ by reducing or minimizing $Q_3(v_y, t)$, as explained earlier on for the first case of the parallel formulation of system identification. The MLP 425 with $w_m^*$ then maps $v_y(t+1)$ into v(t+1). The values v(t+1) and $v_y(t+1)$ are then delayed 430, 170 by one time step and transferred into the NN 365 and the NN 147, respectively. We stress here that "time" means an index of time or a numbering of quantities, patterns or events. Usually, it is not a temporal instant of time.

In many adaptive reference model control problems of practical importance, the input/output relationship of a reference model is known to satisfy equations of the forms, (35) and (36), but the function, $f_r$, and the integers, $p_r$ and $q_r$, are not known and the environmental parameter $\theta$(t) is not even identified (i.e. how many and what components there are in $\theta$(t) are unknown). However, for each of a large number of different, though unknown, exemplary values of $\theta$, a large set of exemplary realizations of the reference model's input process a and output measurement process $z_r$ are available, which reflect their joint probability distributions during the reference model's operations. We notice that the nonadaptive training criterion, (39), is constructed with or specified by the collection $S_r := \cup_{n=1}^{N} S_{r\theta n}$ of exemplary realizations of the input process a and output process $y_r$ of the reference model (35). Although the exemplary realizations of the output process $y_r$ are missing here, the foregoing exemplary embodiments of the present invention shown in FIG. 11 and FIG. 12 are still applicable with the operational values u* of the nonadaptively adjustable weights u in the MLP (or alternatively MLPWIN) 365 obtained with respect to the criterion, $Q_8$ (u, $v(\theta_1), \ldots, v(\theta_N)$), in equation (39) with $y_r$ replaced with $z_r$.

Example Embodiments for Adaptive Optimal Estimation

A typical problem of adaptive optimal estimation is to estimate a functional ø (y, t) of the outputs y of a system described by the equation, (16), with the initial condition (17), by processing a measurement process z satisfying the measurement equation, $$z(t) = h\ (y(t), \ldots, y\ (t-p_1+1), x(t), \ldots, x\ (t-q_1+1), \theta(t), \xi(t)), \quad (42)$$

where the vector-valued functions, $f$ and h, and the integers, p, q, $p_1$ and $q_1$, are given; x(t) is the known input vector at time t; $\epsilon$ and $\xi$ are random vector sequences with given joint probability distributions; $\theta$(t) denotes the vector-valued unknown environmental parameter at time t; and the initial state, $(y_0, \ldots, y_{-p+1}, x_{-1}, \ldots, x_{-q+1})$, is a random vector with a given probability distribution. The system (16) is called a plant, which can be found in a large variety of application areas including communication, signal processing, control, radar, sonar, robotics, and geophysics. We note that time-varying parameters and/or coefficients of the plant and the measurement process can be included in the vector x(t). As usual, a vector may be single- or multiple-dimensional and the Euclidean norm of a vector is denoted by $\|.\|$ Supposing that ø (y, t)=y(t-c), the adaptive optimal estimation problem is called an adaptive optimal filtering problem if c=0, an adaptive optimal smoothing problem if c>0, an adaptive optimal prediction problem if c<0. The problem of adaptive optimal estimation is to design and implement an adaptive system, comprising a processor and an adaptor, that operates in the operating environment represented by the equations, (16), (17) and (42). During the operation of the adaptive system, the outputs of the plant are not directly accessible (i.e. not precisely known) and at time t, only the measurement, z(t), is available for processing by the adaptive system. The processor inputs z(t) and outputs an estimate $\hat{\phi}(y, t)$ of $\phi$ (y, t)at each time t=1, 2, ..., T, where T is a positive integer or infinity. At the same time t, the adaptor uses past and present measurements to determine or adjust the weights and/or parameters of the processor to adapt to the environmental parameter $\theta$ so that the estimate $\hat{\phi}(y, t)$ generated by the processor minimizes some given estimation error criterion. The most widely used estimation error criterion is the conditional mean square error criterion, $E[\|\phi(y, t) - \hat{\phi}(y, t)\|^2 |z^t]$, where $E[.|z^t]$ denotes the conditional expectation given the measurements, $z^t := \{z(s), s=1, \ldots, t\}$. If an estimation error criterion is minimized by the outputs of an adaptive system, it is called an adaptive optimal estimator for $\phi$ (y, t) with respect to the estimation criterion. If the equations, (16) and (42), do not depend on $\theta$, the problem of estimating $\phi$ (y, t) given the meaurements $z^t$ is not an adaptive estimation problem and is addressed in U.S. Pat. No. 5,408,424 to James T. Lo, where neural networks are used as optimal estimators.

If a function $g(z(t), \ldots, z(t-q_2+1))$ for some positive integer $q_2$ exists, regardless of $\theta$, such that $g(z(t), \ldots, z(t-q_2+1)) = y(t) + \eta(t)$ for some zero-mean stochastic process $\eta$ that is statistically independent of y, then the foregoing example embodiments of the present invention for adaptive system identification are applicable here after removing the time delays, 85 and 125 in FIG. 7 and making the modifications stated for the general case (29). In general, such a function $g(z(t), \ldots, z(t-q_2+1))$ does not exist and $y(t)+\eta(t)$ is not available as the desired output in an adaptive training of the processor. Adaptive estimation schemes that are applicable in this case are reported in a paper by James T. Lo and Lei Yu, "Adaptive Neural Filtering by Using the Innovations Process." *Proceedings of the 1995 World Congress on Neural Networks*, Volume II, pp. II-29 to II-35. In each of these schema, NNs are trained only in nonadaptive trainings and a maximum likelihood estimate of the environmental parameter $\theta$ is calculated and used as an input to these NNs during their operations. Simulation results show that these schema perform very well, but they involve a large amount of on-line computation.

An example embodiment of the present invention for adaptive optimal estimation is shown in FIG. 13, where a small box enclosing a number such as 475 indicates a delay of the same number of time steps. The foregoing typical operating environment described by the equations, (16), (17) and (42), is shown as block 450. The ANS (adaptive neural system) 525 comprises a processor 455 and an adaptor 520.

Assume that the unknown parameter $\theta(t)$ is a constant $\theta$ or varies so slowly that it can be viewed as constant in a reasonably short period of time. NNs of many different paradigms can be used in the processor 455 here. For illustrating the idea, an MLP with tapped delay lines (or alternatively an MLPWIN) is considered. If an MLP 460 with tapped delay lines, that has a hyperbolic tangent activation function in each hidden neuron and an identity activation function in each output neuron, is used in the processor 95 and the tapped delay lines are used to receive (z(t), x(t)) at time t and provide (z(t), ..., z(t–p_3), x(t), .., x(t–q_3)), for some nonnegative integers $p_3$ and $q_3$, as the input vector to the MLP, then the MLP with all its weights denoted by w outputs an estimate $\hat{\phi}$ (y, t) of $\phi$ (y, t) at the same time t. (Alternatively, if an MLPWIN 460, that has a hyperbolic tangent activation function in each hidden neuron and an identity activation function in each output neuron, is used in the processor 455, the MLPWIN with all its weights denoted by w inputs (z(t), x(t)) at time t and outputs an estimate $\hat{\phi}$ (y, t) of $\phi$ (y, t) at the same time t.) Note that the number $n_L$ of output neurons of the NN 460 is equal to the number of components of the vector $\phi$ (y, t).

In accordance with the teachings of the present invention, the weights w of the NN (MLP or MLPWIN) 460 are divided into the nonadaptively adjustable weights u and the adaptively adjustable weights v. Superscripts and subscripts of u and v are used in exactly the same manner as are those of w. The nonadaptively adjustable weights u are determined using the a priori (or preoperational) information about the operating environment, which is the equations, (16), (17) and (42). These equations are simulated to generate nonadaptive training data as follows: Select a set $\Theta$ of exemplary values, $\theta_1, \ldots, \theta_N$, of $\theta$. Using a pseudo-random number generator to simulate the initial state, (17), and the stochastic sequences $\epsilon$ and $\xi$, generate a collection $S_{\theta_n}$ of exemplary realizations w of the sequences, $(x(\tau, \theta_n, \omega), y(\tau, \theta_n, \omega), z(\tau, \theta_n, \omega), \phi(y, \tau, \theta_n, \omega)), \tau = -B, -B+1, \ldots, T, w \in S_{\theta_n}$, for each selected exemplary value $\theta_n$. Here B is an integer greater than or equal to the greater of p and q. The positive integer T, the set $\Theta$ and the collections $S_{\theta_n}$ should be selected and generated such that the union $S := \cup_{n=1}^N S_{\theta_n}$ reflects the operating environments sufficiently. S is called a priori training data or nonadaptive training data. Then the nonadaptively adjustable weights u are determined by minimizing or reducing the following nonadaptive training criterion by the variation of both the nonadaptively adjustable weights u and the variables $v(\theta_1), \ldots, v(\theta_N)$:

$$Q_{11}(u, v(\theta_1), \ldots, v(\theta_N)) = \quad (43)$$

$$\frac{1}{T(\#S)} \sum_{n=1}^{N} \sum_{\omega \in S_{\theta_n}} \sum_{\tau=1}^{T} \lambda^{T-\tau} \|\phi(y, \tau, \theta_n, \omega) - \hat{\phi}(y, \tau, \theta_n, \omega, u, v(\theta_n))\|^2,$$

where $\|.\|$ denotes the Euclidean norm; #S is the number of elements in the set S; $\lambda$ is a positive real number less than or equal to 1; and $\hat{\phi}(y, \tau, \theta_n, \omega, u, v(\theta_n))$ is defined to be the output vector of the MLP (or alternatively MLPWIN) with its adaptively adjustable weights v equal to the variables $v(\theta_n)$, right after feeding $(x(s, \theta_n, \omega), z(s, \theta_n, \omega))$, s=–B+1, –B+2, ..., $\tau$ consecutively one at a time, at the input terminals of the MLP's tapped delay lines (or alternatively the MLPWIN's input neurons). Intuitively speaking, in this nonadaptive training, while the same nonadaptively adjustable weights u are shared by all the selected exemplary values of $\theta$, one set, $v(\theta_n)$, of adaptively adjustable weights is used for each typical value, $\theta_n$. This set of variables, $v(\theta_n)$, is called the diversity variables associated with the typical value, $\theta_n$, of the environmental variable, $\theta$. Since the optimization of $Q_{11}$ (u, $v(\theta_1), \ldots, v(\theta_N)$) is done off-line, as much computation as required to produce an optimal or very good solution can be performed. If a cross-validation technique is applied in the nonadaptive training, the generalization capability of the NN is maximized. If an NN prunig method is applied in the nonadaptive training, only those connections with nonadaptively adjustable weights whose being pruned do not significantly increase $Q_{11}$ and/or reduce the generalization capability of the NN are allowed to be pruned. The weight of a pruned connection is set equal to zero and the weights of all the connections incident to a pruned neuron are also set equal to zero. The values of the variables, u, $v(\theta_1), \ldots, v(\theta_N)$, that result from the nonadaptive training, are denoted by u*, v* $(\theta_1), \ldots, v*(\theta_N)$ and called the best-fit values of these variables. If the nonadaptively trained NN is selected to be used in the processor of an ANS, the best-fit values, u*, of u are the operational values of the nonadaptively adjustable weights.

In the adaptor 520, there are a map 530, which is a mapping NN, and a predictor for the measurement process z, which comprises a predicting processor 480 and a predicting adaptor 500. The predicting processor, comprising an MLP with tapped delay lines or an MLPWIN 485, inputs z(t−1) and x(t) and outputs an estimate $\hat{z}(t)$ of z(t) at time t during the operation of the ANS 525. The nonadaptively adjustable weights u* 490 are determined in a nonadaptive training by minimizing or reducing the nonadaptive training criterion, $$Q_{12}(u_z, v_z(\theta_1), \ldots, v_z(\theta_N)) = \qquad (44)$$

$$\frac{1}{T(\#S)} \sum_{n=1}^{N} \sum_{\omega \in S_{\theta_n}} \sum_{\tau=1}^{T} \lambda^{T-\tau} \|z(\tau,\theta_n,\omega) - \hat{z}(\tau,\theta_n,\omega,u_z,v_z(\theta_n))\|^2,$$

where $\|.\|$ denotes the Euclidean norm; #S is the number of elements in the set S; $\lambda$ is a positive real number less than or equal to 1; and $\hat{z}(\tau,\theta_n,w, u_z, v_z(\theta_n))$ is defined to be the output vector of the MLP (or alternatively MLPWIN) 485 with its adaptively adjustable weights $v_z$ equal to the variables $v_y(\theta_n)$, right after feeding (x(s, $\theta_n$, $\omega$), z(s−1, $\theta_n$, $\omega$)), s=−B+1,−B+2, . . . , τ consecutively one at a time, at the input terminals of the MLP's tapped delay lines (or alternatively the MLPWIN's input neurons). Since the optimization of $Q_{12}$ ($u_z$, $v_z$ ($\theta_1$), . . . , $v_z$ ($\theta_N$)) is done off-line, as much computation as required to produce an optimal or very good solution can be performed. If a cross-validation technique is applied in the nonadaptive training, the generalization capability of the NN is maximized. If an NN prunig method is applied in the nonadaptive training, only those connections with nonadaptively adjustable weights whose being pruned do not significantly increase $Q_{12}$ and/or reduce the generalization capability of the NN are allowed to be pruned. The weight of a pruned connection is set equal to zero and the weights of all the connections incident to a pruned neuron are also set equal to zero. The values of the variables, $u_z$, $v_z$ ($\theta_1$), . . . , $v_z$ ($\theta_N$), that result from the nonadaptive training, are denoted by $u_z$*, $v_z$* ($\theta_1$), . . . , $v_z$* ($\theta_N$) and called the best-fit values of these variables. If the nonadaptively trained NN is selected to be used in the processor of an ANS, the best-fit values, u*, of u are the operational values of the nonadaptively adjustable weights.

A preferred adaptive training criterion in accordance with the teachings of the present invention is $$Q_{13}(v_z,t) := \frac{1}{t} \sum_{\tau=1}^{t} \lambda^{t-\tau} \|z(\tau) - \hat{z}(\tau, u^*_z, v_z)\|^2, \qquad (45)$$

where $\hat{z}(\tau, v_z^*, v_z)$ denotes the output of the MLP (or alternatively MLPWIN) with its nonadaptively adjustable weights equal to $u_z$* and its adaptively adjustable weights equal to v, and $\lambda$ is a positive real number less than or equal to one. The argument $v_z$ in $Q_{13}$ ($v_z$, t) and $\hat{z}(\tau, u_z^*, v_z)$ indicates their dependencies on the MLP's (or alternatively the MLPWIN's) adaptively adjustable weights $v_z$.

A set of preferred adaptively adjustable weights for the MLP (or alternatively MLPWIN) 485 are its linear weights, which are the weights, $w^L$, of its last layer, layer L. Setting $v_z = w_z^L$ or, more specifically, $v_{zij} = w_{zij}^L$ for j=0, . . . , $n_{L-1}$ and i=1, . . . , $n_L$, it follows that $$\hat{z}(\tau,u^*_z,v_z) = \left[ \sum_{j=0}^{n_{L-1}} v_{z1j}^L \beta_{zj}^{L-1}(\tau,u^*), \ldots, \sum_{j=0}^{n_{L-1}} v_{zn_{Lj}}^L \beta_{zj}^{L-1}(\tau,u^*) \right]^T \qquad (46)$$

where $\beta_{z0}^{L-1}$ ($\tau$, u*):=1 and for j=1, . . . , $n_{L-1}$, $\beta_{zj}^{L-1}$ ($\tau$,u*) is the activation level of neuron j in layer L−1, the argument $u_z$* indicating that the nonadaptively adjustable weights, $w_z^1$, . . . , $w_z^{L-1}$, used to produce these activation levels, are equal to $u_z$* obtained in the preceding nonadaptive training. Substituting (46) into (45) yields $$Q_{13}(v_z,t) := \qquad (47)$$

$$\frac{1}{t} \sum_{\tau=1}^{t} \lambda^{t-\tau} \left\| z(\tau) - \left[ \sum_{j=0}^{N_{L-1}} v_{z1j}^L \beta_{zj}^{L-1}(\tau,u^*), \ldots, \sum_{j=0}^{n_{L-1}} v_{zn_{Lj}}^L \beta_{zj}^{L-1}(\tau,u^*) \right]^T \right\|^2.$$

This adaptive training criterion is obviously quadratic in v, whose (i×j)-th component is $v_{zij}^L$. Thus, a wide range of fast algorithms such as the recursive least squares (RLS) algorithms and the corresponding fast versions; QR- and inverse QR-least squares (QR-LS and I-QR-LS) algorithms; least-squares lattice (LSL) and QR decomposition-based least squares lattice (QRD-LSL) algorithms; and gradient-based algorithms such as the least-mean square (LMS) algorithm are applicable to minimize or reduce $Q_{13}$ ($v_z$, t) by the variation of $v_z$. These algorithms can be found in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). We note that $Q_{13}$ ($v_z$,t) is unimodal in v and hence the adaptive training for minimizing or reducing $Q_{13}$ ($v_z$, t) cannot be trapped in a poor local minimum of $Q_{13}$ ($v_z$, t). The optimal or very good solution of this quadratic optimization is denoted by $v_z$ (t+1):=arg min$_{u_z}$ $Q_{13}$ ($v_z$, t), which is delayed 515 by one time step and then used as the linear weights $v_z$ 495 of the NN 485. The same solution, $v_z$ (t+1), is also used as the input to the mapping NN 530.

If the value of the environmental parameter θ were one of the selected typical values, say $\theta_n$, and were known during the operation of the ANS 525, there would be no need for adaptive trainings, because the weights, v* ($\theta_n$), are the values of the adaptively adjustable weights, v, of the NN 460, that minimize (or nearly minimize)

$$Q_{14}(v,t) = \frac{1}{t} \sum_{\tau=1}^{t} \lambda^{t-\tau} \|\phi(y,\tau) - \hat{\phi}(y,\tau,u^*,v)\|^2, \qquad (48)$$

where $\hat{\phi}(y,\tau, u^*, v)$ denotes the output of the MLP (or alternatively MLPWIN) 460 with its nonadaptively adjustable weights equal to u* and its adaptively adjustable weights equal to v, and $\lambda$ is the same $\lambda$ as in $Q_{11}$ in equation (43). (Note that in many applications, neither ø (y, τ) nor a noisy version, ø (y, τ)+noise, is available during the operation of the ANS 525 and hence $Q_{14}$ can not be used in an adaptive training.) Of course, neither the true value of θ nor the optimal value, v* (θ), for this true value of θ is known, but an approximate, $v_z$ (t+1), of the optimal value, $v_z$* (θ), of $v_z$ for this true value of θ is obtained at time t during the adaptive training of the NN 485 through reducing or minimizing $Q_{13}$ ($v_z$,t). A good approximate of v* (θ) can be obtained from $v_y$(t+1) by a mapping NN 530 that inputs $v_y$(t+1) and outputs an approximate, v(t+1), of v* (θ), which is then delayed by one time step and used at time t as the adaptively adjustable weights in the NN 460.

Supposing an MLP 530 is used as the mapping NN, we denote its weights by $w_m$ and denote the outputs of the MLP subject to inputs $v_z$ by γ ($w_m$, $v_z$), where the argument $w_m$ indicates the outputs' dependency on the MLP's weights. Using ($v_z$* ($\theta_n$), v* ($\theta_n$)), n=1, . . . , N, as the training data set of exemplary input/output pairs, the weights $w_m$ of the MLP are determined by minimizing $$Q_{15}(w_m) = \sum_{n=1}^{N} \|\nu^*(\theta_n) - \gamma(w_m, \nu^*_z(\theta_n))\|, \quad (49)$$

by the variation of $w_m$. Being performed in a nonadaptive training, this optimization yields an optimal (or very good) set of weights of the MLP, which is denoted by $w_m^* := \arg\min_{w_m} Q_{10}(w_m)$.

This is how this example embodiment of the present invention, ANS 525, comprising the processor 455, the predicting processor 480, the predicting adaptor 500 and a map 530, works during the operation of the ANS: At time t, the processor 455, using the nonadaptively adjustable weights u* and the adaptively adjustable weights v(t), receives and processes z(t) and x(t), and produces an estimate, $\hat{\phi}(y, t)$, of $\phi(y, t)$. At the same time t, the predicting processor 480 receives and processes x(t) and z(t−1), using the nonadaptively adjustable weights u* and the adaptively adjustable weights $v_z$ (t), and produces an estimate $\hat{z}$ (t) of the measurement z(t). The processing information, $\beta_z^{L-1}$ (t), is then transferred 510 to the RLS, QR-LS, I-QR-LS, LSL, QRD-LSL or LMS algorithm 505, which also receives x(t), z(t) and $\hat{z}$(t) and determines $v_z$ (t+1) by reducing or minimizing $Q_{13}$ ($v_z$, t). Also at time t, the MLP 530 with $w_m^*$ then maps $v_z$ (t+1) into v(t+1). The values v(t+1) and $v_z$ (t+1) are then delayed 535, 515 by one time step and transferred into the NN 460 and the NN 485, respectively. We stress here that "time" means an index of time or a numbering of quantities, patterns or events. Usually, it is not a temporal instant of time. Many special cases of the plant equation, (16), and of the measurement equation, (42), can be easily obtained. Among them, a most widely encountered combination of special plant and measurement equations for adaptive optimal estimation is the equations, (16) and (42), with inputs x removed from both and with the environmental parameter θ removed from the latter. In this case, the processor 455, the predicting processor 480 and the predicting adaptor 500 are slightly modified so that they do not receive or process these inputs x.

In many adaptive optimal estimation problems of practical importance, the input/output relationship of a plant is known to satisfy equations of the forms, (16) and (17), but the function, $f$, and/or the integers, p and/or q, are not known and the environmental parameter θ(t) is not even identified (i.e. how many and what components there are in θ(t) are unknown). Sometimes, it is known that the measurement is taken in accordance with an equation of the form, (42), but the function h, and/or the integers, P, and/or $q_1$, are not known. However, for each of a large number of different, though unknown, exemplary values of θ, a large set of exemplary realizations of the plant's input and output processes x and y as well as the measurement process z are available, which reflect their joint probability distributions during the plant's operations. We notice that the nonadaptive training criteria, (43) and (44), are constructed with or specified by the collection $S := \cup_{n=1}^{N} S_{\theta_n}$ of exemplary realizations of the input process x, output process y, and measurement process z. The foregoing example embodiment of the present invention for adaptive optimal estimation is still applicable here.

Preferred Embodiments for General Adaptive Processings

A prior-art adaptive system, that uses an NN (neural network) with at least one hidden nonlinear neuron in its processor, for a general adaptive processing environment is shown in FIG. 14. The prior-art adaptive system 560 receives inputs 565 from its operating (or adaptive processing) environment, processes them through a processor 575 and an adaptor 595, and sends outputs 570 back to the operating environment, at each time t. The processor 575, comprising an NN 590 with at least one hidden nonlinear neuron, inputs some information 580 available inside the adaptive system at time t. The processor may or may not contain devices such as tapped delay lines for presenting this information 580 in a certain form to the NN 590, whose input and output vectors at time t are denoted by $\beta^o$ (t) and $\beta^L$ (t) respectively. The values, w (t), of all the adjustable weights of the NN are provided or updated by an adaptor 595. At time t, the NN 590 uses these weight values, w (t), to process these received informations 580 and produces outputs 585, which may be included in the adaptive system's outputs 570 and/or the adaptor's inputs 600. The adaptor 595 also receives data 600, 610 available inside the adaptive system, which data include the processing information 610 about all the adjustable weights w (t) of the NN 590. An NN training algorithm 605 in the adaptor 595 processes these data and determines the values w (t+1) of all the NN's adjustable weights for use after a delay 615 of one time step. Note that this NN training is an adaptive training performed on line during the operation of the adaptive system 560. Only the current operational data that are available and collected during the operation of the adaptive system are used in the adaptive training. Usually the computing power and memory are limited and/or expensive and real-time processing is required.

In the prior-art adaptive system 560, no distinction is made between nonadaptively adjustable weights u and adaptively adjustable weights v. All the adjustable weights are determined or adjusted during the operation of the adaptive system. The first drawback is the relatively large amount of computation required at each time and the relatively slow rate for all the adjustable weights to converge to values appropriate for the current value of the environmental parameter θ. Because there is at least one hidden nonlinear neuron in the NN, none of the RLS, QR-LS, I-QR-LS, LSL, QRD-LSL and LMS algorithms can be applied. This drawback is most serious, when the NN 590 used in the processor is a recursive one.

The second drawback is the poor performance and nonstability of the prior-art adaptive system caused by the many poor local minima of the nonquadratic training criterion of an NN with hidden nonlinear neurons. As opposed to nonadaptive (or preoperational, or off-line) training in which multiple training sessions can be conducted to avoid choosing a poor local minimizer of the training criterion, adaptive training of an NN during its operation does not usually allow multiple training sessions and can get trapped into one or another poor local minimum of the training criterion. Global optimization algorithms such as simulated annealing, genetic algorithms, ALOPEX and other stochastic algorithms can be used here, but they converge even more slowly then those algorithms using derivatives of the training criterion with respect to the weights and/or parameters of the adaptive NN such as those based on gradient descent, conjugate gradient, or quasi-Newton methods.

If an unknown environmental parameter is the only information missing about the operating environment of an adaptive neural network, its adaptive training should focus on learning about and adapting to the unknown environmental parameter. Allowing all the adjustable weights to be adjusted adaptively does not make the best use of the a priori (or preoperational) information and fails to focus on adapting to the unknown environmental parameter alone. It is known in statistics that more data are needed to determine more variables to the same degree of accuracy. Consequently, more information than required for learning about or adapting to the unknown environmental parameter only has to be accumulated on-line to achieve successful adaptation. This is the third drawback of the prior-art adaptive system shown in FIG. 14.

It is appropriate to remark here that if a linear combiner (or an NN without a hidden nonlinear neuron) is used in the processor 95 instead of an NN with at least one hidden nonlinear neuron such as an MLP or MLPWIN 105 and the adaptive training criterion for the linear combiner is a quadratic function of its weights, an RLS, QR-LS, I-QR-LS, LSL, QRD-LSL or LMS algorithm is applied instead of the NN training algorithm 110 to determine these weights of the linear combiner. In this case, the adaptive system is a so called adaptive linear filter, which is extensively treated in the paper by A. H. Sayed and T. Kailath, "A State-Space Approach to Adaptive RLS Filtering," *IEEE Signal Processing Magazine*, Vol. 11, No. 3, pp.18–60 (1994) and in the book by S. Haykin, *Adaptive Filter Theory, 2nd edition*, Prentice-Hall (1991). Because of the constraint of using a linear combiner, the adaptive linear filter does not usually work satisfactorily unless the operating environment is essentially "linear" with "linear coefficients" constituting the environmental parameter θ. In the following, it is assume that the operating environment is not linear or not known to be linear.

In consideration of these drawbacks of the prior-art adaptive system and the adaptive linear filter, there is a need for an adaptive system whose processor does not have a self-imposed linearity constraint like that of the adaptive linear filter and whose adaptor employs a fast and efficient algorithm, focuses on the unavailable information about the operating environment, and has no or little chance to be trapped in a poor local minimum of the adaptive system's performance surface.

This need is substantially satisfied by the adaptive neural system (ANS) designed and/or implemented in accordance with the teachings of the present invention. A schematic diagram for illustrating a preferred embodiment of the invention is shown in FIG. 15. The adaptive neural system (ANS) 640 receives inputs 645 from its operating (or adaptive processing) environment, processes these inputs through a processor 655 and an adaptor 685, and produces outputs 650. The processor 655, comprising an NN 670 with at least one hidden nonlinear neuron, inputs some information 660 available inside the adaptive system. The processor may or may not contain devices such as tapped delay lines for presenting this information 660 in a certain form to the NN 670, whose input and output vectors at time t are denoted by $\beta^o$ (t) and $\beta^L$ (t) respectively. In accordance with the teachings of the present invention, the adjustable weights w of the NN 670 are divided into the nonadaptively adjustable weights u and the adaptively adjustable weights v, which are determined and/or adjusted in a nonadaptive training and an adaptive training respectively. The nonadaptive training is carried out in a off-line or preoperational setting. All the a priori information, including simulated, experimental and/or past operational data, about the operating environment for various exemplary values of the environmental parameter θ can be used repeatedly until optimal or very good values u* 675 of the nonadaptively adjustable weights u are obtained. There are virtually no or little limits on the computation and computer memory that can be used for a nonadaptive training. On the other hand, the adaptive training is performed by the adaptor 685 on line during the operation of the ANS 640. It is stressed here that in an adaptive training of an NN in an adaptive system, only the current operational data that are available and collected during the operation of the adaptive system are used, and that usually the computing power and memory are limited and/or expensive and real-time processing is required.

In accordance with the teachings of the present invention, the nonadaptive training criterion is constructed using exemplary realizations of the input/output sequences of the operating environment for the ANS 640. Some examples of such input/output sequences are those of the plant (16), the reference model (35) and the measurement equations (18), (37) and (42). If a mathematical model (or equations) is available for the operating environment, it is simulated, using a random number generator if necessary, to generate a collection $S_{\theta_n}$ of such exemplary realizations, each being denoted by w, for each $\theta_n$ of a selected set Θ of exemplary values, $\theta_1, \ldots, \theta_N$, of the environmental parameter θ. Each exemplary realization w starts at time t=−B and ends at time t=T, where B is a positive integer so large that all the initial states for the operating environment at time τ=0 are included in each of the exemplary realizations and T is a positive integer so large that the dynamics of the operating environment are believed to be sufficiently reflected or represented by the exemplary realizations. The set e and the collections $S_{\theta_n}$ should be selected and generated such that the union $S := \cup_{n=1}^{N} S_{\theta_n}$ reflects the operating environments sufficiently. If no mathematical model (or equation) is available for the operating environment, experimental data and/or past operational data can be used. Each exemplary realization in such data is also denoted by w and the collection of such data is also denoted by $S := \cup_{n=1}^{N} S_{\theta_n}$, where $\theta_1, \ldots, \theta_N$ are again exemplary values of the environmental parameter θ. Whether S is simulated, experimental or operational data, it is called a priori training data or nonadaptive training data. For each realization w ∈ $S_\theta$, the input vector of the NN 670 at time t is denoted by $\beta^o$ (t, θ, w); the output vector of the NN with nonadaptively and adaptively adjustable weights, u and v, after feeding $\beta^o$ (s,θ,ω), s=−B, −B+1, . . . , t consecutively one at a time at the input terminals of the NN is denoted by $\beta^L$ (t, θ,ω,u, v); and the corresponding error of the ANS 640 incurred by this output vector is denoted by ρ(t, θ,ω, $\beta^L$ (t, θ, ω, u, v)). Because the nonadaptively and adaptively adjustable weights, u and v, constitute the adjustable weights, w, the functions, $\beta^L$ (t, θ, ω, u, v) and θ(t, θ, ω, $\beta^L$ (t, θ, ω, u, v)), are also written as $\beta^L$ (t, θ,ω,w) and θ(t, θ,w, $\beta^L$ (t, θ, ω, w)), respectively. Using these notations, a preferred nonadaptive training criterion is $$P(u,v(\theta_1), \ldots, v(\theta_N)) = \qquad (50)$$

$$\frac{1}{T(\#S)} \sum_{n=1}^{N} \sum_{\omega \in S_{\theta_n}} \sum_{\tau=1}^{T} \rho(\tau,\theta_n,\omega,\beta^L(\tau,\theta_n,\omega,u,v(\theta_n))),$$

where #S is the number of elements in the set S. Intuitively speaking, in this nonadaptive training, while the same non-adaptively adjustable weights u are shared by all the selected exemplary values of θ, one set, v(θ$_n$), of adaptively adjustable weights is used for each typical value, θ$_n$. This set of variables, v(θw), of the function, P, is called the diversity variables associated with the typical value, θ$_n$, of the environmental parameter, θ. Since the optimization of P (u, v(θ$_1$), . . . , v(θ$_N$)) is done off-line, as much computation as required to produce an optimal or very good solution can be performed. If a cross-validation technique is applied in the nonadaptive training, the generalization capability of the NN is maximized. If an NN pruning method is applied in the nonadaptive training, only those connections with nonadaptively adjustable weights whose being pruned do not significantly increase P and/or reduce the generalization capability of the NN are allowed to be pruned. The weight of a pruned connection is set equal to zero and the weights of all the connections incident to a pruned neuron are also set equal to zero. The values of the variables, u, $v(\theta_1), \ldots, v(\theta_N)$, that result from the nonadaptive training, are denoted by $u^*, v^*(\theta_1), \ldots, v^*(\theta_N)$ and called the best-fit values of these variable with respect to the nonadaptive training criterion, P. If the nonadaptively trained NN is selected to be used in the processor of an ANS, the best-fit values, $u^*$, of u are called the operational values of the nonadaptively nonadjustable weights with respect to the nonadaptive training criterion, P. Some examples of the nonadaptive training criterion, $P(u, v(\theta_1), \ldots, v(\theta_N))$, are $Q_2$ in equation (20), $Q_5$ in equation (31), $Q_8$ in equation (39), $Q_{11}$ in equation (43), and $Q_{12}$ in equation (44). Giiven an NN of a certain architecture, nonadaptively training the NN is the entire process of searching for the best-fit values of the nonadaptively adjustable weights and the diversity variables of the NN.

Denoting the current realization of the input/output sequences, that are obtainable (or measurable), of the operating environment for the ANS 640 during its operation by $w_m$, the input vector of the NN 670 at time t by $\beta^o$ (t), and the output vector of the NN with its nonadaptively adjustable weights $u^*$ and adaptively adjustable weights v by $\beta^L$ (t, $u^*$, v), the corresponding error of the ANS 640 incurred by this output vector at time t is, in general, a function of t, $w_c$ and $\beta^L$ (t, $u^*$, v) and thus denoted by $\delta(t, \omega_c, \beta^L(t, u^*, v))$. A preferred adaptive training criterion in accordance with the teachings of the present invention is $$J(v,t) := \frac{1}{t} \sum_{\tau=1}^{t} \delta(\tau \omega_c, \beta^L(\tau, u^*, v)). \tag{51}$$

Some examples of this adaptive training criterion are $Q_3(v, t)$ in equation (21), $Q_6(v, t)$ in equation (32), $Q_9(v, v_y(t+1), t)$ in equation (40) and $Q_{13}(v_z, t)$ in equation (45).

It was discovered by the present inventor that under very mild conditions, an arbitrary static mapping, $y = f(x, \theta)$, from x to y can be approximated to any desired degree of accuracy by a nonrecurrent NN with only one hidden layer of nonlinear neurons, where only the linear weights depend on the environmental parameter $\theta$, provided that there are a sufficient number of hidden neurons. It was also discovered by the present inventor that under very mild conditions, a dynamic system (or plant) described by (16) and (17) can be approximated, over a finite time interval $1 < t < T$, to any desired degree of accuracy by a recursive neural network with only one hidden layer of fully interconnected nonlinear neurons, where only the linear weights depend on the environmental parameter $\theta$, provided that there are a sufficient number of hidden nonlinear neurons. These two discoveries and their generalizations allow us to select the adaptively adjustable weights of the adaptive neural system's neural network from only its linear weights without sacrificing the performance of the adaptive neural network, provided that a sufficient number of linear weights are available and selected. Therefore, in many applications, linear weights of the NN are preferred adaptively adjustable weights, v, of the NN. Furthermore, if $\delta(\tau, w_c, \beta^L(\tau, u^*, v))$ is a quadratic function of v, an RLS, QR-LS, I-QR-LS, LSL, QRD-LSL or LMS algorithm is applied as the algorithm 695 for determining $v(t+1)$ by reducing J (v, t). These algorithms are extensively treated in the paper by A. H. Sayed and T. Kailath, "A State-Space Approach to Adaptive RLS Filtering," *IEEE Signal Processing Magazine*, Vol. 11, No. 3, pp. 18–60 (1994) and in the book by S. Haykin, *Adaptive Filter Theory, 2nd edition*, Prentice-Hall (1991). Some example adaptive training criteriia that are quadratic in the adaptively adjustable weights are $Q_3(v, t)$ in equation (21), $Q_6$ (v,t) in equation (32) and $Q_{13}$ ($v_z$,t) in equation (45).

Sometimes, the function, $\delta$, is such that no or not enough weights from the NN can be found to form the adaptively adjustable weights, v, that can sufficiently adapt to all the possible values of the environmental parameter $\theta$ and appear quadratically in $\delta$ at the same time. In this case, adaptively adjustable weights are preferably selected from its nonrecursive section, and standard adaptive (or on-line) training methods such as the (pattern-mode or incremental) backpropagation training algorithm and its variants, which can be found in most books on neural networks, can be used as the algorithm 695 for determining $v(t+1)$ by reducing J (v, t). If one or more weights from the recursive section of an NN have to be selected to be adaptively adjustable weights, some adaptive training methods to be discussed in the next subsection can be used.

If the a priori training data, S, is insufficient to reflect the operating environment adequately, the nonadaptively adjustable weights should be selected so that they are not too numerous to be determined effectively by the data, S, in a nonadaptive training. In this case, some nonlinear weights of the NN are usually selected, preferably from its nonrecursive section, as the adaptively adjustable weights.

This is how the ANS 640 works during its operation: The ANS keeps receiving information 645 from its operating environment. At time t, the processor 655 inputs part or all of this information 660 and presents this and possibly some of the past information in a suitable form, $\beta^o$ (t), to the NN 670 in the processor. Using $u^*$ and v(t) as the nonadaptively adjustable and adaptively adjustable weights respectively at time t, the NN 670 processes $\beta^o$ (t) to produce its output vector $\beta^L$ (t), which constitutes a substantial part, if not all, of the outputs 665 of the processor 655. At the same time t, the adaptor 685 receives information 690 from the ANS inputs 645, the processor outputs 665, and possibly other parts within the ANS 640. The adaptor also receives the NN's processing information 705 concerning the adaptively adjustable weights v(t). Using these data, an algorithm 695 in the adaptor minimizes or reduces J (v, t) and thereby determines the values $v(t+1)$ of the adaptively adjustable weights v of the NN 670, which values are then delayed 700 by one time step and transferred into the adaptively adjustable section 680 for use by the NN 670 at the next time. In the NN 670, the nonadaptively adjustable weights u 675 have been set equal to their operational values $u^t$ obtained with respect to $P(u, v(\theta_1), \ldots, v(\theta_N))$ in equation (50) in nonadaptive training. These operational values $u^*$ remain constant in the operation of the ANS until the next nonadaptive training is performed. The algorithm 695 may simply accumulate information at some time step(s). In this case, the values $v(t+1)$ produced by the algorithm 695 may stay the same for two or more consecutive times. All the informations from the ANS 640 that are used outside it constitute the outputs 650 of the ANS. We stress here that "time" means an index of time or a numbering of quantities, patterns or events. Usually, it is not a temporal instant of time.

In some important applications, the informations available during the operation of the ANS are not adequate for constructing a desirable J in equation (51). For instance, $Q_{14}$ (v, t) is a desirable adaptive training criterion for adaptive optimal estimation, but neither $\phi$ (y, t) in equation (48) nor $\phi$ (y, t)+noise is usually available. In some other applications, minimizing or reducing a desired adaptive training criterion involves a large amount of computation. For instance, minimizing or reducing the adaptive training criterion, $Q_9$ (v, $v_y$, t), for adaptive model reference control does involve much computation. These difficulties call for an alternative way to adaptively adjust or determine the adaptively adjustable weights 680 in the NN 670. Some additional terminologies are now defined. An auxiliary ANS is an ANS used in the adaptor of another ANS for helping determine or adjust the adaptively adjustable weights of the NN in this adaptor. To designate components and quantities of an auxiliary ANS, the adjective, "auxiliary," and the subscript, "a," are used respectively. (we note that the subscript letter, "a" is written as "a" in the figures.) For instance, an auxiliary adaptor is the adaptor of an auxiliary ANS and an auxiliary NN is an NN used in an auxiliary adaptor. A map is a function, that assigns a vector value to every vector value in the domain of the function. A mapping neural network is a nonrecursive neural NN that acts as a function.

FIG. 16 shows an alternative way to adaptively adjust or determine the adaptively adjustable weights 680 in the NN 670. It employs a map 755 and an auxiliary ANS 765 in the adaptor 735. Comprising a processor 775 and an adaptor 780, the auxiliary ANS 765 is an ANS 640 as shown in FIG. 15. The auxiliary ANS is such an ANS whose J can be constructed with the information available during the operation of the ANS. For instance, the plant model three 415 in FIG. 12 is an auxiliary ANS whose J is $Q_3(v_y, t)$ and constructable with $\beta_y^{L-1}(\tau)$ and $z(\tau)$ available during the operation of the plant model three. Another example is the ANS comprising the predicting processor 480 and the predicting adaptor 500 in FIG. 13. The adaptive training criterion J of this ANS is $Q_{13}(v_z,t)$ and is constructable with $\beta_z^{L-1}(\tau)$, $x(\tau)$, $z(\tau)$ and $\dot{z}(\tau)$, which are available during the operation of this auxiliary ANS. The values, $v_y(t+1)$, of the adaptively adjustable weights of the auxiliary NN 790, that are produced by the auxiliary adaptor 780 at time t, are transformed by the map 755 into the values, $v(t+1)$, of the adaptively adjustable weights of the NN 670 in the processor 655, which are in turn delayed 760 by one time step and transfered into the adaptively adjustable section of the NN 670. A preferred map is a mapping NN such as an MLP, which is trained using a set of training data described as follows: For each typical value $\theta_n$, for n=1, ..., N, of the environmental parameter $\theta$, the best-fit values, $v_a^*(\theta_n)$ and $v^*(\theta_n)$, of the adaptively adjustable weights, $v_a$ and $v$, respectively of the auxiliary NN 790 and the NN 670 are included as a input/output pair in a training data set for training the MLP. The best-fit values, $(u_a^*, v_a^*(\theta_1), \ldots, v_a^*(\theta_N))$ and $(u^*, v^*(\theta_N), \ldots, v^*(\theta_N))$, are obtained with respect to $P_a$ for the auxiliary NN 790 and P for the NN 670 respectively. Examples of the preferred mapping NN are the MLP 425 in FIG. 12 and the MLP 530 in FIG. 13, whose training-data sets are described in the preceding subsections.

Some special cases or examples of the ANS 640 and the ANS 730 are given in the preceding subsections. More can be obtained by replacing the MLP with tapped delay lines or the MLPWIN in these special cases or examples by another NN paradigm. Of course, the MLP WIN can also be used together with tapped delay lines, which hold the current and past inputs of the processor containing the MLPWIN as the current inputs for the MLPWIN. Still more can be obtained by replacing the mean square error in $Q_2$, $Q_5$, $Q_8$, $Q_{11}$, $Q_{12}$, $Q_3$, $Q_6$, $Q_9$, $Q_{13}$ or $Q_{14}$ by another error function such as the mean absolute deviation, mean Huber's error, and mean relative entropy.

We stress here that in each of the ANS in FIG. 15 and the ANS in FIG. 16, the adjustable weights w of the NN in the processor are divided into the nonadaptively adjustable weights u and the adaptively adjustable weights v, which are determined and/or adjusted in nonadaptive training and adaptive training respectively. The nonadaptive training criterion is formulated so that the values $u^*$ of the nonadaptively adjustable weights u determined in a process of minimizing the nonadaptive training criterion are optimal or very good for all possible values or sequences of values of the environmental parameter. This formulation of the nonadaptive training criterion takes full advantage of the a priori (or preoperational) information about the ANS's operating environment and helps the ANS's adaptor focus on learning about and adapting to the unknown environmental parameter during the adaptive training. The adaptive training criterion is formulated so that the nonadaptively adjustable weights $u^*$ determined in the preceding nonadaptive training are employed and only the adaptively adjustable weights are adjusted and/or determined using the operational data being received during the operation of the ANS. Since the nonadaptively adjustable weights $u^*$ are optimal or very good for all possible values or sequences of values of the unknown environmental parameter $\theta(t)$, the operational data received during the operation of the ANS is used, in minimizing or reducing the adaptive training criterion during adaptive training, mainly to learn about and adapt to the unknown environmental parameter. Thus in the foregoing preferred embodiments of the present invention, the drawbacks of the prior-art adaptive system using an NN as a processor are eliminated.

Innumerable variations of the the preferred embodiments shown in FIG. 15 and FIG. 16 are possible. Some examples are the following:

Different time indices can be used for the processor and the adaptor in an ANS.

Another scheme for determining or adjusting the adaptively adjustable weights of the NN 670 can be employed in the adaptor.

Some nonadaptively adjustable weights can also be used as adaptively adjustable weights being adjusted in an adaptive training.

Realizations, w, of the a priori training data, S, are of different lengths, and the nonadaptive training criterion is defined accordingly. This is especially important, when a mathematical model of the operating environment is unavailable and realizations in the a priori training data can only be collected.

Realizations, w, of the a priori training data, S, start at different times and the nonadaptive training criterion is defined accordingly. This is especially important for time-varying operating environment.

If the a priori training data is not sufficient to reflect the operating environment, the disclosed methods of nonadaptively training an NN can still be applied. The resulting values of the nonadaptively adjustable weights can still carry important, although incomplete, information about the operating environment, which can still be useful for subsequent adaptive training.

If only a coarse and/or inaccurate mathematical model is available or if the a priori training data contain inaccurate data about the operating environment, the disclosed methods of nonadaptively training an NN can still be applied. The resulting values of the nonadaptively adjustable weights can still carry important, although inaccurate, information about the operating environment, which can still be useful for subsequent adaptive training.

A plurality of NNs are used in the processor. In fact, by the definition of a neural network, it is not necessarily connected and hence a plurality of NNs can be viewed as a single NN.

One or more range transformers, which are disclosed in U.S. patent application Ser. No. 08/104,488, are employed.

A combination of two or more of the above variations is used.

Therefore, the spirit and scope of the appended claims should not be limited to the descriptions of the preferred embodiments contained herein.

Determining the Architecture and Nonadaptively Adjustable Weights of the Neural Network A processor in an ANS in accordance with the teachings of the present invention comprises an NN, whose adjustable weights, w, are divided into nonadaptively adjustable weights, u, and adaptively adjustable weights, v. These weights, u and v, are determined or adjusted in a nonadaptive training and an adaptive training respectively. While the adaptive training is performed on line using the information available during an operation of the ANS, the nonadaptive training is carried out using a priori data, S, before an operation of the ANS. In the preceding sections on example and preferred embodiments of the present invention, it is assumed that the architecture of the NN under nonadaptive training is given. The architecture is usually determined by nonadaptively training at least one NN from a preselected NN paradigm and then by selecting a trained NN as the one to be included in the processor in consideration of the network size versus the ANS's performance to optimize the cost effectiveness. Notice that the value of the nonadaptive training criterion indicates the best processing performance achievable by the processor during the operation of the ANS. Since the nonadaptive training criterion, $P(u, v(\theta_1), \ldots, v(\theta_N))$, has a novel form that has not been seen or studied before in the open literature (including patents), some preferred methods of nonadaptively training an NN by minimizing or reducing P are discussed in the following.

Minimizing or reducing P by the variation of its arguments, $u, v(\theta), \ldots, v(\theta_N)$, is simply one unconstrained optimization problem. Unconstrained optimization has been a very large field of numerical and theoretical research by the name of optimization theory. There are basically two types of method for unconstrained optimization. One type, including the annealing methods, genetic search methods, stochastic approximation methods and clustering methods, needs only evaluations of the optimization criterion and the other type needs also evaluations of its derivatives. These methods of both types and their pros and cons can be found in a large number of books and articles and will not be further discussed here. It is only stressed that any optimization method can be selected for the nonadaptive training considered here, provided that the nonadaptive training criterion, P, together with the NN under training, satisfies the required conditions for the selected optimization method.

Nevertheless, due to the enormous number of independent variables, $u, v(\theta_1), \ldots, v(\theta_N)$, in P, it is important to select a good optimization method. Generally speaking, the type of optimization method that needs evaluations of the derivatives of the optimization criterion, is more efficient and converges faster than the other type. After the derivatives are obtained, any one of the conventional optimization methods that need derivatives, such as the gradient descent methods, the conjugate gradient methods and the quasi-Newton methods can be applied. Therefore, some methods of evaluating the derivatives of P are provided in the sequel. An MLP and an MLPWIN are separately treated in detail as the NN 670 in the processor 655 of the ANS 640 and ANS 730 in FIG. 15 and FIG. 16 to illustrate the differentiation methods. First, let us recall and establish some notations.

The MLP or MLP WIN to be referred to as the NN is fully-connected and has L+1 layers of neurons including layer 0 containing the input neurons and layer L containing the output neurons. The set of the numberings, $\{1, \ldots, n_0\}$, of the input neurons in layer 0 is denoted by I and the set of the numberings, $\{1, \ldots, n_L\}$, of the output neurons in layer L is denoted by O. For each realization $\omega \in S_\theta$, the input vector of the NN 670 at time t is denoted by $\beta^0(t, \theta, \omega)$; the output vector of the NN with nonadaptively and adaptively adjustable weights, u and v, after feeding $\beta^0(s, \theta, \omega)$, $s = -B, -B+1, \ldots, t$ consecutively one at a time at the input terminals of the NN is denoted by $\beta^L(t, \theta, \omega, u, v)$; and the corresponding error of the incurred by this output vector is denoted by $\rho(t, \theta, w, \beta^L(t, \theta, \omega, u, v))$ as discussed in connection with equation (50). The average error of the ANS incurred by the realization $w \in S_\theta$ is denoted by $P_{\theta w}(u, v) := [T(\#S)]^{-1} \Sigma_{\tau=1}^T \rho(\tau, \theta, \omega, \beta^L(\tau, \theta, \omega, u, v))$. Because the nonadaptively and adaptively adjustable weights, u and v, constitute the adjustable weights, w, the functions, $\beta^L(t,\theta, \omega, u, v)$, $\rho(t,\theta,\omega, \beta^L(t, \theta, \omega, u, v))$ and $P_{\theta\omega}(u, v)$, are also written as $\beta^L(t, \theta,\omega,w), p(t, \theta,\omega, \beta^L(t, \theta, \omega, w))$ and $P_{\theta\omega}(w)$, respectively. Notice that the preferred nonadaptive training criterion, $P(u, v(\theta_1), \ldots, v(\theta_N))$, in (50) is equal to $\Sigma_{\theta\in\Theta} \Sigma_{\omega\in S\Theta}(u, v(\theta)) = \Sigma_{n=1}^N \Sigma_{\omega\in S\theta_n}(u, v(\theta_n))$, where $\Theta := \{\theta_1, \ldots, \theta_N\}$, and $\Sigma_{\theta\in\Theta}$ denotes the summation over all $\theta$ in $\Theta$. Notice also that the usages of the symbols, $\beta^0(t, \theta, \omega)$ and $\beta^L(t, \theta, \omega, u, v)$ are consistent with those of $\beta^0(t)$ and $\beta^L(t)$ in describing the MLPs and MLPWINs as example NN paradigms earlier on. Thus, $\beta_i^0(t, \theta, \omega)$ and $\beta_i^L(t, \theta,\omega,w)$ denote the ith components of $\beta^0(t, \theta,\omega)$ and $\beta^L(t,\theta,\omega,w)$ respectively. The symbols, $\eta^L(t,\theta, 1\partial,w)$ and $\eta_i^L(t,\theta,\omega,w)$ are similarly defined. For example, if the activation functions $a_i^L(\eta)$, $i \in O$ are the identity functions $a_i^L(\eta)=\eta$, $i \in O$, the activation level $\beta_i^L(t, \theta, \omega, w)$ is equal to $\eta_i^L(t, \theta, \omega,w)$, for each $i \in O$, $\theta \in \Theta$ and $\omega \in S_\theta$.

In the following, we need to use and distinguish the two derivative signs, $\partial f/\partial_f x$ and $df/dx$, for a function $f$. Let us first consider an example in which $f$ is a function, $f(x,y,z)$, of three variables, x, y and z, which are related by the equation, $z=g(x, y)$. The derivative, $\partial f/\partial x$, is $\lim_{h\to 0} (f(x+h, y, z)-f(x, y, z))/h$, if it exists. On the other hand, the derivative, $\partial f/\partial x$, is $\lim_{h\to 0} (f(x+h, y, g(x+h, y))-f(x, y, g(x+h, y)))/h$, if it exists. In fact, $df/dx=\partial f/\partial_f x+(\partial f/\partial z)(\partial g/\partial x)$. When the three variables, x, y and z, are allowed to vary independently and freely, $\partial f/\partial x = df/dx$. In general, the derivative, $\partial f/\partial_f x$, is obtained by differentiating $f$ with respect to x while holding all the other variables that appear in $f$ constant. The derivative, $\partial f/\partial x$, is the rate of change of $f$ with respect to x.

If the NN under the nonadaptive training is an MLP, the derivatives, $dP_{\theta\omega}(w)/dw_{ij}^l$, for $l=1, \ldots, L$, $i=1, \ldots, n_l$, and $j=0, \ldots, n_{l-1}$, can be calculated by the well-known error backpropagation method, which can be found in most books on artificial neural networks. If $w_{ij}^l$ is a nonadaptively adjustable weight, it is also denoted by $u_{ij}^l$ and hence $dP_{\theta,\omega}/du_{ij}^l = dP_{\theta,\omega}/dw_{ij}^l$. If $w_{ij}^l$ is an adaptively adjustable weight, it is also denoted by $v_{ij}^l$ and hence $dP_{\theta,\omega}/dv_{ij}^l = dP_{\theta,\omega}/dw_{ij}^l$. It follows that $$\frac{dP(u,v(\theta_1),\ldots,v(\theta_N))}{du_{ij}^l} = \sum_{n=1}^N \sum_{\omega\in S_{\theta_n}} \frac{dP_{\theta_n\omega}}{du_{ij}^l}(u,v(\theta_n)) \quad (52)$$

$$\frac{dP(u,v(\theta_1),\ldots,v(\theta_N))}{dv_{ij}^l(\theta_n)} = \sum_{\omega\in S_{\theta_n}} \frac{dP_{\theta_n\omega}}{dv_{ij}^l}(u,v(\theta_n)) \quad (53)$$

for every nonadaptively adjustable weight, $u_{ij}^l$, and every variable, $v_{ij}^l(\theta_n)$, associated with the adaptively adjustable weight, $v_{ij}^l$, and the exemplary value, $\theta_n$, of the environmental parameter $\theta$. Since all the components of $u$, $v(\theta_1)$, . . . , $v(\theta_N)$ are allowed to vary freely and independently to minimize $P(u, v(\theta_1), \ldots, v(\theta_N))$, the derivatives in equations (52) and (53) can also be denoted by $\partial P/\partial u_{ij}^l(\theta_n)$, etc.

If the NN under the nonadaptive training is an MLPWIN, the adjustable weights, $w$, include the delayless weights, $w_{ij}^l$, the delay weights, $w_{ij}^{rl}$, and the initial activation levels, $\beta_i^l(0)$, in the initial dynamic state of the MLPWIN. The evaluations of the derivatives, $dP_{\theta\omega}(w)/dw_{ij}^l$, $dP_{\theta\omega}(w)/d\beta_i^{rl}$, and $dP_{\theta\omega}(w)/d\beta_i^l(0)$, are very involved. Perhaps the most widely used ideas are backpropagation through time (BPTT) and real-time recurrent learning (RTRL). A good introduction to BPTT and RTRL ideas with adequate references can be found on pages 182–186 of J. Hertz, A. Krogh and R. G. Palmer, *Introduction to the Theory of Neural Computation*, Addison Wesley (1991). Nevertheless, the BPTT and the RTRL formulas for computing the derivatives are not widely available in the literature and not easy to derive for the MLPWINs. Therefore, these formulas are provided in the following in the form of algorithms, where the foregoing distinction between the two derivative signs, $\partial f/\partial x$ and $df/dx$, has to be strictly observed.

We assume here that the nonadaptively adjustable weights, $u$, consist of all the delay weights, $w_{ij}^{rl}$, all the components, $\beta_i^l(0)$, ($l \neq L$) of the initial dynamic state, and some or none of the delayless weights, $w_{ij}^l$, of the MLPWIN. If a delayless weight, $w_{ij}^l$, is a nonadaptively adjustable weight, it is also denoted by $u_{ij}^l$. If it is an adaptively adjustable weight, it is also denoted by $v_{ij}^l$. By the definitions of $P(u, v(\theta_1), \ldots, v(\theta_N))$ and $P_{\theta_n}^\omega(u, v)$, it is easy to see that $$\frac{dP(u,v(\theta_1), \ldots, v(\theta_N))}{du_{ij}^l} = \sum_{n=1}^{N} \sum_{\omega \in S_{\theta_n}} \frac{dP_{\theta_n\omega}}{du_{ij}^l}(u,v(\theta_n)), \quad (54)$$

$$\frac{dP(u,v(\theta_1), \ldots, v(\theta_N))}{dw_{ij}^{rl}} = \sum_{n=1}^{N} \sum_{\omega \in S_{\theta_n}} \frac{dP_{\theta_n\omega}}{dw_{ij}^{rl}}(u,v(\theta_n)), \quad (55)$$

$$\frac{dP(u,v(\theta_1), \ldots, v(\theta_N))}{d\beta_i^l(0)} = \sum_{n=1}^{N} \sum_{\omega \in S_{\theta_n}} \frac{dP_{\theta_n\omega}}{d\beta_i^l(0)}(u,v(\theta_n)), \quad (56)$$

$$\frac{dP(u,v(\theta_1), \ldots, v(\theta_N))}{dv_{ij}^l(\theta_n)} = \sum_{\omega \in S_{\theta_n}} \frac{dP_{\theta_n\omega}}{dv_{ij}^l}(u,v(\theta_n)), \quad (57)$$

for every delay weight, $w_{ij}^{rl}$, every component, $\beta_i^l(0)$, ($l \neq L$) of the initial dynamic state, every nonadaptively adjustable delayless weight, $u_{ij}^l$, and every variable, $v_{ij}^l(\theta_n)$, that is associated with the adaptively adjustable delayless weight, $v_{ij}^l$, and the exemplary value, $\theta_n$, of the environmental parameter $\theta$.

In the following, the formulas for computing $dP_{\theta\omega}/dv_{ij}^l$, $dP_{\theta\omega}/d\beta_i^l(0)$, $dP_{\theta\omega}/dw_{ij}^{rl}$ and $dP_{\theta\omega}/du_{ij}^l$ are given. To simplify the summation symbols, the symbol $\Sigma_i$ (or $\Sigma_j$) denotes the summation over all the numberings of the neurons in the layer that neuron $i$ (or $j$) appears. For instance, $\Sigma_j w_{ij}^l \beta_j^{l-1} := \Sigma_{j=0}^{n_{l-1}} w_{ij}^l \beta_j^{l-1}$ and $\Sigma_j w_{ji}^{l+1} (dP_{\theta\omega}/d\eta_j^{l+1}(t)) := \Sigma_{j=1}^{n_{l+1}} w_{ji}^{l+1} (dP_{\theta\omega}/dP_{\theta\omega}/d\eta_j^{l+1}(t))$. Furthermore, $\Sigma_t := \Sigma_{t=1}^T$, and $\delta_{ij}$ is the Kronecker delta, i.e. $\delta_{ij} := 1$, if $i = j$ and $\delta_{ij} := 0$, if $i \neq j$.

```
begin
1. For l = 1,2, . . . ,L, do
      For i = 1,2, . . . ,n_l, do
```

$$\frac{dP_{\theta\omega}}{d\eta_i^l(T+1)} = 0$$

```
   end;
end;
2. For t = T, T - 1, . . . ,1, do
      For i = 1,2, . . . ,n_L, do
```

$$\frac{dP_{\theta\omega}}{d\eta_i^L(t)} = \frac{\partial P_{\theta\omega}}{\partial \beta_i^L(t)} ((a_i^L)'(\eta_i^L(t)))$$

```
   end;
   For l = L - 1, L - 2, . . . ,1, do
      For i = 1,2, . . . ,n_l, do
```

$$\frac{dP_{\theta\omega}}{d\eta_i^l(t)} = \left( \sum_j w_{ji}^{l+1} \frac{dP_{\theta\omega}}{d\eta_j^{l+1}(t)} + \sum_j w_{ji}^{rl} \frac{dP_{\theta\omega}}{d\eta_j^l(t+1)} \right) ((a_i^l)'(\eta_i^l(t)))$$

```
      end;
   end;
end;
3. For l = 1,2, . . . ,L, do
      For i = 1,2, . . . ,n_l, do
         For j = 0,1, . . . ,n_{l-1}, do
```

$$\frac{dP_{\theta\omega}}{dw_{ij}^l} = \sum_t \frac{dP_{\theta\omega}}{d\eta_i^l(t)} \beta_j^{l-1}(t);$$

$$\text{If } l \neq L, \text{ then } \frac{dP_{\theta\omega}}{dw_{ij}^{rl}} = \sum_t \frac{dP_{\theta\omega}}{d\eta_i^l(t)} \beta_j^l(t-1)$$

```
      end;
   end;
end;
4. For l = 1,2, . . . ,L - 1, do
      For i = 1,2, . . . ,n_l, do
```

$$\frac{dP_{\theta\omega}}{d\beta_i^l(0)} = \sum_j w_{ji}^{rl} \frac{dP_{\theta\omega}}{d\eta_j^l(1)}$$

end;
end;
end.

b. *RTRL* algorithm for an *MLPWIN*:
begin
1. For $k = 1, 2, \ldots, L - 1$, do
   For $l = 1, 2, \ldots, L - 1$, do
   For $i = 1, 2, \ldots, n_l$, do
   For $p = 1, 2, \ldots, n_k$, do $$\frac{d\beta_i^l(0)}{d\beta_p^k(0)} = \delta_{lk}\delta_{ip};$$

For $q = 0, 1, \ldots, n_{k-1}$, do $$\frac{d\beta_i^l(0)}{dw_{pq}^k} = 0$$

end;
For $q = 1, 2, \ldots, n_k$, do $$\frac{d\beta_i^l(0)}{dw_{pq}^{rk}} = 0$$

end;
end;
end;
end;
end;

2. For $t = 1, 2, \ldots, T$, do
   For $k = 1, 2, \ldots, L - 1$, do
   For $l = k, k+1, \ldots, L$, do
   For $i = 1, 2, \ldots, n_l$, do
   For $p = 1, 2, \ldots, n_k$, do $$\frac{d\beta_i^l(t)}{d\beta_p^k(0)} = \left( (1 - \delta_{kl}) \sum_j w_{ij}^l \frac{d\beta_j^{l-1}(t)}{d\beta_p^k(0)} + (1 - \delta_{lL}) \sum_j w_{ij}^{rl} \frac{d\beta_j^l(t-1)}{d\beta_p^k(0)} \right) (a_i^l)'(\eta_i^l(t));$$

For $q = 0, 1, \ldots, n_{k-1}$, do $$\frac{d\beta_i^l(t)}{dw_{pq}^k} = ((1 - \delta_{kl}) \sum_j w_{ij}^l \frac{d\beta_j^{l-1}(t)}{dw_{pq}^k} + (1 - \delta_{lL}) \sum_j w_{ij}^{rl} \frac{d\beta_j^l(t-1)}{dw_{pq}^k}$$
$$+ \delta_{ip}\delta_{kl}\beta_q^{l-1}(t))(a_i^l)'(\eta_i^l(t))$$

end;
For $q = 1, 2, \ldots, n_k$, do $$\frac{d\beta_i^l(t)}{dw_{pq}^{rk}} = ((1 - \delta_{kl}) \sum_j w_{ij}^l \frac{d\beta_j^{l-1}(t)}{dw_{pq}^{rk}} + (1 - \delta_{lL}) \sum_j w_{ij}^{rl} \frac{d\beta_j^l(t-1)}{dw_{pq}^{rk}}$$
$$+ \delta_{ip}\delta_{kl}\beta_q^l(t-1))(a_i^l)'(\eta_i^l(t))$$

end;
end;
end;
end;
end;
end;

3. For $l = 1, 2, \ldots, L - 1$, do
   For $p = 1, 2, \ldots, n_l$, do $$\frac{dP_{\theta\omega}}{d\beta_p^l(0)} = \sum_t \sum_{i \in O} \frac{\partial P_{\theta\omega}}{\partial \beta_i^L(t)} \frac{d\beta_i^L(t)}{d\beta_p^l(0)};$$

For $q = 0, 1, \ldots, n_{l-1}$, do $$\frac{dP_{\theta\omega}}{dw_{pq}^l} = \sum_t \sum_{i \in O} \frac{\partial P_{\theta\omega}}{\partial \beta_i^L(t)} \frac{d\beta_i^L(t)}{dw_{pq}^l}$$

end;
For $q = 1, 2, \ldots, n_l$, do $$\frac{dP_{\theta\omega}}{dw_{pq}^{rl}} = \sum_{t} \sum_{i \in O} \frac{\partial P_{\theta\omega}}{\partial \beta_i^L(t)} \frac{d\beta_i^L(t)}{dw_{pq}^{rl}}$$

-continued end;
 end;
end;
4. For $p = 1, 2, \ldots, n_L$, do
 For $q = 0, 1, \ldots, n_{L-1}$, do $$\frac{dP_{\theta\omega}}{dw_{pq}^L} = \sum_{t} \frac{\partial P_{\theta\omega}}{\partial \beta_p^L(t)} \beta_q^{L-1}(t)(a_p{}^L)'(\eta_p{}^L(t));$$

end;
 end;
end.

The derivatives of $P_{\theta\omega}$ for an MLPWIN, that is not fully-connected, can be computed using the foregoing algorithms with a slight modification: If a connection is missing in the MLPWIN, its weight and all the derivatives with respect to the weight are set equal to zero and the steps of evaluating all these derivatives are skipped. If the components, $\beta_i^l(0)$, $(l \neq L)$ of the initial dynamic state of the MLPWIN are set equal to some constants and not adjustable weights, those steps of calculating the derivatives with respect to these components are skipped in the foregoing algorithms.

The derivatives $dP/du_{ij}^l$, $dP/dw_{ij}^{rl}$, $dP/d\beta_i^l$ $(\theta_n)$ for an MLPWIN constitute the gradient of $P(u, v(\theta_1), \ldots, v(\theta_N))$ with respect to $(u, v(\theta_1), \ldots, v(\theta_N))$ for the MLPWIN. Given the gradient, to be denoted by $\nabla P(u, v(\theta_1), \ldots, v(\theta_N))$, a local search optimization method such as the gradient descent methods, the conjugate gradient methods and the quasi-Newton methods can be applied. There is a large variety of gradient descent methods, but a basic gradient descent method is an iterative method and improves the value of (w, v) in each iteration by $$(u, v(\theta_1), \ldots, v(\theta_N))^{new} = (u, v(\theta_1), \ldots, v(\theta_N))^{old} - \lambda \nabla P(u, v(\theta_1), v(\theta_N)),$$

where $\lambda$ is a positive constant called the step size. The conjugate gradient methods and the quasi-Newton methods are well-known methods for optimization. A good introduction to them can be found in D. G. Luenberger, *Linear and Nonlinear Programming*, second edition, Addison-Wesley (1973). Some ready to run routines that implement some powerful variants of these methods can be found in W. H. Press, S. A. Teukolsky, W. T. Vetterling and B. P. Flannery, *Numerical Recipes in C*, second edition, Cambridge University Press (1992). In the book, the routine for the conjugate gradient method is called frprmn (p.423) and the routine for the quasi-Newton method is called dfpmin (p.428). A floppy diskett containing the routines is provided in the book.

For calculating th(e derivatives of $P(u, v(\theta_1), \ldots, v(\theta_N))$, BPTT involves much less computation, but much more memory space than RTRL. For minimizing $P(u, v(\theta_1), \ldots, v(\theta_N))$ given its derivatives, quasi-Newton and conjugate gradient methods require about the same amount of computation in each iteration, but the former converges faster than the latter. Quasi-Newton methods also need much more memory space than do conjugate gradient methods. Hence, if plenty of memory space is available in a computer, a combination of BPTT and a quasi-Newton method is preferred on the computer. However, if the memory space is limited in a computer for training an NN, a combination of RTRL and a conjugate gradient method is preferred on the computer. Different combinations are possible for different degrees of availability of the memory space in a computer.

Two well-known methods of training MLPWINs, in the ordinary (prior art) sense, that use extended Kalman filter (EKF) are proposed in G. V. Puskorius and L. A. Feldkamp, "Recurrent Network Training with the Decoupled ]Extended Kalman Filter Algorithm," *Science of Artificial Neural Networks*, edited by D. W. Ruck, Proceedings SPIE 1710, pp. 461–473 (1992), and in R. J. Williams, "Training Recurrent Networks Using the Extended Kalman Filter," *Proceedings of the 1992 International Joint Conference on Neural Networks*, Baltimore, Md., pp. IV 241–246 (1992), which are incorporated herein by reference. These EKF methods, which also require evaluation of the derivatives of $P(u, v(\theta_1), \ldots, v(\theta_N))$, can be modified to perform a nonadaptive training of an MLPWIN in accordance with the teachings of this invention.

Another optimization method worth mentioning is the simultaneous perturbation stochastic approximation (SPSA) algorithms introduced by J. C. Spall, "Multivariate Stochastic Approximation Using a Simultaneous Perturbation Gradient Approximation," *IEEE Transactions on Automatic Control*, Volume 37, No. 3, pp. 332–341 (1992) and J. C. Spall, "Stochastic Version of Second-Order (Newton-Raphson) Optimization Using Only Function Measurements," *Proceedings of the 1995 Winter Simulation Conference*, edited by C. Alexopoulos and K. Kang (1995). Applied to a nonadaptive training, these algorithms require only evaluations of the nonadaptive training criterion, but do not require calculations of its derivatives.

A standard statistical technique, known as cross-validation, can be used to improve or help ensure the generalization capability of the NN. The idea is to use a second a priori (or nonadaptive) training data set, S', that is collected in the same way as the first a priori (or nonadaptive) training data set, S, and is called the a priori testing data set. A second nonadaptive training criterion, P', that is constructed using the testing data set in the same way the (first) nonadaptive training criterion, P, is constructed using the training data set, is called the test criterion for nonadaptive training. In the process of nonadaptively training an NN, P' is evaluated for each new value of the vector variable, $(u, v(\theta_1), \ldots, v(\theta_N))$ The nonadaptive training process is stopped, if P' starts to increase significantly or if P' cannot be further decreased significantly.

Techniques for pruning a recurrent neural network, which are similar to those network-pruning techniques introduced in Simon Haykin, *Neural Networks—A Comprehensive Foundation*, pp. 205–212, Macmillan College Publishing Company, Inc. (1994) can reduce the number of connections (delayless and delay connections) and help improve the generalization capability of an NN under nonadaptive training. If an NN prunig method is applied in the nonadaptive training, only those connections with nonadaptively adjustable weights whose being pruned do not significantly increase P and/or reduce the generalization capability of the NN are allowed to be pruned. The foregoing training result, $(u^*, v^*(\theta_1), \ldots, v^*(\theta_N))$, is modified by setting the weights of pruned connections equal to zero and setting the weights of all the connections incident to pruned neurons equal to zero.

A typical nonadaptive training method, that uses a differentiation technique, a local search optimization technique and a cross-validation technique, is illustrated in FIG. 17. First, we set, in block 810, the initial values of the NN under the nonadaptive training equal to pseudo-random values. In block 815, the nonadaptive training (criterion is evaluated. Using a differentiation technique such as BPTT and RTRL, the derivatives of the nonadaptive training criterion with respect to the nonadaptively adjustable weights and the diversity variables are then calculated in block 820. In block 825, local search method such as that of a conjugate gradient, quasi-Newton or gradient descent method is used to adjust the values of the nonadaptively adjustable weights and the diversity variables of the NN. The test criterion for nonadaptive training is evaluated in block 830. Call it an intermediate value of the test criterion. If it is determined in block 835 that the current intermediate value of the test criterion is not significantly greater than the preceding current intermediate value, we repeat blocks 815, 820, 825, 830 and 835. Otherwise, we record the best preceding intermediate value of the test criterion and record its associated values of the nonadaptively adjustable weights and the diversity variables. We call the best preceding value of the test criterion a candidate value of the test criterion in block 840. If it is decided in block 845 that we want to see if a better candidate value of the test criterion can be obtained, we go to block 810. Otherwise, the best candidate value of the test criterion and its associated values of the nonadaptively adjustable weights and the diversity variables are presented as the best-fit values of the test criterion, the nonadaptively adjustable weights and the diversity variables respectively in block 850.

Most of the nonadaptive training criteria discussed early on contains many undesired local minima, where a local search optimization method can get trapped. Therefore, if a local search method is used, it should be applied a number of times starting at different (randomly or systematically chosen) initial values for the optimization variables (i.e. the weights and/or parameters and sometimes, initial dynamic state of the RNN). Alternatively, a global search method such as an annealing method, a genetic search method or a clustering method can be used for the nonadaptive training.

FIG. 18 shows a nonadaptive training method that requires only evaluations of the nonadaptive training criterion, but does not require calculations of its derivatives. Such a method can be one selected from the group consisting of the stochastic approximation methods, simulated annealing methods, genetic search methods and clustering methods.

Whatever training method is used, it is usually used to nonadaptively train many NNs of various architectures from a selected NN paradigm. Then a nonadaptively trained NN is selected for use in the processor 655 in consideration of the NN size versus the ANS processing performance to optimize the cost-effectiveness. This process of training many NNs and selecting one is called the process of synthesizing the nonadaptive (or a priori) training data into an NN for the ANS.

If all the adaptively adjustable weights are in the nonrecursive section of the MLPWIN, the methods of determining or adjusting the adaptively adjustable weights during an adaptive training are discussed in the preceding subsections. If one or more weights from the recursive section of an MLPWIN are selected to be adaptively adjustable weights, RTRL is more suitable than BPTT for calculating the derivatives of the adaptive training criterion, J (v, t), and the gradient descent and EKF methods are more suitable than conjugate gradient and(1 quasi-Newton methods for minimizing the adaptive training criterion, J (v, t), given its derivatives. The combination of RTRL and Puskorius and Feldkamp's EKF method is preferred. The combination is expected to work much better than the combination of RTRL and the basic gradient descent method for adaptive training. A general method of adaptively training an NN in the prior art sense is provided in O. Nerrand, P. Roussel-Ragot, L. Personnaz, and G. Dreyfus, "Neural Networks and Nonlinear Adaptive Filtering: Unifying Concepts and New Algorithm," *Neural Computation*, Vol. 5, pp. 165–199 (1993), which is incorporated herein by reference. This general method can be applied to the adaptive training of an NN in accordance with the present invention.

SCOPE OF INVENTION

Thus the reader will see that the adaptive neural system disclosed herein does not have a self-imposed linearity constraint lice that of the adaptive linear filter, employs a fast and efficient adaptive training algorithm, focuses on the missing information about the operating environment, and has no or little chance to be trapped in a poor local minimum on the adaptive neural system's performance surface during its operation.

While the above description contains many specificities, these should not be construed as limitations on the scope of the invention, but rather as exemplifications of preferred embodiments thereof. Many other variations are possible. Accordingly, the scope of the present invention should be limited only by the appended claims and their appropriately construed legal equivalents, rather than by the examples given.

What is claimed is:

1. An adaptive neural system for adaptive processing, said adaptive neural system comprising:
a neural network comprising:
at least one hidden nonlinear neuron;
a plurality of nonadaptively adjustable weights, whose operational values are obtained in a nonadaptive training of said neural network; and
a plurality of adaptively adjustable weights; and
adaptor means for adjusting the values of said adaptively adjustable weights during the operation of said adaptive neural system,
wherein at least one of said nonadaptively adjustable weights is a nonlinear weight local to one of said at least one hidden nonlinear neuron; and wherein a nonadaptive training criterion for said nonadaptive training is a function of said nonadaptively adjustable weights and the diversity variables associated with a plurality of typical values of the environmental parameter of said neural network's operating environment.

2. The adaptive neural system of claim 1 wherein said adaptive processing is selected from the group consisting of adaptive system identification, adaptive inverse modeling, adaptive model reference control, and adaptive optimal estimation.

3. The adaptive neural system of claim 1, wherein said plurality of adaptively adjustable weights are linear weights of said neural network.

4. The adaptive neural system of claim 3 wherein an algorithm, selected from the group consisting of recursive least squares algorithms and their fast versions; QR-least squares algorithms and inverse QR-least squares algorithms; least-squares lattice algorithms and QR decomposition-based least squares lattice algorithms; and gradient-based algorithms such as the least mean square algorithms, is used in said adaptor means.

5. The adaptive neural system of claim 1, wherein said neural network is a radial basis function network.

6. The adaptive neural system of claim 1 wherein an auxiliary adaptive neural system and a map are used in said adaptor means, said map transforming said auxiliary adaptive neural system's adaptively adjustable weights into said neural network's said adaptively adjustable weights.

7. An adaptive neural system for adaptive processing, said adaptive neural system comprising:

a multilayer perceptron comprising:
  at least one hidden nonlinear neuron;
  a plurality of nonadaptively adjustable weights, whose operational values are obtained in a nonadaptive training of said neural network; and
  a plurality of adaptively adjustable weights; and
 adaptor means for adjusting the values of said adaptively adjustable weights during the operation of said adaptive neural system, wherein at least one of said nonadaptively adjustable weights is a nonlinear weight local to one of said at least one hidden nonlinear neuron.

8. The adaptive neural system of claim 7, wherein said plurality of adaptively adjustable weights are linear weights of said neural network.

9. The adaptive neural system of claim 8 wherein an algorithm, selected from the group consisting of recursive least squares algorithms and their fast versions; QR-least squares algorithms and inverse QR-least squares algorithms; least-squares lattice algorithms and QR decomposition-based least squares lattice algorithms; and gradient-based algorithms such as the least mean square algorithms, is used in said adaptor means.

10. The adaptive neural system of claim 7 wherein an auxiliary adaptive neural system and a map are used in said adaptor means, said map transforming said auxiliary adaptive neural system's adaptively adjustable weights into said neural network's said adaptively adjustable weights.

11. An adaptive neural system for adaptive processing, said adaptive neural system comprising:

a recursive neural network comprising:
  at least one hidden nonlinear neuron;
  a plurality of nonadaptively adjustable weights, whose operational values are obtained in a nonadaptive training of said neural network; and
  a plurality of adaptively adjustable weights; and
 adaptor means for adjusting the values of said adaptively adjustable weights during the operation of said adaptive neural system, wherein at least one of said nonadaptively adjustable weights is a nonlinear weight in the recursive section of said recursive neural network.

12. The adaptive neural system of claim 11, wherein said plurality of adaptively adjustable weights are linear weights of said neural network.

13. The adaptive neural system of claim 12 wherein an algorithm, selected from the group consisting of recursive least squares algorithms and their fast versions; QR-least squares algorithms and inverse QR-least squares algorithms; least-squares lattice algorithms and QR decomposition-based least squares lattice algorithms; and gradient-based algorithms such as the least mean square algorithms, is used in said adaptor means.

14. The adaptive neural system of claim 11 wherein an auxiliary adaptive neural system and a map are used in said adaptor means, said map transforming said auxiliary adaptive neural system's adaptively adjustable weights into said neural network's said adaptively adjustable weights.

15. An article of manufacture for nonadaptively training a neural network comprising at least one hidden nonlinear neuron, a plurality of nonadaptively adjustable weights and a plurality of adaptively adjustable weights, said article of manufacture comprising:

evaluation means for evaluating a nonadaptive training criterion, that is a function of said nonadaptively adjustable weights and the diversity variables associated with a plurality of typical values of an environmental parameter of said neural network's operating environment; and adjusting means for adjusting the values of said nonadaptively adjustable weights and said diversity variables to reduce the value of said nonadaptive training criterion, wherein at least one of said nonadaptively adjustable weights is a nonlinear weight local to one of said at least one hidden nonlinear neuron.

16. The article of manufacture of claim 15, wherein said neural network is a multilayer perceptron.

17. The article of manufacture of claim 15, wherein said neural network is a radial basis function network.

18. The article of manufacture of claim 15, wherein said neural network is a recursive neural network, which comprises at least one cyclic neuron.

19. The article of manufacture of claim 15, wherein said plurality of adaptively adjustable weights are linear weights of said neural network.

20. The article of manufacture of claim 15, wherein said adjusting means is a method selected from the group consisting of the conjugate gradient methods, quasi-Newton methods, gradient descent methods, extended Kalman filter methods, stochastic approximation methods, simulated annealing methods, genetic algorithms, and clustering methods.

* * * * *